United States Patent
Eguchi

(10) Patent No.: US 9,762,849 B2
(45) Date of Patent: Sep. 12, 2017

(54) SUPER-RESOLUTION PROCESSING METHOD FOR TV VIDEO IMAGES, SUPER-RESOLUTION PROCESSING DEVICE FOR TV VIDEO IMAGES THAT IS USED IN SAME METHOD, FIRST TO FOURTEENTH SUPER-RESOLUTION PROCESSING PROGRAMS, AND FIRST TO FOURTH STORAGE MEDIA

(71) Applicant: LIGHTRON INTERNATIONAL CO., LTD., Saitama (JP)

(72) Inventor: Mitsuo Eguchi, Saitama (JP)

(73) Assignee: Lightron International Co., Ltd., Saitamashi Saitama (JP)

( * ) Notice: Subject to any disclaimer, the term of this patent is extended or adjusted under 35 U.S.C. 154(b) by 0 days.

(21) Appl. No.: 15/102,707

(22) PCT Filed: Nov. 27, 2014

(86) PCT No.: PCT/JP2014/081457
§ 371 (c)(1),
(2) Date: Jun. 8, 2016

(87) PCT Pub. No.: WO2015/087711
PCT Pub. Date: Jun. 18, 2015

(65) Prior Publication Data
US 2016/0316169 A1    Oct. 27, 2016

(30) Foreign Application Priority Data
Dec. 11, 2013 (JP) ................................. 2013-255919

(51) Int. Cl.
*H04N 7/01* (2006.01)
*H04N 9/64* (2006.01)
(Continued)

(52) U.S. Cl.
CPC ......... *H04N 7/0117* (2013.01); *G06T 3/4053* (2013.01); *G06T 3/4076* (2013.01);
(Continued)

(58) Field of Classification Search
CPC    H04N 9/646; H04N 5/57; H04N 5/21; H04N 7/0125; H04N 7/0117; H04N 7/01;
(Continued)

(56) References Cited

U.S. PATENT DOCUMENTS

| | | | |
|---|---|---|---|
| 2008/0095358 A1 | 4/2008 | Eguchi et al. | ................. 380/28 |
| 2012/0105655 A1 | 5/2012 | Ishii et al. | ................. 348/208.4 |
| 2012/0314093 A1 | 12/2012 | Tamayama et al. | ....... 348/208.1 |

FOREIGN PATENT DOCUMENTS

| | | |
|---|---|---|
| JP | 2013-3610 | 1/2013 |
| JP | 2013-175003 | 9/2013 |

(Continued)

*Primary Examiner* — Sherrie Hsia
(74) *Attorney, Agent, or Firm* — Harrington & Smith

(57) ABSTRACT

In order to solve the problems described above, the present invention employs a PSF restoring means and an image restoring means, implemented in software or hardware, for executing a plurality of iterations of real-number-based computations based on Bayse probability theory by using, as input information, a PSF luminance distribution identified according to a degree of degradation of TV video, a luminance distribution of a degraded image constituted of Y (luminance) components of the TV video, and an estimated luminance distribution of restored-image initial values. With these means, an estimated luminance distribution of a restored image having a maximum likelihood for the luminance distribution of the degraded image is obtained, and the estimated luminance distribution is substituted for the Y components of the TV video obtained by extracting the luminance distribution of the degraded image. Accordingly, (Continued)

TV video that approximates the pre-degradation state is provided substantially in real time.

33 Claims, 30 Drawing Sheets

(51) Int. Cl.
   *H04N 5/21* (2006.01)
   *G06T 5/00* (2006.01)
   *G06T 3/40* (2006.01)
   *H04N 5/445* (2011.01)

(52) U.S. Cl.
   CPC ............... *G06T 5/003* (2013.01); *H04N 5/21* (2013.01); *H04N 5/44591* (2013.01); *H04N 9/646* (2013.01); *G06T 2207/10016* (2013.01); *H04N 7/0125* (2013.01)

(58) Field of Classification Search
   CPC .......... H04N 9/64; H04N 11/20; G06T 5/003; G06T 2207/10016; G06T 3/4053; G06T 3/4076
   USPC ....... 348/625, 630, 631, 441, 575, 459, 453; 382/162, 167, 254
   See application file for complete search history.

(56) References Cited

FOREIGN PATENT DOCUMENTS

| WO | WO 2006/041126 A1 | 4/2006 |
| WO | WO 2011/099244 A1 | 8/2011 |

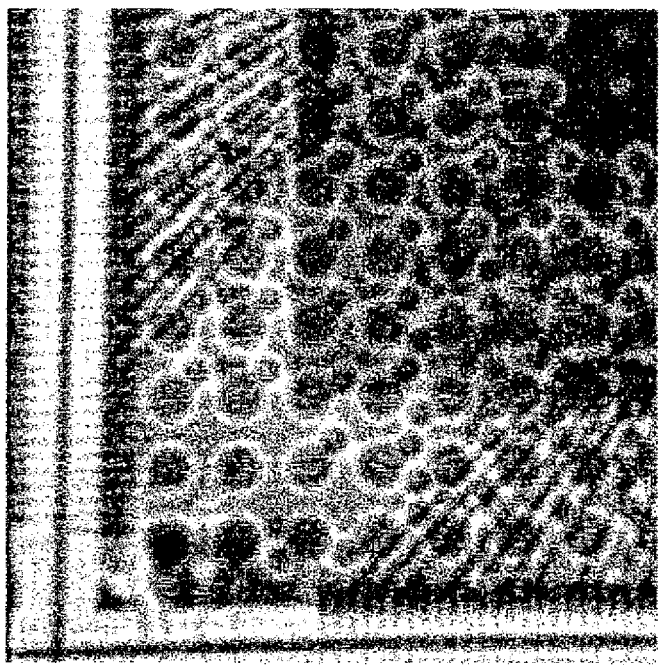
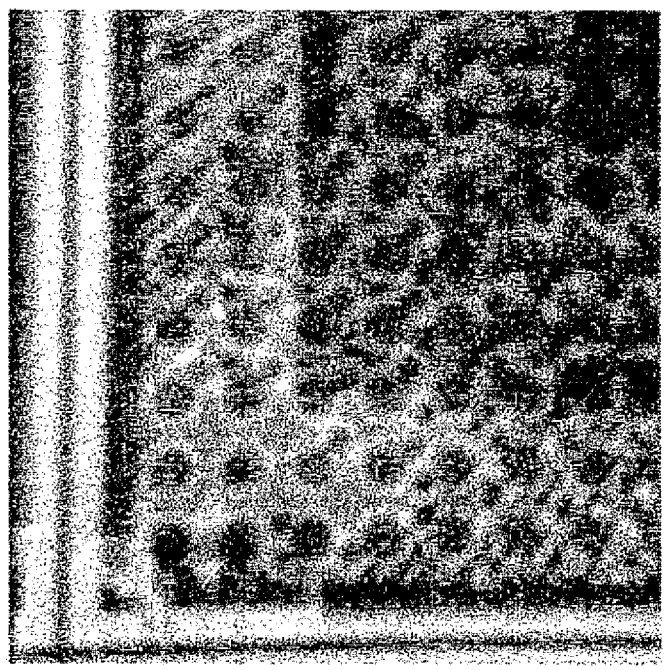
Fig. 1

SUPER-RESOLUTION PROCESSING METHOD FOR TV VIDEO IMAGES, SUPER-RESOLUTION PROCESSING DEVICE FOR TV VIDEO IMAGES THAT IS USED IN SAME METHOD, FIRST TO FOURTEENTH SUPER-RESOLUTION PROCESSING PROGRAMS, AND FIRST TO FOURTH STORAGE MEDIA

TECHNICAL FIELD

The present invention relates to image processing of TV video. In particular, the present invention relates to TV-video super-resolution processing methods, as well as TV-video super-resolution processing devices using the same, for restoring a degraded image to an original pre-degradation image by removing degraded information included in TV video, such as optical blurring or unsharpness, by way of mathematical computational processing based on Bayse probability theory.

BACKGROUND ART

TV video is composed of 30 or more still images per second, referred to as frames. There is a problem in that each frame, whether digital or analog, includes degraded information, such as optical blurring or unsharpness, even if it is not blurred to such an extent that it becomes unclear.

FIG. 1 shows an example of optically degraded information included in a frame constituting actual TV video. FIG. 1 includes two images: the left image represents a frame composed only of Y (luminance components) of TV video acquired by using an X-ray pinhole camera; on the other hand, the right image represents an image restored to the pre-degradation state by using super-resolution technologies invented and registered by the inventor of the present invention (Patent Literatures 1 and 2). A comparison between the images in FIG. 1 indicates that TV video, i.e., a frame constituting actual TV video, includes optically degraded information, and thus there is a need for super-resolution.

In the super-resolution technologies invented by the inventor of the present invention (Patent Literatures 1 and 2), while repeating iterations using information about one still image including degraded information, such as optical blurring or unsharpness, a maximum-likelihood degradation factor and a luminance distribution of a maximum-likelihood restored image, i.e., a sharpened image, having a maximum likelihood for the luminance distribution of the still image are obtained through numerical computations based on the Bayse method. However, a huge amount of computational processing is required for this calculation, there has been a problem in that it is difficult to handle TV video, which requires real-time processing.

One type of conventional super-resolution technology for TV video is a "super-resolution reconstruction" method (Patent Literatures 3 and 4), in which attention is paid to a certain object existing in a plurality of frames constituting TV video and the positions of that object are aligned to superimpose the plurality of frames, thereby realizing super resolution, which is a method that has been introduced into products.

However, in a case where the size of the object considerably varies or where such an object is not included in a plurality of frames, such as in a scene involving intense motion or in a scene involving frequent zoom-ins or zoom-outs, there has been a problem in that super-resolution based on "super-resolution reconstruction" methods is not possible.

As another method, in a method described in Non-Patent Literature 1, Bayes statistical processing is executed on the basis of a plurality of successive still images acquired by using video cameras from mutually slightly different viewpoints, thereby obtaining a super-resolution still image.

However, this method requires a large amount of memory for constantly storing a plurality of still images including degraded information. Furthermore, in order to obtain a still image having super-resolution, it is necessary to constantly process a plurality of still images. This requires a huge amount of computation, which prohibits processing of TV video.

LIST OF PRIOR ART DOCUMENTS

Patent Literature

{PTL 1}
International Publication No.: Japanese Patent Publication No. 4568730 (WO2006/041127)
{PTL 2}
International Publication No.: Japanese Patent No. 4575387 (WO2006/041126)
{PTL3}
Japanese Unexamined Patent Application, Publication No. 2009-296410
{PTL4}
Japanese Unexamined Patent Application, Publication No. 2009-100407

Non Patent Literature

{NPL 1}
Atsunori Kanemura et al., "Bayesian Image Superresolution and Its Hierarchical Extensions," The Brain and Neural Networks, vol. 15, No. 3 (2008), 181-192

SUMMARY OF INVENTION

Problem to be Solved by Invention

With any of the methods described in Patent Literatures 1 to 4 and Non-Patent Literature 1, there has been a problem in that it is not possible to execute super-resolution processing of TV video on the basis of information about only one frame including degraded information, such as optical blurring or unsharpness.

Solution to Problem

Accordingly, it is an object of the present invention to solve these problems and to provide a TV-video super-resolution processing method for executing super-resolution processing of TV video, as well as a TV-video super-resolution processing device for implementing the method.

In order to solve the problems described above, a first invention according to the present invention provides a first TV-video super-resolution processing method for restoring TV video by outputting super-resolution TV video signals obtained by reducing optical degradation in a frame constituting the TV video to restore the degraded frame to the pre-degradation frame. The first invention is the same as the invention described in Claim 1.

The first TV-video super-resolution processing method of the first invention according to the present invention is characterized by including (S1) a first degraded-image preparing step of preparing, from the TV video, a luminance distribution of a degraded image constituted of a single-frame luminance distribution; (S2) a step of setting the luminance distribution of the degraded image as an estimated luminance distribution of restored-image initial values; (S3) a first PSF identifying step of identifying a PSF luminance distribution; (S4) a step of setting the identified PSF luminance distribution as an estimated luminance distribution of PSF initial values; (S5) a step of setting a maximum number of iterations; (S6) a step of resetting a counter that counts the number of iterations; (S7) a first restored-image-initial-value correcting step of copying the estimated luminance distribution of the restored-image initial values and setting the estimated luminance distribution as an estimated luminance distribution of corrected-restored-image initial values and, when convolving the PSF luminance distribution with the estimated luminance distribution of the corrected-restored-image initial values, calculating a region where computation is difficult, the region occurring in a peripheral region in the estimated luminance distribution of the corrected-restored-image initial values, on the basis of the image size of the PSF luminance distribution, copying the pixels in the region where computation is difficult, and pasting the copied pixels to the outside of the boundary of the estimated luminance distribution of the corrected-restored-image initial values in mirror symmetry with respect to the boundary, thereby correcting the estimated luminance distribution of the corrected-restored-image initial values to obtain an estimated luminance distribution of the corrected-restored-image initial values; (SB) a step of setting the estimated luminance distribution of the corrected-restored-image initial values as a luminance distribution of the degraded image; (S9) a step of convolving the estimated luminance distribution of the PSF initial values with the estimated luminance distribution of the corrected-restored-image initial values to obtain a first function; (S10) a step of inverting the first function to obtain a second function; (S11) a step of multiplying the second function by the luminance distribution of the degraded image to obtain a third function; (S12) a step of obtaining an inverted function of the estimated luminance distribution of the corrected-restored-image initial values and setting the inverted function as a fourth function; (S13) a step of convolving the fourth function with the third function- to obtain a fifth function; (S14) a step of multiplying the estimated luminance distribution of the PSF initial values by the fifth function to obtain an estimated luminance distribution of a restored PSF; (S15) a step of substituting the estimated luminance distribution of the restored PSF for the estimated luminance distribution of the PSF initial values; (S16) a step of incrementing the counter by 1; (S17) a step of testing a hypothesis that the value of the counter has exceeded the maximum number of iterations, returning to step (S9) if the test result is false, and outputting the estimated luminance distribution of the restored PSF as a luminance distribution of a maximum-likelihood restored PSF if the test result is true; (S18) a PSF-restoring-computation preparing step constituted of steps (S1) to (S8); (S19) a first PSF restoring computation step constituted of steps (S9) to (S17); (S20) a first PSF restoring step, including the PSF-restoring-computation preparing step and the first PSF restoring computation step, of completing the maximum number of iterations by executing iterations in ascending order of the index on S in the PSF-restoring-computation preparing step and the first PSF restoring computation step and outputting the luminance distribution of the maximum-likelihood restored PSF; (S21) a step of resetting the counter and jumping to (S23); (S22) a second restored-image-initial-value correcting step, constituted of the same processing procedure as the first restored-image-initial-value correcting step, of correcting the estimated luminance distribution of the restored-image initial values on the basis of the image size of the luminance distribution of the maximum-likelihood restored PSF to obtain an estimated luminance distribution of the corrected-restored-image initial values; (S23) a step of convolving the luminance distribution of the maximum-likelihood restored PSF with the estimated luminance distribution of the corrected-restored-image initial values to obtain a sixth function; (S24) a step of inverting the sixth function to obtain a seventh function; (S25) a step of multiplying the seventh function by the luminance distribution of the degraded image to obtain an eighth function; (S26) a step of obtaining an inverted function of the luminance distribution of the maximum-likelihood restored PSF and setting the inverted function as a ninth function; (S27) a step of convolving the ninth function with the eighth function to obtain a tenth function; (S28) a step of multiplying the estimated luminance distribution of the restored-image initial values by the tenth function to obtain an estimated luminance distribution of the restored image; (S29) a step of substituting the estimated luminance distribution of the restored image for the estimated luminance distribution of the restored-image initial values; (S30) a step of incrementing the counter by 1; (S31) a step of testing a hypothesis that the value of the counter has exceeded the maximum number of iterations, returning to step (S22) if the test result is false, and outputting the estimated luminance distribution of the restored image as a luminance distribution of a maximum-likelihood restored image if the test result is true; (S32) a first image-restoring computation preparing step constituted of step (S21); (S33) a first image restoring computation step constituted of steps (S22) to (S31); (S34) a first image restoring step, including the first image-restoring computation preparing step and the first image restoring computation step, of completing the maximum number of iterations by executing iterations in ascending order of the index on S in the first image-restoring computation preparing step and the first image restoring computation step and outputting the luminance distribution of the maximum-likelihood restored image; and (S35) a first TV-video rendering step of rendering the luminance distribution of the maximum-likelihood restored image into TV video and outputting single-frame super-resolution TV video signals.

A second invention according to the present invention is a second PSF restoring computation step as a second aspect of the first PSF restoring computation step constituting the first TV-video super-resolution processing method of the first invention. The second invention is the same as the invention described in Claim 2. The second aspect of the first PSF restoring computation step is characterized by including (S40) a step of convolving the estimated luminance distribution of the PSF initial values with the estimated luminance distribution of the corrected-restored-image initial values to obtain an eleventh function; (S41) a step of inverting the eleventh function to obtain a twelfth function; (S42) a step of multiplying the twelfth function by the luminance distribution of the degraded image to obtain a thirteenth function; (S43) a step of obtaining an inverted function of the estimated luminance distribution of the corrected-restored-image initial values and setting the inverted function as a fourteenth function; (S44) a step of convolving the fourteenth function with the thirteenth function to obtain a fifteenth function; (S45) a step of multiplying the estimated luminance distribution of the PSF initial values by the fifteenth function to obtain an estimated luminance distribution of a restored PSF; (S46) a step of outputting the estimated luminance distribution of the restored PSF as the estimated luminance distribution of the PSF initial values and the final values of the estimated luminance distribution of the restored PSF; (S47) a single-iteration PSF restoring step, including steps (S40) to (S46), of executing one iteration sequentially in ascending order of the index on S; and (S48) a second PSF restoring computation step constituted of a series connection of a number of iterations of the single-iteration PSF restoring step S47, corresponding to the maximum number of iterations, and is characterized in that, in the second PSF restoring computation step, a number of iterations corresponding to the number of iterations of the single-iteration PSF restoring step connected in series are executed, and the final values of the estimated luminance distribution of the restored PSF output from the final iteration of the single-iteration PSF restoring step are output as a luminance distribution of the maximum-likelihood restored PSF.

A third invention according to the present invention is a second image restoring computation step as a second aspect of the first image restoring computation step constituting the first TV-video super-resolution processing method of the first invention. The third invention is the same as the invention described in Claim 3. The second aspect of the first image restoring computation step is characterized by including (S50) a third restored-image-initial-value correcting step, constituted of the same processing procedure as the first restored-image-initial-value correcting step, of correcting the estimated luminance distribution of the restored-image initial values on the basis of the image size of the luminance distribution of the maximum-likelihood restored PSF to obtain an estimated luminance distribution of the corrected-restored-image initial values; (S51) a step of convolving the luminance distribution of the maximum-likelihood restored PSF with the estimated luminance distribution of the corrected-restored-image initial values to obtain a sixteenth function; (S52) a step of inverting the sixteenth function to obtain a seventeenth function; (S53) a step of multiplying the seventeenth function by the luminance distribution of the degraded image to obtain an eighteenth function; (S54) a step of obtaining an inverted function of the luminance distribution of the maximum-likelihood restored PSF and setting the inverted function as a nineteenth function; (S55) a step of convolving the nineteenth function with the eighteenth function to obtain a twentieth function; (S56) a step of multiplying the estimated luminance distribution of the restored-image initial values by the twentieth function to obtain an estimated luminance distribution of the restored image; (S57) a step of outputting the estimated luminance distribution of the restored image as the estimated luminance distribution of the restored-image initial values and the final values of the estimated luminance distribution of the restored image; (S58) a single-iteration image restoring step, including steps (S50) to (S57), of executing one iteration sequentially in ascending order of the index on S; and (S59) a second image restoring computation step constituted of a series connection of a number of iterations of the single-iteration image restoring step, corresponding to the maximum number of iterations, and is characterized in that, in the second image restoring computation step, a number of iterations corresponding to the number of iterations of the single-iteration image restoring step connected in series are executed, and the final values of the estimated luminance distribution of the restored image output from the final iteration of the single-iteration image restoring step are output as a luminance distribution of the maximum-likelihood restored image.

A fourth invention according to the present invention is a second TV-video super-resolution processing method for restoring TV video by outputting super-resolution TV video signals obtained by reducing optical degradation in a frame constituting the TV video to restore the degraded frame to the pre-degradation frame. The fourth invention is the same as the invention described in Claim 4. The second TV-video super-resolution processing method is characterized by including (S60) a second PSF identifying step of identifying a PSF luminance distribution suitable for the degradation state of the TV video while the TV video is being viewed; (S61) a second degraded-image preparing step of preparing, from the TV video, a luminance distribution of a degraded image constituted of a single-frame luminance distribution; (S62) a fourth restored-image-initial-value correcting step, constituted of the same processing procedure as the first restored-image-initial-value correcting step, of copying the luminance distribution of the degraded image and setting the luminance distribution as an estimated luminance distribution of the restored-image initial values, and correcting the estimated luminance distribution of the restored-image initial values on the basis of the image size of the PSF luminance distribution to obtain an estimated luminance distribution of corrected-restored-image initial values; (S63) a step of setting the estimated luminance distribution of the corrected-restored-image initial values as a luminance distribution of the degraded image; (S64) a step of setting a maximum number of iterations; (S65) a step of resetting a counter that counts the number of iterations to 0; (S66) a step of convolving the identified PSF luminance distribution with the estimated luminance distribution of the corrected-restored-image initial values to obtain a twenty-first function; (S67) a step of inverting the twenty-first function to obtain a twenty-second function; (S68) a step of multiplying the twenty-second function by the luminance distribution of the degraded image to obtain a twenty-third function; (S69) a step of obtaining an inverted function of the PSF luminance distribution and setting the inverted function as a twenty-fourth function; (S70) a step of convolving the twenty-fourth function with the twenty-third function to obtain a twenty-fifth function; (S71) a step of multiplying the estimated luminance distribution of the restored-image initial values by the twenty-fifth function to obtain an estimated luminance distribution of the restored image; (S72) a step of substituting the estimated luminance distribution of the restored image for the estimated luminance distribution of the restored-image initial values; (S73) a step of incrementing the counter by 1; (S74) a step of testing a hypothesis that the value of the counter is greater than or equal to the maximum number of iterations, jumping to step (S75) if the test result is false, and jumping to step (S77) if the test result is true; (S75) a fifth restored-image-initial-value correcting step, constituted of the same processing procedure as the first restored-image-initial-value correcting step, of correcting the estimated luminance distribution of the restored-image initial values on the basis of the image size of the PSF luminance distribution to obtain an estimated luminance distribution of the corrected-restored-image initial values; (S76) a step of jumping to S66; (S77) a step of outputting the estimated luminance distribution of the restored image as a luminance distribution of a maximum-likelihood restored image; (S78) a second image-restoring computation preparing step constituted of steps (S60) to (S65); (S79) a third image restoring computation step constituted of steps (S66) to (S77); (S80) a second image restoring step, including the second image-restoring computation preparing step and the third image restoring computation step, of completing the maximum number of iterations by executing iterations in ascending order of the index on S and outputting the luminance distribution of the maximum-likelihood restored image; and (S81) a second TV-video rendering step of rendering the luminance distribution of the maximum-likelihood restored image having the maximized likelihood into TV video and outputting single-frame super-resolution TV video signals.

A fifth invention according to the present invention is a fourth image restoring computation step as a second aspect of the third image restoring computation step constituting the second TV-video super-resolution processing method of the fourth invention. The fifth invention is the same as the invention described in Claim 5. The second aspect of the third image restoring computation step is characterized by including (S85) a sixth restored-image-initial-value correcting step, constituted of the same processing procedure as the first restored-image-initial-value correcting step, of correcting the estimated luminance distribution of the restored-image initial values on the basis of the image size of the PSF luminance distribution to obtain an estimated luminance distribution of corrected-restored-image initial values; (S86) a step of convolving the PSF luminance distribution with the estimated luminance distribution of the restored-image initial values to obtain a twenty-sixth function; (S87) a step of inverting the twenty-sixth function to obtain a twenty-seventh function; (S88) a step of multiplying the twenty-seventh function by the luminance distribution of the degraded image to obtain a twenty-eighth function; (S89) a step of obtaining an inverted function of the PSF luminance distribution and setting the inverted function as a twenty-ninth function; (S90) a step of convolving the twenty-ninth function with the twenty-eighth function to obtain a thirtieth function; (S91) a step of multiplying the estimated luminance distribution of the restored-image initial values by the thirtieth function to obtain an estimated luminance distribution of the restored image; (S92) a step of outputting the estimated luminance distribution of the restored image as the estimated luminance distribution of the restored-image initial values and the final values of the estimated luminance distribution of the restored image; (S93) a second single-iteration image restoring step, including steps (S85) to (S92), of executing one iteration sequentially in ascending order of the index on S; and (S94) a fourth image restoring computation step constituted of a series connection of a number of iterations of the second single-iteration image restoring step, corresponding to the maximum number of iterations, and is characterized in that, in the fourth image restoring computation step, a number of iterations corresponding to the number of iterations of the second single-iteration image restoring step connected in series are executed, and the final values of the estimated luminance distribution of the restored image output from the final iteration of the second single-iteration image restoring step are output as a luminance distribution of the maximum-likelihood restored image.

A sixth invention according to the present invention is a fifth image restoring computation step as a third aspect of the third image restoring computation step constituting the second TV-video super-resolution processing method of the fourth invention. The sixth invention is the same as the invention described in Claim 6. The third aspect of the third image restoring computation step is characterized by including (S100) a step of resetting the counter that counts the number of iterations; (S101) a step of testing a hypothesis that the value of the counter is not 0, jumping to (S102) if the test result is false, and jumping to (S103) if the test result is true; (S102) a step of transferring the luminance distribution of the degraded image to a buffer for saving the luminance distribution of the degraded image and to a buffer for the estimated luminance distribution of the restored-image initial values; (S103) a step of loading the estimated luminance distribution of the restored-image initial values from the buffer for the estimated luminance distribution of the restored-image initial values; (S104) a seventh restored-image-initial-value correcting step, constituted of the same processing procedure as the first restored-image-initial-value correcting step, of correcting the estimated luminance distribution of the restored-image initial values on the basis of the image size of the PSF luminance distribution to obtain an estimated luminance distribution of corrected-restored-image initial values; (S105) a step of convolving the PSF luminance distribution with the estimated luminance distribution of the corrected-restored-image initial values to obtain a thirty-first function; (S106) a step of inverting the thirty-first function to obtain a thirty-second function; (S107) a step of multiplying the thirty-second function with the luminance distribution of the degraded image to obtain a thirty-third function; (S108) a step of obtaining an inverted function of the PSF luminance distribution and setting the inverted function as a thirty-fourth function; (S109) a step of convolving the thirty-fourth function with the thirty-third function to obtain a thirty-fifth function; (S100) a step of multiplying the estimated luminance distribution of the restored-image initial values by the thirty-fifth function to obtain an estimated luminance distribution of the restored image; (S111) a step of incrementing the counter by 1; (S112) a step of testing a hypothesis that the value of the counter has exceeded the maximum number of iterations, jumping to (S113) if the test result is false, and jumping to (S115) if the test result is true; (S113) a step of transferring the estimated luminance distribution of the restored image to the buffer for the estimated luminance distribution of the restored-image initial values; (S114) a step of jumping to (S103); (S115) a step of outputting the estimated luminance distribution of the restored image as the luminance distribution of the maximum-likelihood restored image; and (S116) a fifth image restoring computation step, including steps (S110) to (S115), of completing the maximum number of iterations by executing iterations sequentially in ascending order of the index on S and outputting the luminance distribution of the maximum-likelihood restored image.

A seventh invention according to the present invention relates to the first PSF identifying step constituting the first TV-video super-resolution processing method of the first invention and the second PSF identifying step constituting the second TV-video super-resolution processing method of the fourth invention. The first PSF identifying step and the second PSF identifying step are characterized by including (S120) a step of setting a degradation index corresponding to the degree of optical degradation of TV video displayed on a monitor; and (S121) a step of extracting a PSF luminance distribution associated with the degradation index from a PSF luminance distribution database and outputting the PSF luminance distribution. The seventh invention is the same as the invention described in Claim 7.

An eighth invention according to the present invention relates to the first degraded-image preparing step constituting the first TV-video super-resolution processing method of the first invention and the second degraded-image preparing step constituting the second TV-video super-resolution processing method of the fourth invention. The first degraded-image preparing step and the second degraded-image preparing step are characterized by including (S130) an RGB-signal extracting step of extracting RGB signals constituting a frame from TV video signals for the frame; (S131) a delaying step of outputting, with a delay corresponding to one frame, the TV video signals remaining after extracting the RGB signals from the TV video signals for the frame; (S132) a YUV conversion step of subjecting the RGB signals to YUV conversion to obtain YUV signals; (S133) a Y-degraded-image extracting step of extracting a luminance distribution of a degraded image constituted of only Y signals representing luminance components among the YUV signals to obtain a luminance distribution of a Y degraded image and keeping a distribution of a U degraded image constituted of only the remaining U signals and a distribution of a V degraded image constituted of only the remaining V signals; and (S134) a degamma processing step of executing degamma processing of the luminance distribution of the Y degraded image to obtain and output a luminance distribution of a degraded image constituted of a single-frame luminance distribution. The eighth invention is the same as the invention described in Claim 8.

A ninth invention according to the present invention relates to the first TV-video rendering step constituting the first TV-video super-resolution processing method of the first invention and the second TV-video rendering step constituting the second TV-video super-resolution processing method of the fourth invention. The first TV-video rendering step and the second TV-video rendering step are characterized by including (S140) a gamma processing step of executing gamma processing of the luminance distribution of the maximum-likelihood restored image; (S141) a restored-image combining step of combining the distribution of the U degraded image and the distribution of the V degraded image kept in the Y-degraded-image extracting step with the luminance distribution of the maximum-likelihood restored image after the gamma processing constituted of Y components to obtain a distribution of a single YUV restored image; (S142) an RGB conversion step of executing RGB conversion of the distribution of the YUV restored image to obtain a distribution of an RGB restored image; (S143) an RGB-signal conversion step of reading the distribution of the RGB restored image and outputting RGB signals; and (S144) a TV-video-signal combining step of combining the RGB signals with the TV video signals for the frame excluding the RGB signals, output in the delaying step, to obtain and output single-frame super-resolution TV video signals. The ninth invention is the same as the invention described in Claim 9.

A tenth invention according to the present invention relates to the PSF luminance distributions constituting the first TV-video super-resolution processing methods, which are the first to third inventions, and the PSF luminance distributions constituting the second TV-video super-resolution processing methods, which are the fourth and fifth inventions. The PSF luminance distributions are characterized by being constituted of frameless square pixels of the same size, constituting two-dimensional normal distributions in which the centers are brightest, and having a size of 5×5 pixels. The tenth invention is the same as the invention described in Claim 10.

An eleventh invention according to the present invention is a first super-resolution processing program for executing all the steps in the first PSF restoring step and the first image restoring step constituting the first TV-video super-resolution processing method of the first invention. The eleventh invention is the same as the invention described in Claim 11.

A twelfth invention according to the present invention is a second super-resolution processing program for executing all the steps in the PSF-restoring-computation preparing step, the second PSF restoring computation step, and the first image restoring step constituting the first TV-video super-resolution processing methods of the first and second inventions. The twelfth invention is the same as the invention described in Claim 12.

A thirteenth invention according to the present invention is a third super-resolution processing program for executing all the steps in the first PSF restoring step, the first image-restoring computation preparing step, and the second image restoring computation step constituting the first TV-video super-resolution processing methods of the first to third inventions. The thirteenth invention is the same as the invention described in Claim 13.

A fourteenth invention according to the present invention is a fourth super-resolution processing program for executing all the steps in the PSF-restoring-computation preparing step, the second PSF restoring computation step, the first image-restoring computation preparing step, and the second image restoring computation step constituting the first TV-video super-resolution processing methods of the first to third inventions. The fourteenth invention is the same as the invention described in Claim 14.

A fifteenth invention according to the present invention is a fifth super-resolution processing program for executing all the steps in the second image restoring step constituting the second TV-video super-resolution processing method of the fourth invention. The fifteenth invention is the same as the invention described in Claim 15.

A sixteenth invention according to the present invention is a sixth super-resolution processing program for executing all the steps in the second image-restoring computation preparing step and the fourth image restoring computation step constituting the second super-resolution processing methods of the fourth and fifth inventions. The sixteenth invention is the same as the invention described in Claim 16.

A seventeenth invention according to the present invention is a seventh super-resolution processing program for executing all the steps in the second image-restoring computation preparing step and the fifth image restoring computation step constituting the second super-resolution processing methods of the fourth and sixth inventions. The seventeenth invention is the same as the invention described in Claim 17.

An eighteenth invention according to the present invention is a first TV-video super-resolution processing device that restores, by using the first TV-video super-resolution processing methods of the first and seventh to tenth inventions, TV video by outputting super-resolution TV video signals obtained by reducing optical degradation in a frame constituting the TV video to restore the degraded frame to the pre-degradation frame. The first TV-video super-resolution processing device is characterized by including (W1) a first degraded-image preparing means for preparing, from the TV video, a luminance distribution of a degraded image constituted of a single-frame luminance distribution; (W2) a means for setting the luminance distribution of the degraded image as an estimated luminance distribution of restored-image initial values; (W3) a first PSF identifying means for identifying a PSF luminance distribution; (W4) a means for setting the identified PSF luminance distribution as an estimated luminance distribution of PSF initial values; (W5)

a means for setting a maximum number of iterations; (W6) a means for resetting a counter that counts the number of iterations; (W7) a first restored-image-initial-value correcting means for copying the estimated luminance distribution of the restored-image initial values and setting the estimated luminance distribution as an estimated luminance distribution of corrected-restored-image initial values and, when convolving the PSF luminance distribution with the estimated luminance distribution of the corrected-restored-image initial values, calculating a region where computation is difficult, the region occurring in a peripheral region in the estimated luminance distribution of the corrected-restored-image initial values, on the basis of the image size of the PSF luminance distribution, copying the pixels in the region where computation is difficult, and pasting the copied pixels to the outside of the boundary of the estimated luminance distribution of the corrected-restored-image initial values in mirror symmetry with respect to the boundary, thereby correcting the estimated luminance distribution of the corrected-restored-image initial values to obtain an estimated luminance distribution of the corrected-restored-image initial values; (W8) a means for setting the estimated luminance distribution of the corrected-restored-image initial values as a luminance distribution of the degraded image; (W9) a means for convolving the estimated luminance distribution of the PSF initial values with the estimated luminance distribution of the corrected-restored-image initial values to obtain a thirty-sixth function; (W10) a means for inverting the thirty-sixth function to obtain a thirty-seventh function; (W11) a means for multiplying the thirty-seventh function by the luminance distribution of the degraded image to obtain a thirty-eighth function; (W12) a means for obtaining an inverted function of the estimated luminance distribution of the corrected-restored-image initial values and setting the inverted function as a thirty-ninth function; (W13) a means for convolving the thirty-ninth function with the thirty-eighth function to obtain a fortieth function; (W14) a means for multiplying the estimated luminance distribution of the PSF initial values by the fortieth function to obtain an estimated luminance distribution of a restored PSF; (W15) a means for substituting the estimated luminance distribution of the restored PSF for the estimated luminance distribution of the PSF initial values; (W16) a means for incrementing the counter by 1; (W17) a means for testing a hypothesis that the value of the counter has exceeded the maximum number of iterations, returning to means (W9) if the test result is false, and outputting the estimated luminance distribution of the restored PSF as a luminance distribution of a maximum-likelihood restored PSF if the test result is true; (W18) a PSF-restoring-computation preparing means constituted of means (W1) to (W8); and (W19) a first PSF restoring computation means constituted of means (W9) to (W17), is also characterized by including: (W20) a first PSF restoring means for completing the maximum number of iterations by executing iterations in ascending order of the index on S in the PSF-restoring-computation preparing means and the first PSF restoring computation means and outputting the luminance distribution of the maximum-likelihood restored PSF; (W21) a means for resetting the counter and jumping to (W23); (W22) a second restored-image-initial-value correcting means, constituted of the same processing procedure as the first restored-image-initial-value correcting means, for correcting the estimated luminance distribution of the restored-image initial values on the basis of the image size of the luminance distribution of the maximum-likelihood restored PSF to obtain an estimated luminance distribution of the corrected-restored-image initial values; (W23) a means for convolving the luminance distribution of the maximum-likelihood restored PSF with the estimated luminance distribution of the corrected-restored-image initial values to obtain a forty-first function; (W24) a means for inverting the forty-first function to obtain a forty-second function; (W25) a means for multiplying the forty-second function by the luminance distribution of the degraded image to obtain a forty-third function; (W26) a means for obtaining an inverted function of the luminance distribution of the maximum-likelihood restored PSF and setting the inverted function as a forty-fourth function; (W27) a means for convolving the forty-fourth function with the forty-third function to obtain a forty-fifth function; (W28) a means for multiplying the estimated luminance distribution of the restored-image initial values by the forty-fifth function to obtain an estimated luminance distribution of the restored image; (W29) a means for substituting the estimated luminance distribution of the restored image for the estimated luminance distribution of the restored-image initial values; (W30) a means for incrementing the counter by 1; (W31) a means for testing a hypothesis that the value of the counter has exceeded the maximum number of iterations, returning to means (W22) if the test result is false, and outputting the estimated luminance distribution of the restored image as a luminance distribution of a maximum-likelihood restored image if the test result is true; (W32) a first image-restoring computation preparing means constituted of means (W21); and (W33) a first image restoring computation means constituted of means (W22) to (W31), and is also characterized by including (W34) a first image restoring means for completing the maximum number of iterations by executing iterations in ascending order of the index on S in the first image-restoring computation preparing means and the first image restoring computation means and outputting the luminance distribution of the maximum-likelihood restored image; and (W35) a first TV-video rendering means for rendering the luminance distribution of the maximum-likelihood restored image into TV video and outputting single-frame super-resolution TV video signals. The eighteenth invention is the same as the invention described in Claim 18.

A nineteenth invention according to the present invention relates to a second aspect of the first PSF restoring means constituting the first TV-video super-resolution processing device of the eighteenth invention. The second aspect of the first PSF restoring means is characterized by including (W40) a means for convolving the estimated luminance distribution of the PSF initial values with the estimated luminance distribution of the corrected-restored-image initial values to obtain a forty-sixth function; (W41) a means for inverting the forty-sixth function to obtain a forty-seventh function; (W42) a means for multiplying the forty-seventh function by the luminance distribution of the degraded image to obtain a forty-eighth function; (W43) a means for obtaining an inverted function of the estimated luminance distribution of the corrected-restored-image initial values and setting the inverted function as a forty-ninth function; (W44) a means for convolving the forty-ninth function with the forty-eighth function to obtain a fiftieth function; (W45) a means for multiplying the estimated luminance distribution of the PSF initial values by the fiftieth function to obtain an estimated luminance distribution of a restored PSF; (W46) a means for outputting the estimated luminance distribution of the restored PSF as the estimated luminance distribution of the PSF initial values and the final values of the estimated luminance distribution of the restored PSF; (W47) a single-iteration PSF restoring means, including means (W40) to (W46), for executing one iteration sequentially in ascending order of the index on S; and (W48) a second PSF restoring computation means constituted of a series connection of a number of stages of the single-iteration PSF restoring means, corresponding to the maximum number of iterations, and is characterized in that, in the second PSF restoring computation means, a number of iterations corresponding to the number of stages of the single-iteration PSF restoring means connected in series are executed, and the final values of the estimated luminance distribution of the restored PSF output from the final stage of the single-iteration PSF restoring means are output as a luminance distribution of the maximum-likelihood restored PSF. The nineteenth invention is the same as the invention described in Claim 19.

A twentieth invention according to the present invention relates to a second aspect of the first image restoring means constituting the first TV-video super-resolution processing device of the eighteenth invention. The second aspect of the first image restoring means is characterized by including (W50) a third restored-image-initial-value correcting means, constituted of the same configuration as the first restored-image-initial-value correcting means; for correcting the estimated luminance distribution of the restored-image initial values on the basis of the image size of the luminance distribution of the maximum-likelihood restored PSF to obtain an estimated luminance distribution of the corrected-restored-image initial values; (W51) a means for convolving the luminance distribution of the maximum-likelihood restored PSF with the estimated luminance distribution of the corrected-restored-image initial values to obtain a fifty-first function; (W52) a means for inverting the fifty-first function to obtain a fifty-second function; (W53) a means for multiplying the fifty-second function by the luminance distribution of the degraded image to obtain a fifty-third function; (W54) a means for obtaining an inverted function of the luminance distribution of the maximum-likelihood restored PSF and setting the inverted function as a fifty-fourth function; (W55) a means for convolving the fifty-fourth function with the fifty-third function to obtain a fifty-fifth function; (W56) a means for multiplying the estimated luminance distribution of the restored-image initial values by the fifty-fifth function to obtain an estimated luminance distribution of the restored image; (W57) a means for outputting the estimated luminance distribution of the restored image as the estimated luminance distribution of the restored-image initial values and the final values of the estimated luminance distribution of the restored image; (W58) a single-iteration image restoring means, including means (W50) to (W57), for executing one iteration sequentially in ascending order of the index on S; and (W59) a second image restoring computation means constituted of a series connection of a number of stages of the single-iteration image restoring means, corresponding to the maximum number of iterations, and is characterized in that, in the second image restoring computation means, a number of iterations corresponding to the number of stages of the single-iteration image restoring means connected in series are executed, and the final values of the estimated luminance distribution of the restored image output from the final stage of the single-iteration image restoring means are output as a luminance distribution of the maximum-likelihood restored image. The twentieth invention is the same as the invention described in Claim 20.

A twenty-first invention according to the present invention is a second TV-video super-resolution processing device that restores, by using the second TV-video super-resolution processing methods of the fourth and seventh to tenth inventions, TV video by outputting super-resolution TV video signals obtained by reducing optical degradation in a frame constituting the TV video to restore the degraded frame to the pre-degradation frame. The second TV-video super-resolution processing device is characterized by including (W60) a second PSF identifying means for identifying a PSF luminance distribution suitable for the degradation state of the TV video while the TV video is being viewed; (W61) a second degraded-image preparing means for preparing, from the TV video, a luminance distribution of a degraded image constituted of a single-frame luminance distribution; (W62) a fourth restored-image-initial-value correcting means, constituted of the same processing procedure as the first restored-image-initial-value correcting means, of copying the luminance distribution of the degraded image and setting the luminance distribution as an estimated luminance distribution of the restored-image initial values, and correcting the estimated luminance distribution of the restored-image initial values on the basis of the image size of the PSF luminance distribution to obtain an estimated luminance distribution of corrected-restored-image initial values; (W63) a means for setting the estimated luminance distribution of the corrected-restored-image initial values as a luminance distribution of the degraded image; (W64) a means for setting a maximum number of iterations; (W65) a means for resetting a counter that counts the number of iterations to 0; (W66) a means for convolving the identified PSF luminance distribution with the estimated luminance distribution of the corrected-restored-image initial values to obtain a twenty-first function; (W67) a means for inverting the twenty-first function to obtain a twenty-second function; (W68) a means for multiplying the twenty-second function by the luminance distribution of the degraded image to obtain a twenty-third function; (W69) a means for obtaining an inverted function of the PSF luminance distribution and setting the inverted function as a twenty-fourth function; (W70) a means for convolving the twenty-fourth function with the twenty-third function to obtain a twenty-fifth function; (W71) a means for multiplying the estimated luminance distribution of the restored-image initial values by the twenty-fifth function to obtain an estimated luminance distribution of the restored image; (W72) a means for substituting the estimated luminance distribution of the restored image for the estimated luminance distribution of the restored-image initial values; (W73) a means for incrementing the counter by 1; (W74) a means for testing a hypothesis that the value of the counter is greater than or equal to the maximum number of iterations, jumping to means (W75) if the test result is false, and jumping to means (W77) if the test result is true; (W77) a fifth restored-image-initial-value correcting means, constituted of the same processing procedure as the first restored-image-initial-value correcting means, for correcting the estimated luminance distribution of the restored-image initial values on the basis of the image size of the PSF luminance distribution to obtain an estimated luminance distribution of the corrected-restored-image initial values; (W76) a means for jumping to W66; (W77) a means for outputting the estimated luminance distribution of the restored-image as a luminance distribution of a maximum-likelihood restored image; (W78) a second image-restoring computation preparing means constituted of means (W60) to (W65); (W79) a third image restoring computation means constituted of means (W66) to (W78); (W80) a second image restoring means, including the second image-restoring computation preparing means and the third image restoring computation means, of completing the maximum number of iterations by executing iterations in ascending order of the index on S and outputting the luminance distribution of the maximum-likelihood restored image; and (W81) a second TV-video rendering means for rendering the luminance distribution of the maximum-likelihood restored image into TV video and outputting single-frame super-resolution TV video signals. The twenty-first invention is the same as the invention described in Claim 21.

A twenty-second invention according to the present invention relates to a second aspect of the third image restoring means constituting the second TV-video super-resolution processing device of the twenty-first invention. The second aspect of the third image restoring means is characterized by including (W85) a sixth restored-image-initial-value correcting means, constituted of the same processing procedure as the first restored-image-initial-value correcting means, for correcting the estimated luminance distribution of the restored-image initial values on the basis of the image size of the PSF luminance distribution to obtain an estimated luminance distribution of corrected-restored-image initial values; (W86) a means for convolving the PSF luminance distribution with the estimated luminance distribution of the corrected restored-image initial values to obtain a sixty-first function; (W87) a means for inverting the sixty-first function to obtain a sixty-second function; (W88) a means for multiplying the sixty-second function by the luminance distribution of the degraded image to obtain a sixty-third function; (W89) a means for obtaining an inverted function of the PSF luminance distribution and setting the inverted function as a sixty-fourth function; (W90) a means for convolving the sixty-fourth function with the sixty-third function to obtain a sixty-fifth function; (W91) a means for multiplying the estimated luminance distribution of the restored-image initial values by the sixty-fifth function to obtain an estimated luminance distribution of the restored image; (W92) a means for outputting the estimated luminance distribution of the restored image as the estimated luminance distribution of the restored-image initial values and the final values of the estimated luminance distribution of the restored image; (W93) a second single-iteration image restoring means, including means (W85) to (W92), for executing one iteration sequentially in ascending order of the index on S; and (W94) a fourth image restoring computation means constituted of a series connection of a number of stages of the second single-iteration image restoring means, corresponding to the maximum number of iterations, and is characterized in that, in the fourth image restoring computation means, a number of iterations corresponding to the number of stages of the second single-iteration image restoring means connected in series are executed, and the final values of the estimated luminance distribution of the restored image output from the final stage of the second single-iteration image restoring means are output as a luminance distribution of the maximum-likelihood restored image. The twenty-second invention is the same as the invention described in Claim 22.

A twenty-third invention according to the present invention relates to a third aspect of the third image restoring means constituting the second TV-video super-resolution processing device of the twenty-first invention. The third aspect of the third image restoring means is characterized by including (W100) a means for resetting the counter that counts the number of iterations; (W101) a means for testing a hypothesis that the value of the counter is not 0, jumping to (W102) if the test result is false, and jumping to (W103) if the test result is true; (W102) a means for transferring the luminance distribution of the degraded image to a buffer for saving the luminance distribution of the degraded image and to a buffer for the estimated luminance distribution of the restored-image initial values; (W103) a means for loading the estimated luminance distribution of the restored-image initial values from the buffer for the estimated luminance distribution of the restored-image initial values; (W104) a seventh restored-image-initial-value correcting means, constituted of the same processing procedure as the first restored-image-initial-value correcting means, for correcting the estimated luminance distribution of the restored-image initial values on the basis of the image size of the PSF luminance distribution to obtain an estimated luminance distribution of corrected-restored-image initial values; (W105) a means for convolving the PSF luminance distribution with the estimated luminance distribution of the corrected-restored-image initial values to obtain a thirty-first function; (W106) a means for inverting the thirty-first function to obtain a thirty-second function; (W107) a means for multiplying the thirty-second function with the luminance distribution of the degraded image to obtain a thirty-third function; (W108) a means for obtaining an inverted function of the PSF luminance distribution and setting the inverted function as a thirty-fourth function; (W109) a means for convolving the thirty-fourth function with the thirty-third function to obtain a thirty-fifth function; (W110) a means for multiplying the estimated luminance distribution of the restored-image initial values by the thirty-fifth function to obtain an estimated luminance distribution of the restored image; (W111) a means for incrementing the counter by 1; (W112) a means for testing a hypothesis that the value of the counter has exceeded the maximum number of iterations, jumping to (W113) if the test result is false, and jumping to (W115) if the test result is true; (W113) a means for transferring the estimated luminance distribution of the restored image to the buffer for the estimated luminance distribution of the restored-image initial values; (W114) a means for jumping to (W103); (W115) a means for outputting the estimated luminance distribution of the restored image as the luminance distribution of the maximum-likelihood restored image; and (W116) a fifth image restoring computation means, including means (W100) to (W115), for completing the maximum number of iterations by executing iterations sequentially in ascending order of the index on S and outputting the luminance distribution of the maximum-likelihood restored image. The twenty-third invention is the same as the invention described in Claim 23.

A twenty-fourth invention according to the present invention relates to the first PSF identifying means constituting the first TV-video super-resolution processing device of the eighteenth invention and the second PSF identifying means constituting the second TV-video super-resolution processing device of the twenty-first invention. The first PSF identifying means and the second PSF identifying means are characterized by including (W120) a means for setting a degradation index corresponding to the degree of optical-degradation of TV video displayed on a monitor; and (W121) a means for extracting a PSF luminance distribution associated with the degradation index from a PSF database. The twenty-fourth invention is the same as the invention described in Claim 24.

A twenty-fifth invention according to the present invention relates to the first degraded-image preparing means constituting the first TV-video super-resolution processing device of the eighteenth invention and the second degraded-image preparing means constituting the second TV-video super-resolution processing device of the twenty-first invention. The first degraded-image preparing means and the second degraded-image preparing means are characterized by including (W130) an RGB-signal extracting means for extracting RGB signals constituting a frame from TV video signals for the frame; (W131) a delaying means for outputting, with a delay corresponding to one frame, the TV video signals remaining after extracting the RGB signals from the TV video signals for the frame; (W132) a YUV conversion means for subjecting the RGB signals to YUV conversion to obtain YUV signals; (W133) a Y-degraded-image extracting means for extracting a luminance distribution of a degraded image constituted of only Y signals representing luminance components among the YUV signals to obtain a luminance distribution of a Y degraded image and keeping a distribution of a U degraded image constituted of only the remaining U signals and a distribution of a V degraded image constituted of only the remaining V signals; and (W134) a degamma processing means for executing degamma processing of the luminance distribution of the Y degraded image to obtain and output a luminance distribution of a degraded image constituted of a single-frame luminance distribution. The twenty-fifth invention is the same as the invention described in Claim 25.

A twenty-sixth invention according to the present invention relates to the first TV-video rendering means constituting the first TV-video super-resolution processing device of the eighteenth invention and the second TV-video rendering means constituting the second TV-video super-resolution processing device of the twenty-first invention. The first TV-video rendering means and the second TV-video rendering means are characterized by including (W140) a gamma processing means for executing gamma processing of the luminance distribution of the maximum-likelihood restored image; (W141) a restored-image combining means for combining the distribution of the U degraded image and the distribution of the V degraded image kept by the Y-degraded-image extracting means with the luminance distribution of the maximum-likelihood restored image after the gamma processing constituted of Y components to obtain a distribution of a single YUV restored image; (W142) an RGB conversion means for executing RGB conversion of the distribution of the YUV restored image to obtain a distribution of an RGB restored image; (W143) an RGB-signal conversion means for reading the distribution of the RGB restored image and outputting RGB signals; and (W144) a TV-video-signal combining means for combining the RGB signals with the TV video signals for the frame excluding the RGB signals, output by the delaying means, to obtain and output single-frame super-resolution TV video signals. The twenty-sixth invention is the same as the invention described in Claim 26.

A twenty-seventh invention according to the present invention is a first super-resolution processing device program for implementing all the means in the first PSF restoring means and the first image restoring means constituting the first TV-video super-resolution processing device of the eighteenth invention and for executing all these means. The twenty-seventh invention is the same as the invention described in Claim 27.

A twenty-eighth invention according to the present invention is a second super-resolution processing device program for implementing all the means in the PSF-restoring-computation preparing means, the second PSF restoring computation means, and the first image restoring means constituting the first TV-video super-resolution processing devices of the eighteenth and nineteenth inventions and for executing all these means. The twenty-eighth invention is the same as the invention described in Claim 28.

A twenty-ninth invention according to the present invention is a third super-resolution processing device program for implementing all the means in the first PSF restoring means, the first image-restoring computation preparing means, and the second image restoring computation means constituting the first TV-video super-resolution processing devices of the eighteenth and twentieth inventions and for executing all these means. The twenty-ninth invention is the same as the invention described in Claim 29.

A thirtieth invention according to the present invention is a fourth super-resolution processing device program for implementing all the means in the PSF-restoring-computation preparing means, the second PSF restoring computation means, the first image-restoring computation preparing means, and the second image restoring computation means constituting the first TV-video super-resolution processing devices of the eighteenth to twentieth inventions and for executing all these means. The thirtieth invention is the same as the invention described in Claim 30.

A thirty-first invention according to the present invention is a fifth super-resolution processing device program for implementing all the means in the second image restoring means constituting the second TV-video super-resolution processing device of the twenty-first invention and for executing all these means. The thirty-first invention is the same as the invention described in Claim 31.

A thirty-second invention according to the present invention is a sixth super-resolution processing device program for implementing all the means in the second image-restoring computation preparing means and the fourth image restoring computation means constituting the second TV-video super-resolution processing devices of the twenty-first and twenty-second inventions and for executing all these means. The thirty-second invention is the same as the invention described in Claim 32.

A thirty-third seventh invention according to the present invention is a super-resolution processing device program for implementing all the means in the second image-restoring computation preparing means and the fifth image restoring computation means constituting the second TV-video super-resolution processing devices of the twenty-first and twenty-second inventions and for executing all these means. The thirty-third invention is the same as the invention described in Claim 33.

A thirty-fourth invention according to the present invention is a first storage medium that can be connected to a computer and that can be read by the computer, wherein the first super-resolution processing program, the second super-resolution processing program, the third super-resolution processing program, and the fourth super-resolution processing program for executing the first TV-video super-resolution processing methods of the eleventh to fourteenth inventions are individually encrypted and individually stored, and these programs are individually read and decrypted before being provided when the first storage medium is read.

A thirty-fifth invention according to the present invention is a second storage medium that can be connected to a computer and that can be read by the computer, wherein the fifth super-resolution processing program, the sixth super-resolution processing program, and the seventh super-resolution processing program for executing the second TV-video super-resolution processing methods of the fifteenth to seventeenth inventions are individually encrypted and individually stored, and these programs are individually read and decrypted before being provided when the second storage medium is read.

A thirty-sixth invention according to the present invention is a third storage medium that can be connected to a computer and that can be read by the computer, wherein the eighth super-resolution processing program, the ninth super-resolution processing program, the tenth super-resolution processing program, and the eleventh super-resolution processing program for implementing all the means in the first TV-video super-resolution processing devices of the twenty-seventh to thirties inventions and for executing all these means are individually encrypted and individually stored, and these programs are individually read and decrypted before being provided when the third storage medium is read.

A thirty-seventh invention according to the present invention is a fourth storage medium that can be connected to a computer and that can be read by the computer, wherein the twelfth super-resolution processing program, the thirteenth super-resolution processing program, and the fourteenth super-resolution processing program for implementing all the means in the second TV-video super-resolution processing devices of the thirty-first to thirty-third inventions and for executing all these means are individually encrypted and individually stored, and these programs are individually read and decrypted before being provided when the fourth storage medium is read.

Advantageous Effects of Invention

It has not hitherto been possible to restore an image only from information about one frame of TV video and to continuously execute this computation so as to enable super-resolution processing of TV video. By applying the present invention, an advantage is afforded in that processing will be enabled substantially in real time. Furthermore, since the present invention is applicable irrespective of the type of radiation source for TV video, for example, video acquired by using an infrared camera or an X-ray camera may be used. That is, another advantage is afforded in that the range of applications is broad.

BRIEF DESCRIPTION OF DRAWINGS

FIG. 1 is a drawing showing an example of optically degraded information included in a frame constituting actual TV video.

FIG. 14 FIGS. 14A and 14B are diagrams showing an example relating to the configuration of a first TV-video super-resolution processing device of an eighteenth invention according to the present invention.

DESCRIPTION OF EMBODIMENTS

Figure 2:
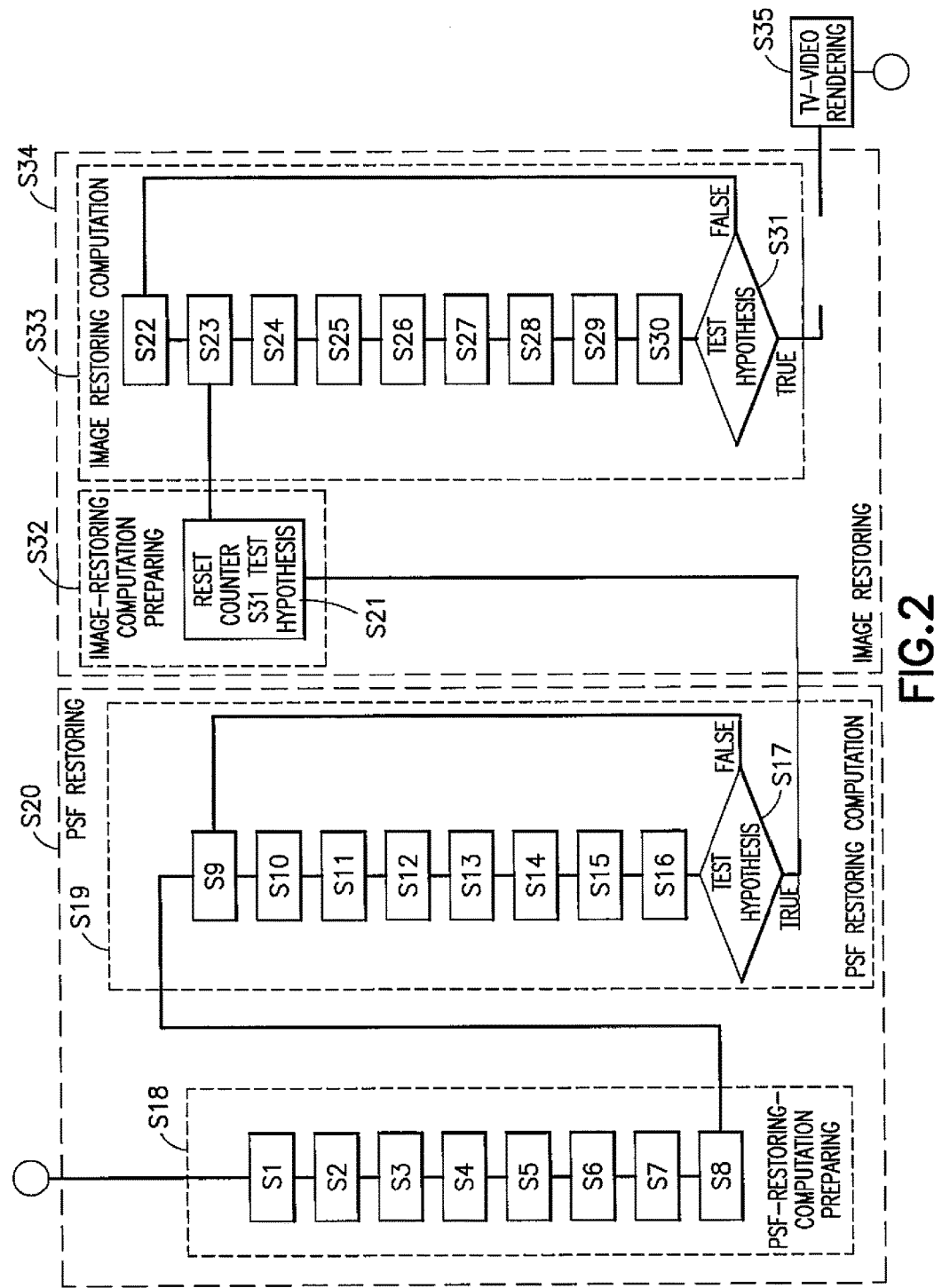
FIG. 2 is a flowchart showing an example of a processing procedure in a first TV-video super-resolution processing method of a first invention according to the present invention.

The best mode for carrying out the present invention will be described with reference to the drawings as appropriate.

In the present invention, a degraded image, a PSF, and a restored image are individually constituted of an array of frameless square pixels of the same size. Each of the pixels is an RGB color pixel composed of a primary red component (R) having an 8-bit depth, a primary green component (G) having an 8-bit depth, and a primary blue component (B) having an 8-bit depth. In the case where a pixel has the same number of bits for the RGB components, the pixel becomes a grayscale pixel. In the present invention, a PSF is composed of only grayscale pixels.

In the present invention, in a degraded image, a PSF, and a restored image, the pixel at the top left corner is considered as the origin, an axis that is parallel to a row of pixels including the origin and extending along the horizontal direction without changing the row is considered as the x axis, and an axis that is parallel to a column of pixels including the origin and extending along the vertical direction without changing the column is considered as the y axis. All the pixels in a degraded image, a PSF, and a restored image can be designated by two-dimensional coordinates (x, y).

In the present invention, a degraded image and a restored image have the same image size and the same coordinates. In the present invention, however, since cases where an image is blurred to such an extent that it is unrecognizable are not considered, the peripheral region in a PSF is substantially zero, and in order to reduce the number of calculations, it is presupposed that the assumption holds true that the PSF luminance distribution does not change regardless of its position in a degraded image and a restored image. The PSF size used is 5×5 pixels. Obviously, the PSF size may be any size not larger than the size of a degraded image.

In the present invention, only PSFs, degraded images, and restored images individually composed of luminance components are handled, and only luminance components' are used in restoring computations. This is because this results in a reduction in the number of computations but does not cause changes in hue. It has been confirmed that the quality of super-resolution processing according to the method of the present invention is comparable to that in the case where the R, G, and B components are restored individually.

In the present invention, a PSF, a degraded image, and a restored image are individually composed of luminance components. Thus, these are individually referred to as a PSF luminance distribution, a luminance distribution of a degraded image, and an estimated luminance distribution of a restored image. A luminance distribution of a restored image is referred to as an estimated luminance distribution since an accurate luminance distribution of a restored image is unknown. When an image is restored by a TV-video accelerated super-resolution processing method according to the present invention, a restored image substantially converges to a state without optical degradation and is substantially comparable to an original image. Thus, a luminance distribution of a maximum-likelihood restored image is referred to as a luminance distribution.

FIG. 2 shows, in the form of a flowchart, an example of a processing procedure in a first TV-video super-resolution processing method of a first invention according to the present invention.

The first TV-video super-resolution processing method of the first invention according to the present invention is characterized by including (S1) a first degraded-image preparing step of preparing, from the TV video 2, a luminance distribution 1 of a degraded image constituted of a single-frame luminance distribution; (S2) a step of setting the luminance distribution 1 of the degraded image as an estimated luminance distribution 3 of restored-image initial values; (S3) a first PSF identifying step of identifying a PSF luminance distribution 4; (S4) a step of setting the identified PSF luminance distribution 4 as an estimated luminance distribution 5 of PSF initial values; (S5) a step of setting a maximum number of iterations 6; (S6) a step of resetting a counter that counts the number of iterations; (S7) a first restored-image-initial-value correcting step of copying the estimated luminance distribution 3 of the restored-image initial values and setting the estimated luminance distribution 3 as an estimated luminance distribution 7 of corrected-restored-image initial values and, when convolving the PSF luminance distribution 4 with the estimated luminance distribution 7 of the corrected-restored-image initial values, calculating a region 8 where computation is difficult, the region 8 occurring in a peripheral region in the estimated luminance distribution 7 of the corrected-restored-image initial values, on the basis of the image size of the PSF luminance distribution, copying the pixels in the region 8 where computation is difficult, and pasting the copied pixels to the outside of the boundary of the estimated luminance distribution 7 of the corrected-restored-image initial values in mirror symmetry with respect to the boundary, thereby correcting the estimated luminance distribution 7 of the corrected-restored-image initial values; (S8) a step of setting the estimated luminance distribution 7 of the corrected-restored-image initial values as a luminance distribution 1 of the degraded image; (S9) a step of convolving the estimated luminance distribution 5 of the PSF initial values with the estimated luminance distribution 7 of the corrected-restored-image initial values to obtain a first function; (S10) a step of inverting the first function to obtain a second function; (S11) a step of multiplying the second function by the luminance distribution 1 of the degraded image to obtain a third function; (S12) a step of obtaining an inverted function of the estimated luminance distribution 7 of the corrected-restored-image initial values and setting the inverted function as a fourth function; (S13) a step of convolving the fourth function with the third function to obtain a fifth function; (S14) a step of multiplying the estimated luminance distribution 5 of the PSF initial values by the fifth function to obtain an estimated luminance distribution 9 of a restored PSF; (S15) a step of substituting the estimated luminance distribution 9 of the restored PSF for the estimated luminance distribution 5 of the PSF initial values; (S16) a step of incrementing the counter by 1; (S17) a step of testing a hypothesis that the value of the counter has exceeded the maximum number of iterations 6, returning to step (S9) if the test result is false, and outputting the estimated luminance distribution 9 of the restored PSF as a luminance distribution 10 of a maximum-likelihood restored PSF if the test result is true; (S18) a PSF-restoring-computation preparing step constituted of steps (S1) to (S8); (S19) a first PSF restoring computation step constituted of steps (S9) to (S17); (S20) a first PSF restoring step, including the PSF-restoring-computation preparing step S18 and the first PSF restoring computation step S19, of completing the maximum number of iterations 6 by executing iterations in ascending order of the index on S in the PSF-restoring-computation preparing step S18 and the first PSF restoring computation step S19 and outputting the luminance distribution 10 of the maximum-likelihood restored PSF; (S21) a step of resetting the counter and jumping to (S23); (S22) a second restored-image-initial-value correcting step, constituted of the same processing procedure as the first restored-image-initial-value correcting step, of correcting the estimated luminance distribution 3 of the restored-image initial values on the basis of the image size of the luminance distribution 10 of the maximum-likelihood restored PSF; (S23) a step of convolving the luminance distribution 10 of the maximum-likelihood restored PSF with the estimated luminance distribution 3 of the corrected-restored-image initial values to obtain a sixth function; (S24) a step of inverting the sixth function to obtain a seventh function; (S25) a step of multiplying the seventh function by the luminance distribution 1 of the degraded image to obtain an eighth function; (S26) a step of obtaining an inverted function of the luminance distribution 10 of the maximum-likelihood restored PSF and setting the inverted function as a ninth function; (S27) a step of convolving the ninth function with the eighth function to obtain a tenth function; (S28) a step of multiplying the estimated luminance distribution 3 of the restored-image initial values by the tenth function to obtain an estimated luminance distribution 11 of the restored image; (S29) a step of substituting the estimated luminance distribution 11 of the restored image for the estimated luminance distribution 3 of the restored-image initial values; (S30) a step of incrementing the counter by 1; (S31) a step of testing a hypothesis that the value of the counter has exceeded the maximum number of iterations 6, returning to step (S22) if the test result is false, and outputting the estimated luminance distribution 11 of the restored image as a luminance distribution 12 of a maximum-likelihood restored image if the test result is true; (S32) a first image-restoring computation preparing step constituted of step (S21); (S33) a first image restoring computation step constituted of steps (S22) to (S31); (S34) a first image restoring step, including the first image-restoring computation preparing step S32 and the first image restoring computation step S33, of completing the maximum number of iterations 6 by executing iterations in ascending order of the index on S in the first image-restoring computation preparing step S32 and the first image restoring computation step S33 and outputting the luminance distribution 12 of the maximum-likelihood restored image; and (S35) a first TV-video rendering step of rendering the luminance distribution 12 of the maximum-likelihood restored image into TV video and outputting single-frame super-resolution TV video signals 13.

In the first PSF restoring computation step S19, computation is executed according to equation 1 to obtain, from an identified PSF luminance distribution 4, an estimated luminance distribution 5 of PSF initial values constituted of the identified PSF luminance distribution 4, and a luminance distribution 1 of a degraded image, a luminance distribution 10 of a maximum-likelihood restored PSF having the maximum likelihood for the luminance distribution 1 of the degraded image. Equation 1 is obtained by rewriting equation 25 in Patent Literature 2, invented by the inventor of the present invention and registered, such that a convolution is possible. Since only real values are handled in the computation of the method according to equation 1, compared with the method according to equation 25 in Patent Literature 2, a PSF luminance distribution is used instead of an OTF (Optical Transfer Function), which is a Fourier transform product of a PSF luminance distribution, and the phase is not taken into consideration. Therefore, the restoration accuracy is reduced. However, since TV video is rarely blurred to such an extent that the image is unrecognizable, the method according to equation 1 works practically without problems.

[Eq. 1]

$$H_{k+1} = H_k \left\{ \left( \frac{G}{H_k \odot F} \right) \odot F^{\#} \right\} \quad (1)$$

In equation 1, F signifies an estimated luminance distribution 3 of corrected-image initial values, G signifies a luminance distribution 1 of a degraded image, H signifies a PSF luminance distribution 4, the index of H signifies that the value is a k-th value, F having a superscript # signifies an inverted function of an estimated luminance distribution of a restored image, and a symbol having an asterisk inside a circle signifies a convolution. Furthermore, k is an integer greater than or equal to 0, and the initial value of k is 0.

[Eq. 2]

$$F_{k+1} = F_k \left\{ \left( \frac{G}{F_k \odot H} \right) \odot H^{\#} \right\} \quad (2)$$

In the first image restoring computation step S33, computation is executed according to equation 2 to restore, from an identified PSF luminance distribution 4, an estimated luminance distribution 3 of restored-image initial values constituted of a luminance distribution 1 of a degraded image, and the luminance distribution 1 of the degraded image, a luminance distribution 12 of a maximum-likelihood restored image having the maximum likelihood for the luminance distribution 1 of the degraded image. Equation 2 is obtained by rewriting equation 15 in Patent Literature 2, invented by the inventor of the present invention and registered, such that a convolution is possible. Since only real values are handled in the computation of the method according to equation 2, compared with the method according to equation 15 in Patent Literature 2, a PSF luminance distribution is used instead of an OTF, which is the product of the Fourier transform of a PSF luminance distribution, and the phase is not taken into consideration. Therefore, the restoration accuracy is reduced. However, since TV video is rarely blurred to such an extent that the image is unrecognizable, the method according to equation 2 practically works without problems.

In equation 2, F signifies an estimated luminance distribution of corrected-image initial values, the index of F signifies that the value is a k-th value, G signifies a luminance distribution of a degraded image, H signifies a luminance distribution of a maximum-likelihood PSF restored in the first PSF restoring step, H having a superscript # signifies an inverted function of the luminance distribution of the maximum-likelihood restored PSF, and a symbol having an asterisk inside a circle signifies a convolution. Furthermore, k is an integer greater than or equal to 0, and the initial value of k is 0.

Furthermore, in the present invention, since TV video is rarely blurred to such an extent that the image is unrecognizable, a luminance distribution 4 of a degraded image is used as $F_0$ in equations 1 and 2, i.e., an estimated luminance distribution of restored-image initial values.

The convolution used in the present invention is a convolution integral. Equation 3 is an example of a formula of an ordinary convolution integral. Equation 3 indicates that F(i, j) is convolved with H(M, N) to obtain a result G(i, j).

[Eq. 3]

$$G(i,j) = F(i,j) \circledast H(M,N) \quad (3)$$

In the present invention, however, since the distributions of images having finite sizes are handled, data is discretized, and thus a linear convolution is used for a convolution integral. Equation 4 is an example of a formula of an ordinary linear convolution.

$$G(i, j) = \sum_{N=-n}^{n} \sum_{M=-m}^{m} F(i-M, j-N) \cdot H(M, N) \quad (4)$$

In equations 3 and 4, i, j, m, n, M, and N are integers. However, in the convolutions according to equations 3 and 4, a region where computation is difficult, which can be represented by the greatest integer not exceeding half of the matrix size involved in the convolutions, occurs. For example, in the case where the estimated luminance distribution F of restored-image initial values has a size not smaller than 100×100 pixels and the matrix size of the PSF luminance distribution H that is convolved with the estimated luminance distribution F of the restored-image initial values is 3×3, one pixel in a peripheral region in F becomes a region where computation is difficult. In the case where the matrix size of H that is convolved with F is 5×5, two pixels in a peripheral region in F become a region where computation is difficult.

Accordingly, as an example of a solution employed in the present invention, the number of peripheral pixels in a region where computation is difficult is calculated according to the size of H used, the outermost pixels of F existing in the region where computation is difficult are copied and pasted in mirror symmetry to the outside of the boundary of F to create new pixels, and then the position of the outermost edges, i.e., the image size of F, is changed, which prevents the occurrence of a region where computation is difficult after the computation. At this time, pixels are copied and pasted on an edge-by-edge basis, clockwise starting from the top edge, to include the new pixels in the pixels of F proper, thereby preventing the occurrence of a region that is not copied and pasted. For example, in the case where H has a size of 5×5 and F has a size of W×L, the size of F changes from W×L to W×(L+2) after the first copy and paste operation, the size of F changes from W×(L+2) to (W+2)×(L+2) after the second copy and paste operation, the size of F changes from (W+2)×(L+2) to (W+2)×(L+4) after the third copy and paste operation, and the size of F changes from (W+2)×(L+4) to (W+4)×(L+4) after the fourth copy and paste operation.

Figure 3:
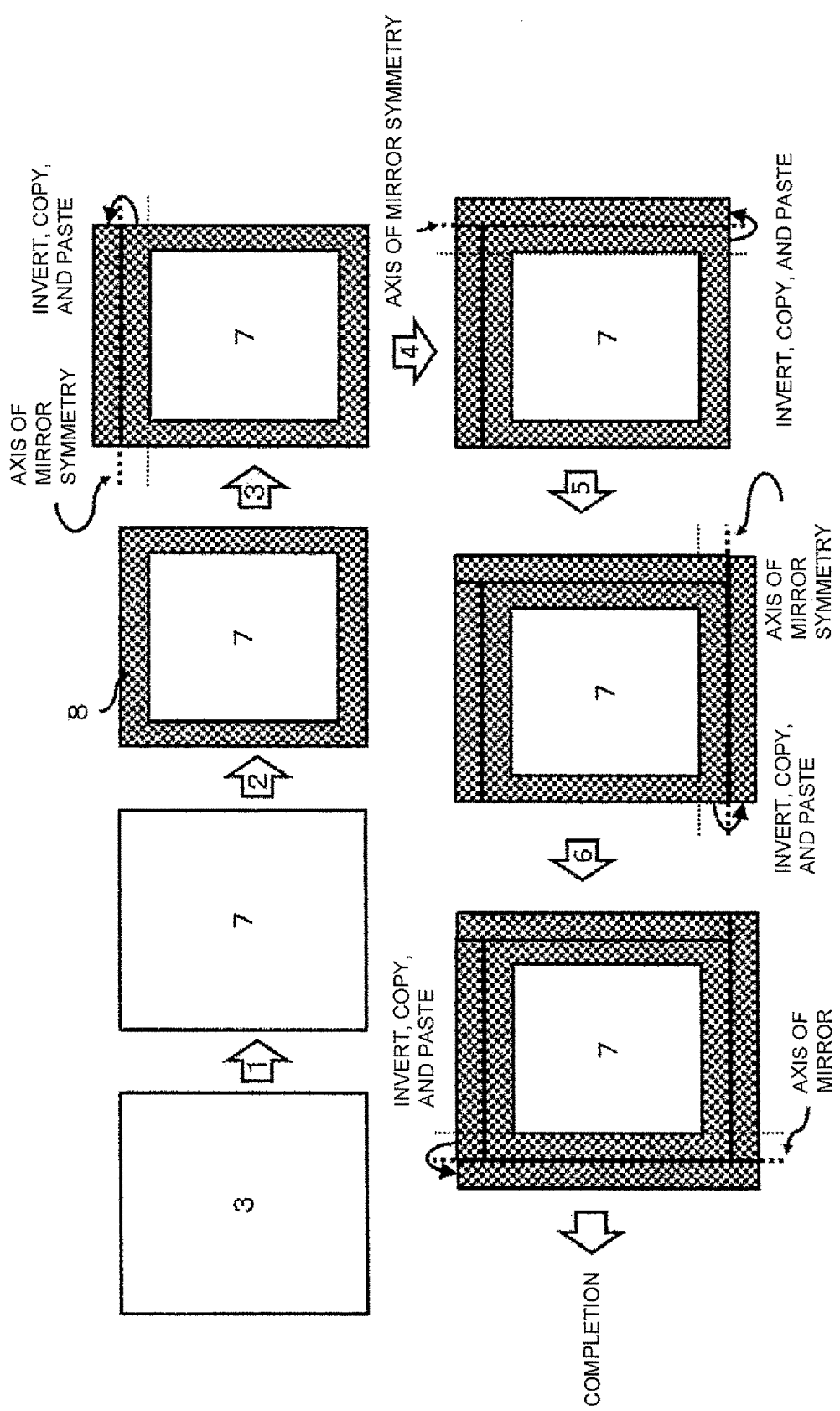
FIG. 3 is an illustration showing an example of a correction processing procedure used in a first restored-image-initial-value correcting step according to the present invention.

FIG. 3 shows an example of a correction processing procedure used in a first restored-image-initial-value correcting step S7 according to the present invention. The correction processing procedure shown in FIG. 3 is constituted of six steps. The six steps are: (1) a step of copying an estimated luminance distribution 3 of restored-image initial values and setting the estimated luminance distribution 3 as an estimated luminance distribution 7 of corrected-restored-image initial values; (2) when convolving the PSF luminance distribution 4 with the estimated luminance distribution 7 of the corrected-restored-image initial values, a step of calculating a region 8 where computation is difficult, the region 8 occurring in a peripheral region in the estimated luminance distribution 7 of the corrected-restored-image initial values, on the basis of the image size of the PSF luminance distribution 4; (3) a step of copying the pixels associated with the top edge of the estimated luminance distribution 7 of the corrected-restored-image initial values in the region 8 where computation is difficult, and pasting the copied pixels to the outside of the boundary of the top edge of the estimated luminance distribution 7 of the corrected-restored-image initial values in mirror symmetry with respect to the boundary; (4) a step of copying the pixels associated with the right edge of the estimated luminance distribution 7 of the corrected-restored-image initial values in the region 8 where computation is difficult, and pasting the copied pixels to the outside of the boundary of the right edge of the estimated luminance distribution 7 of the corrected-restored-image initial values in mirror symmetry with respect to the boundary; (5) a step of copying the pixels associated with the bottom edge of the estimated luminance distribution 7 of the corrected-restored-image initial values in the region 8 where computation is difficult, and pasting the copied pixels to the outside of the boundary of the bottom edge of the estimated luminance distribution 7 of the corrected-restored-image initial values in mirror symmetry with respect to the boundary; and (6) a step of copying the pixels associated with the left edge of the estimated luminance distribution 7 of the corrected-restored-image initial values in the region 8 where computation is difficult, and pasting the copied pixels to the outside of the boundary of the left edge of the estimated luminance distribution 7 of the corrected-restored-image initial values in mirror symmetry with respect to the boundary. Accordingly, it is possible to prevent inverter portions at the four corners of the estimated luminance distribution 7 of the corrected-restored-image initial values from becoming blank.

Figure 4:
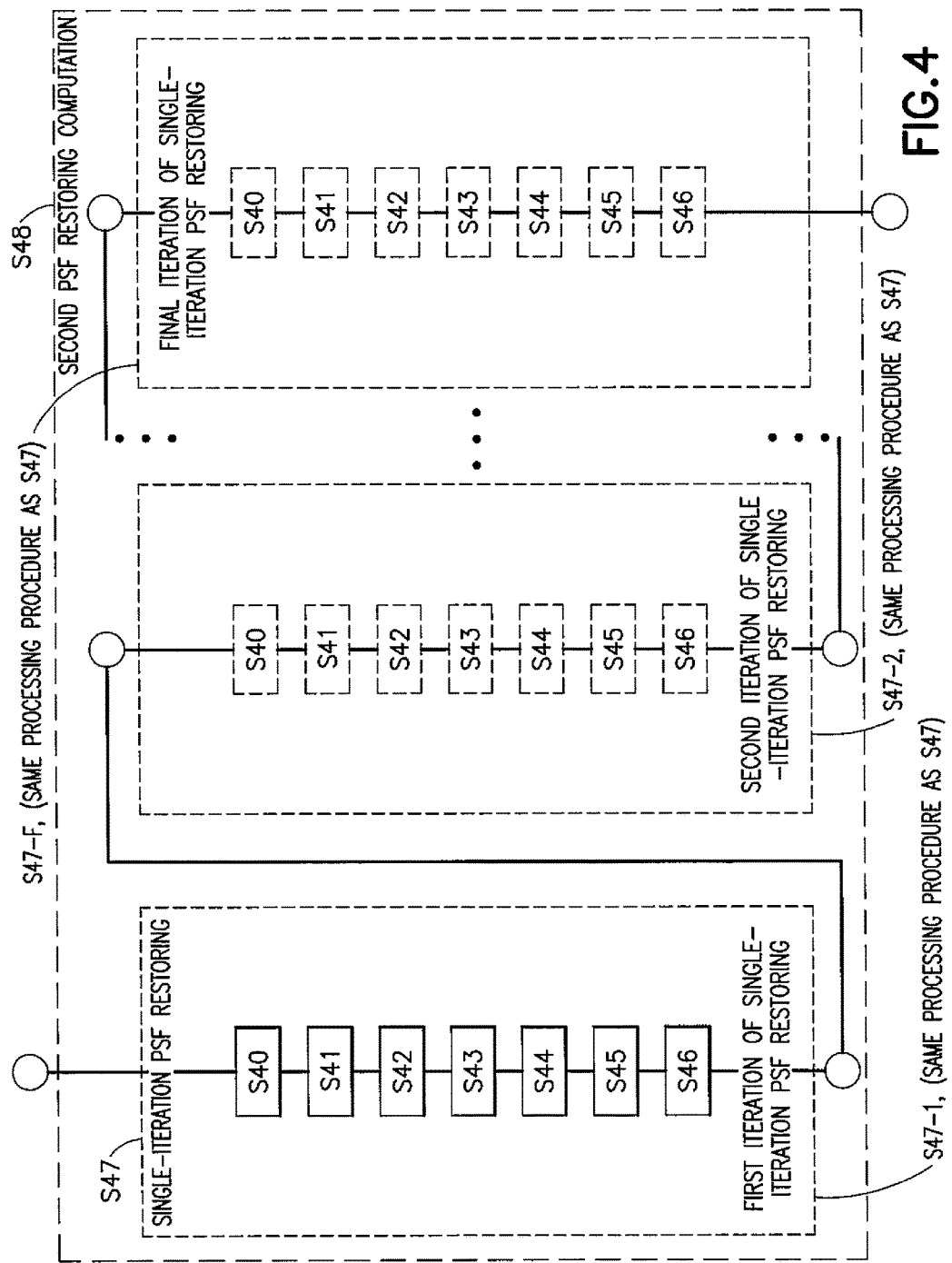
FIG. 4 is a flowchart showing an example of a processing procedure in a second PSF restoring computation step of a second invention according to the present invention.

FIG. 4 shows, in the form of a flowchart, an example of a processing procedure in a second PSF restoring computation step S48 of a second invention according to the present invention. The second PSF restoring computation step S48 shown in FIG. 4 is characterized by including (S40) a step of convolving the estimated luminance distribution 5 of the PSF initial values with the estimated luminance distribution 7 of the corrected-restored-image initial values to obtain an eleventh function; (S41) a step of inverting the eleventh function to obtain a twelfth function; (S42) a step of multiplying the twelfth function by the luminance distribution 1 of the degraded image to obtain a thirteenth function; (S43) a step of obtaining an inverted function of the estimated luminance distribution 7 of the corrected-restored-image initial values and setting the inverted function as a fourteenth function; (S44) a step of convolving the fourteenth function with the thirteenth function to obtain a fifteenth function; (S45) a step of multiplying the estimated luminance distribution 5 of the PSF initial values by the fifteenth function to obtain an estimated luminance distribution 9 of a restored PSF; (S46) a step of outputting the estimated luminance distribution 9 of the restored PSF as the estimated luminance distribution 5 of the PSF initial values and the final values 14 of the estimated luminance distribution 9 of the restored PSF; (S47) a single-iteration PSF restoring step, including steps (S40) to (S46), of executing one iteration sequentially in ascending order of the index on S; and (S48) a second PSF restoring computation step constituted of a series connection of a number of iterations of the single-iteration PSF restoring step S47, corresponding to the maximum number of iterations 6, and is characterized in that, in the second PSF restoring computation step S48, a number of iterations corresponding to the number of iterations of the single-iteration PSF restoring step S47 connected in series are executed, and the final values 14 of the estimated luminance distribution 9 of the restored PSF output from the final iteration S47-F of the single-iteration PSF restoring step are output as a luminance distribution 10 of the maximum-likelihood restored PSF.

Figure 5:
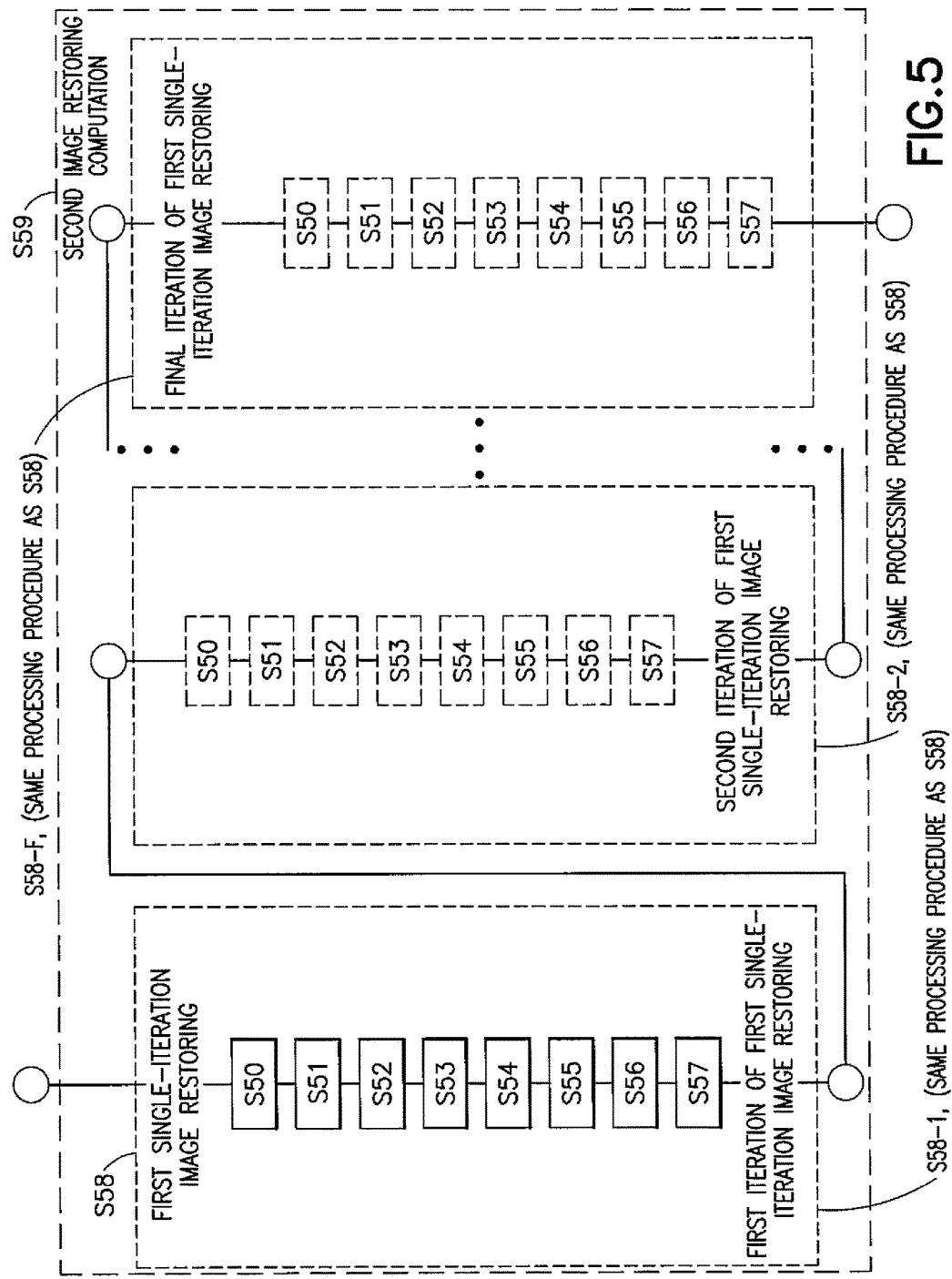
FIG. 5 is a flowchart showing an example of a processing procedure in a second image restoring computation step of a third invention according to the present invention.

FIG. 5 shows, in the form of a flowchart, an example of a processing procedure in a second image restoring computation step S59 of a third invention according to the present invention. The second image restoring computation step S59 shown in FIG. 5 is characterized by including (S50) a third restored-image-initial-value correcting step, constituted of the same processing procedure as the first restored-image-initial-value correcting step, of correcting the estimated luminance distribution 3 of the restored-image initial values on the basis of the image size of the luminance distribution 10 of the maximum-likelihood restored PSF to obtain an estimated luminance distribution 7 of the corrected-restored-image initial values; (S51) a step of convolving the luminance distribution 10 of the maximum-likelihood restored PSF with the estimated luminance distribution 7 of the corrected-restored-image initial values to obtain a sixteenth function; (S52) a step of inverting the sixteenth function to obtain a seventeenth function; (S53) a step of multiplying the seventeenth function by the luminance distribution 1 of the degraded image to obtain an eighteenth function; (S54) a step of obtaining an inverted function of the luminance distribution 10 of the maximum-likelihood restored PSF and setting the inverted function as a nineteenth function; (S55) a step of convolving the nineteenth function with the eighteenth function to obtain a twentieth function; (S56) a step of multiplying the estimated luminance distribution 3 of the restored-image initial values by the twentieth function to obtain an estimated luminance distribution 11 of the restored image; (S57) a step of outputting the estimated luminance distribution 11 of the restored image as the estimated luminance distribution 3 of the restored-image initial values and the final values 15 of the estimated luminance distribution 11 of the restored image; (S58) a single-iteration image restoring step, including steps (S50) to (S57), of executing one iteration sequentially in ascending order of the index on S; and (S59) a second image restoring computation step constituted of a series connection of a number of iterations of the single-iteration image restoring step S58, corresponding to the maximum number of iterations 6, and is characterized in that, in the second image restoring computation step S59, a number of iterations corresponding to the number of iterations of the single-iteration image restoring step S58 connected in series are executed, and the final values 15 of the estimated luminance distribution 11 of the restored image output from the final iteration S58-F of the single-iteration image restoring step are output as a luminance distribution 12 of the maximum-likelihood restored image.

In the present invention, the first TV-video super-resolution processing method can be implemented either in software or in hardware. Since TV video is not blurred to such an extent that it is unrecognizable, it is not necessary to set a large value as the maximum number of iterations 6, and thus the maximum number of iterations 6 is set to be 12. In the case of software, there are issues related to processing time; on the other hand, in the case of hardware, there are issues related to how many iterations of the single-iteration PSF restoring step S47 and how many iterations of the single-iteration image restoring step S58 are to be prepared in advance. Since the maximum number of iterations 6 is 12, it suffices to prepare in advance 12 iterations each of the single-iteration PSF restoring step S47 and the single-iteration image restoring step S58.

Figure 6:
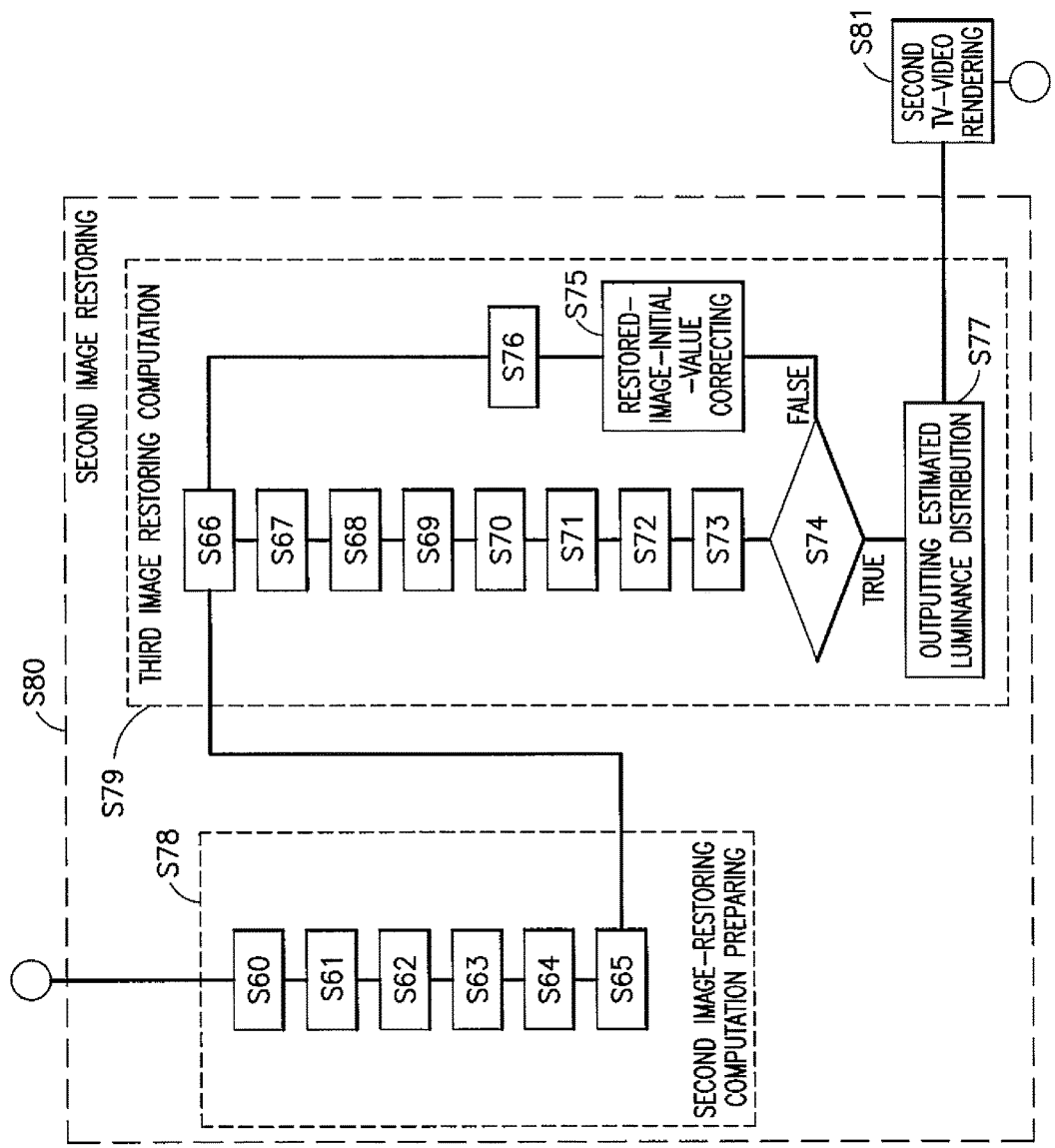
FIG. 6 is a flowchart showing an example relating to a processing procedure of a second TV-video super-resolution processing method of a fourth invention according to the present invention.

FIG. 6 shows, in the form of a flowchart, an example of a processing procedure in a second TV-video super-resolution processing method of a fourth invention according to the present invention. The second TV-video super-resolution processing method shown in FIG. 6 is characterized by including (S60) a second PSF identifying step of identifying a PSF luminance distribution 4 suitable for the degradation state of the TV video while the TV video 2 is being viewed; (S61) a second degraded-image preparing step of preparing, from the TV video 2, a luminance distribution 1 of a degraded image constituted of a single-frame luminance distribution; (S62) a fourth restored-image-initial-value correcting step, constituted of the same processing procedure as the first restored-image-initial-value correcting step, of copying the luminance distribution 1 of the degraded image and setting the luminance distribution as an estimated luminance distribution 3 of the restored-image initial values, and correcting the estimated luminance distribution 3 of the restored-image initial values on the basis of the image size of the PSF luminance distribution 4 to obtain an estimated luminance distribution 7 of corrected-restored-image initial values; (S63) a step of setting the estimated luminance distribution 7 of the corrected-restored-image initial values as a luminance distribution 1 of the degraded image; (S64) a step of setting a maximum number of iterations 6; (S65) a step of resetting a counter that counts the number of iterations to 0; (S66) a step of convolving the PSF luminance distribution 4 with the estimated luminance distribution 7 of the corrected-restored-image initial values to obtain a twenty-first function; (S67) a step of inverting the twenty-first function to obtain a twenty-second function; (S68) a step of multiplying the twenty-second function by the luminance distribution 1 of the degraded image to obtain a twenty-third function; (S69) a step of obtaining an inverted function of the PSF luminance distribution 4 and setting the inverted function as a twenty-fourth function; (S70) a step of convolving the twenty-fourth function with the twenty-third function to obtain a twenty-fifth function; (S71) a step of multiplying the estimated luminance distribution 3 of the restored-image initial values by the twenty-fifth function to obtain an estimated luminance distribution 11 of the restored image; (S72) a step of substituting the estimated luminance distribution 11 of the restored image for the estimated luminance distribution of the restored-image initial values; (S73) a step of incrementing the counter by 1; (S74) a step of testing a hypothesis that the value of the counter is greater than or equal to the maximum number of iterations 6, jumping to step (S75) if the test result is false, and jumping to step (S77) if the test result is true; (S75) a fifth restoredimage-initial-value correcting step, constituted of the same processing procedure as the first restored-image-initial-value correcting step, of correcting the estimated luminance distribution 3 of the restored-image initial values on the basis of the image size of the PSF luminance distribution 4 to obtain an estimated luminance distribution 7 of the corrected-restored-image initial values; (S76) a step of jumping to S66; (S77) a step of outputting the estimated luminance distribution 11 of the restored image as a luminance distribution 12 of a maximum-likelihood restored image; (S78) a second image-restoring computation preparing step constituted of steps (S60) to (S65); (S79) a third image restoring computation step constituted of steps (S66) to (S77); (S80) a second image restoring step, including the second image-restoring computation preparing step and the third image restoring computation step, of completing the maximum number of iterations 6 by executing iterations in ascending order of the index on S and outputting the luminance distribution 12 of the maximum-likelihood restored image; and (S81) a second TV-video rendering step of rendering the luminance distribution 12 of the maximum-likelihood restored image into TV video and outputting single-frame super-resolution TV video signals 13.

Figure 7:
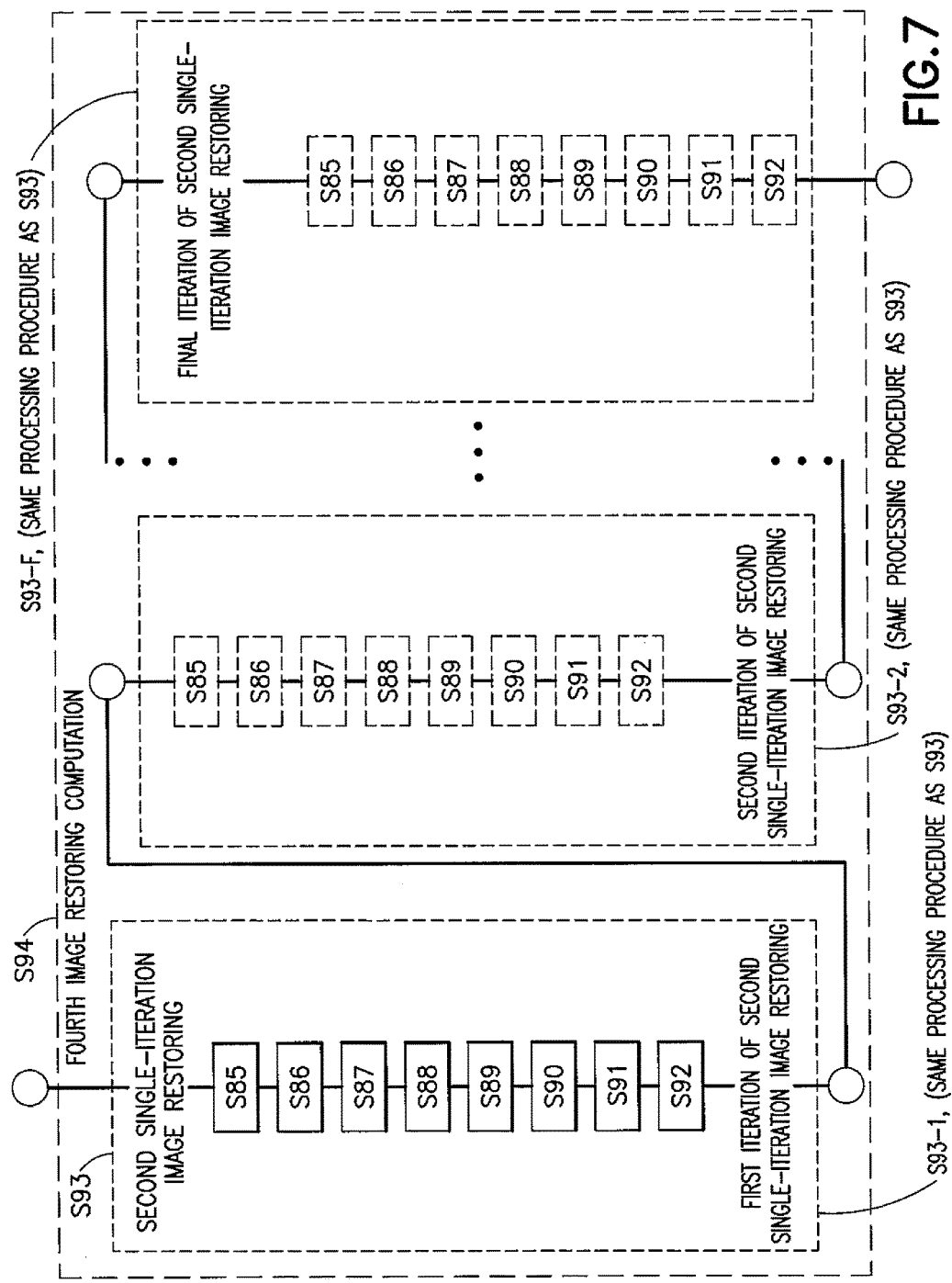
FIG. 7 is a flowchart showing an example relating to a processing procedure of a fourth image restoring computation step of a fifth invention according to the present invention.

FIG. 7 shows, in the form of a flowchart, an example relating to a processing procedure of a fourth image restoring computation step S94 of a fifth invention according to the present invention. The fourth image restoring computation step S94 shown in FIG. 7 is characterized by including (S85) a sixth restored-image-initial-value correcting step, constituted of the same processing procedure as the first restored-image-initial-value correcting step, of correcting the estimated luminance distribution 3 of the restored-image initial values on the basis of the image size of the PSF luminance distribution 4 to obtain an estimated luminance distribution 7 of corrected-restored-image initial values; (S86) a step of convolving the PSF luminance distribution 4 with the estimated luminance distribution 7 of the restored-image initial values to obtain a twenty-sixth function; (S87) a step of inverting the twenty-sixth function to obtain a twenty-seventh function; (S88) a step of multiplying the twenty-seventh function by the luminance distribution 1 of the degraded image to obtain a twenty-eighth function; (S89) a step of obtaining an inverted function of the PSF luminance distribution 4 and setting the inverted function as a twenty-ninth function; (S90) a step of convolving the twenty-ninth function with the twenty-eighth function to obtain a thirtieth function; (S91) a step of multiplying the estimated luminance distribution 3 of the restored-image initial values by the thirtieth function to obtain an estimated luminance distribution 11 of the restored image; (S92) a step of outputting the estimated luminance distribution 11 of the restored image as the estimated luminance distribution 3 of the restored-image initial values and the final values 15 of the estimated luminance distribution 11 of the restored image; (S93) a second single-iteration image restoring step, including steps (S85) to (S92), of executing one iteration sequentially in ascending order of the index on S; and (S94) a fourth image restoring computation step constituted of a series connection of a number of iterations of the second single-iteration image restoring step S93, corresponding to the maximum number of iterations 6, and is characterized in that, in the fourth image restoring computation step S94, a number of iterations corresponding to the number of iterations of the second single-iteration image restoring step S93 connected in series are executed, and the final values 15 of the estimated luminance distribution 11 of the restored image output from the final iteration S93-F of the second single-iteration image restoring step are output as a luminance distribution 12 of the maximum-likelihood restored image.

Figure 8:
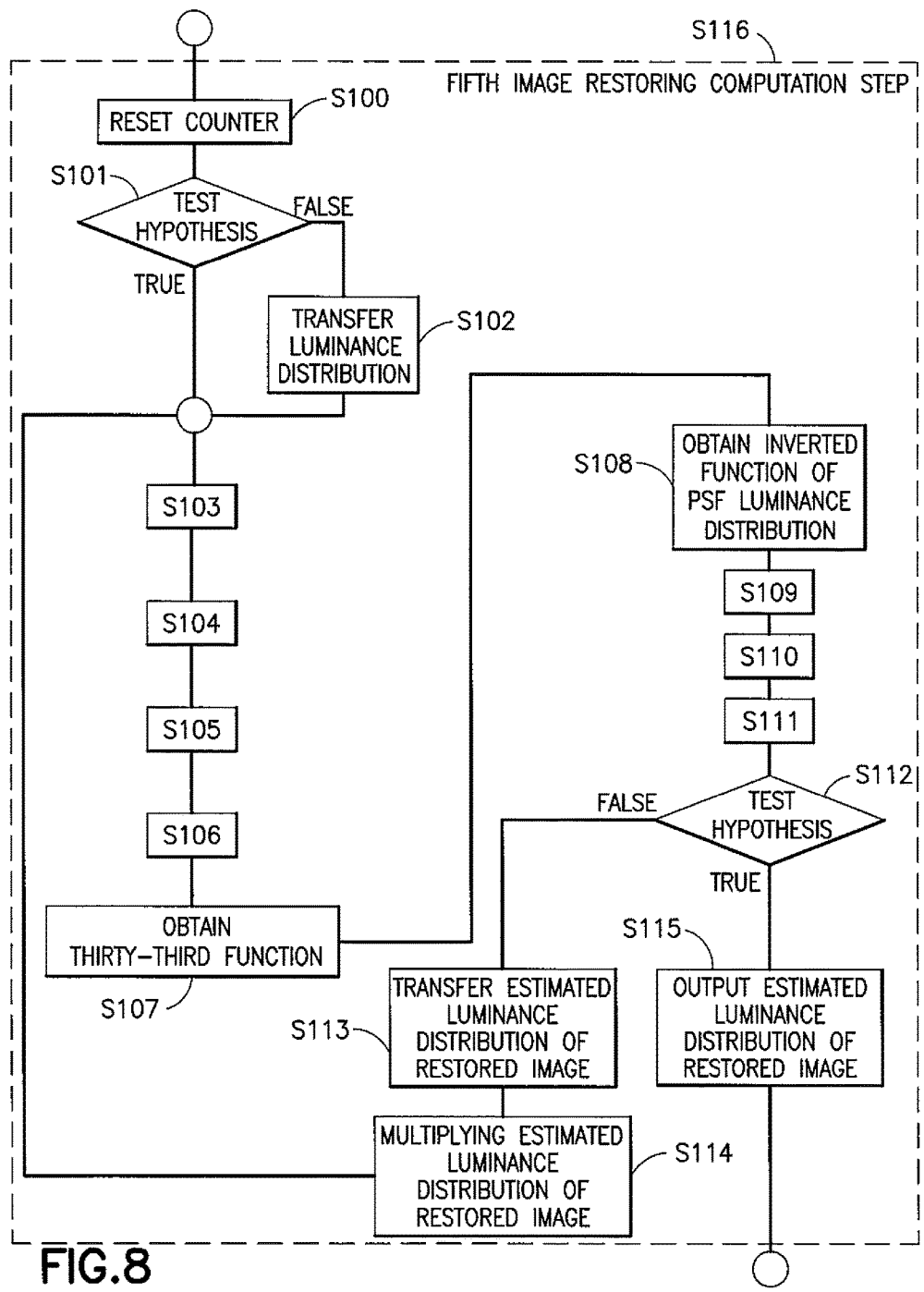
FIG. 8 is a flowchart showing an example relating to a processing procedure of a fifth image restoring computation step of a sixth invention according to the present invention.

FIG. 8 shows, in the form of a flowchart, an example relating to a processing procedure of a fifth image restoring computation step S116 of a sixth invention according to the present invention. The fifth image restoring computation step S116 shown in FIG. 8 is characterized by including (S100) a step of resetting the counter that counts the number of iterations; (S101) a step of testing a hypothesis that the value of the counter is not 0, jumping to (S102) if the test result is false, and jumping to (S103) if the test result is true; (S102) a step of transferring the luminance distribution 1 of the degraded image to a buffer 16 for saving the luminance distribution of the degraded image and to a buffer 17 for the estimated luminance distribution of the restored-image initial values; (S103) a step of loading the estimated luminance distribution 3 of the restored-image initial values from the buffer 17 for the estimated luminance distribution of the restored-image initial values; (S104) a seventh restored-image-initial-value correcting step, constituted of the same processing procedure as the first restored-image-initial-value correcting step, of correcting the estimated luminance distribution 3 of the restored-image initial values on the basis of the image size of the PSF luminance distribution 4 to obtain an estimated luminance distribution 7 of corrected-restored-image initial values; (S105) a step of convolving the PSF luminance distribution 4 with the estimated luminance distribution 7 of the corrected-restored-image initial values to obtain a thirty-first function; (S106) a step of inverting the thirty-first function to obtain a thirty-second function; (S107) a step of multiplying the thirty-second function with the luminance distribution 1 of the degraded image to obtain a thirty-third function; (S108) a step of obtaining an inverted function of the PSF luminance distribution 4 and setting the inverted function as a thirty-fourth function; (S109) a step of convolving the thirty-fourth function with the thirty-third function to obtain a thirty-fifth function; (S110) a step of multiplying the estimated luminance distribution 3 of the restored-image initial values by the thirty-fifth function to obtain an estimated luminance distribution 11 of the restored image; (S111) a step of incrementing the counter by 1; (S112) a step of testing a hypothesis that the value of the counter has exceeded the maximum number of iterations 6, jumping to (S113) if the test result is false, and jumping to (S115) if the test result is true; (S113) a step of transferring the estimated luminance distribution 11 of the restored image to the buffer 17 for the estimated luminance distribution of the restored-image initial values; (S114) a step of jumping to (S103); (S115) a step of outputting the estimated luminance distribution 11 of the restored image as the luminance distribution 12 of the maximum-likelihood restored image; and (S116) a fifth image restoring computation step, including steps (S100) to (S115), of completing the maximum number of iterations 6 by executing iterations sequentially in ascending order of the index on S and outputting the luminance distribution 12 of the maximum-likelihood restored image.

Figure 9:
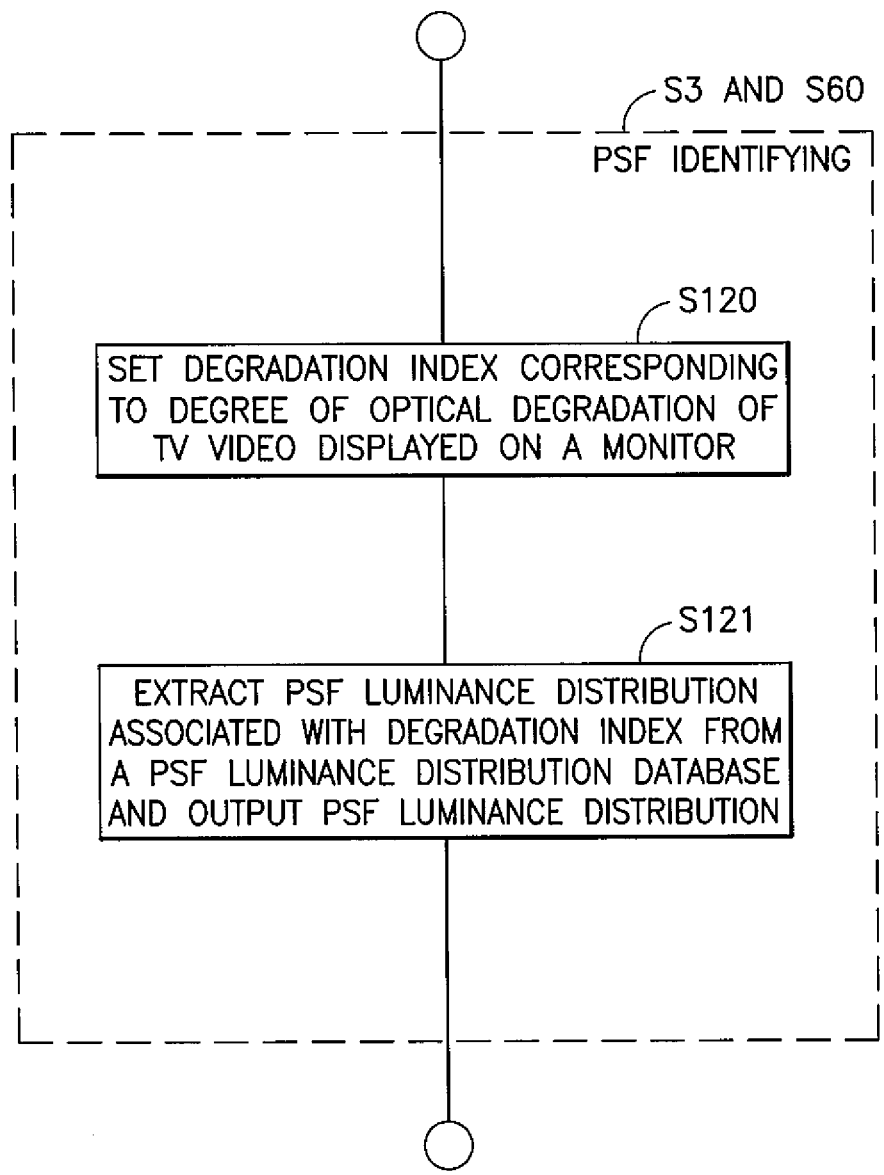
FIG. 9 is a flowchart showing an example relating to a processing procedure of a first PSF identifying step and a second PSF identifying step of a seventh invention according to the present invention.

FIG. 9 shows, in the form of a flowchart, an example relating to a processing procedure of a first PSF identifying step S3 and a second PSF identifying step S60 of a seventh invention according to the present invention. The first PSF identifying step S3 and the second PSF identifying step S60 shown in FIG. 9 are characterized by including (S120) a step of setting a degradation index 18 corresponding to the degree of optical degradation of TV video 2 displayed on a monitor; and (S121) a step of extracting a PSF luminance distribution 4 associated with the degradation index 18 from a PSF luminance distribution database 19 and outputting the PSF luminance distribution 4.

Figure 10:
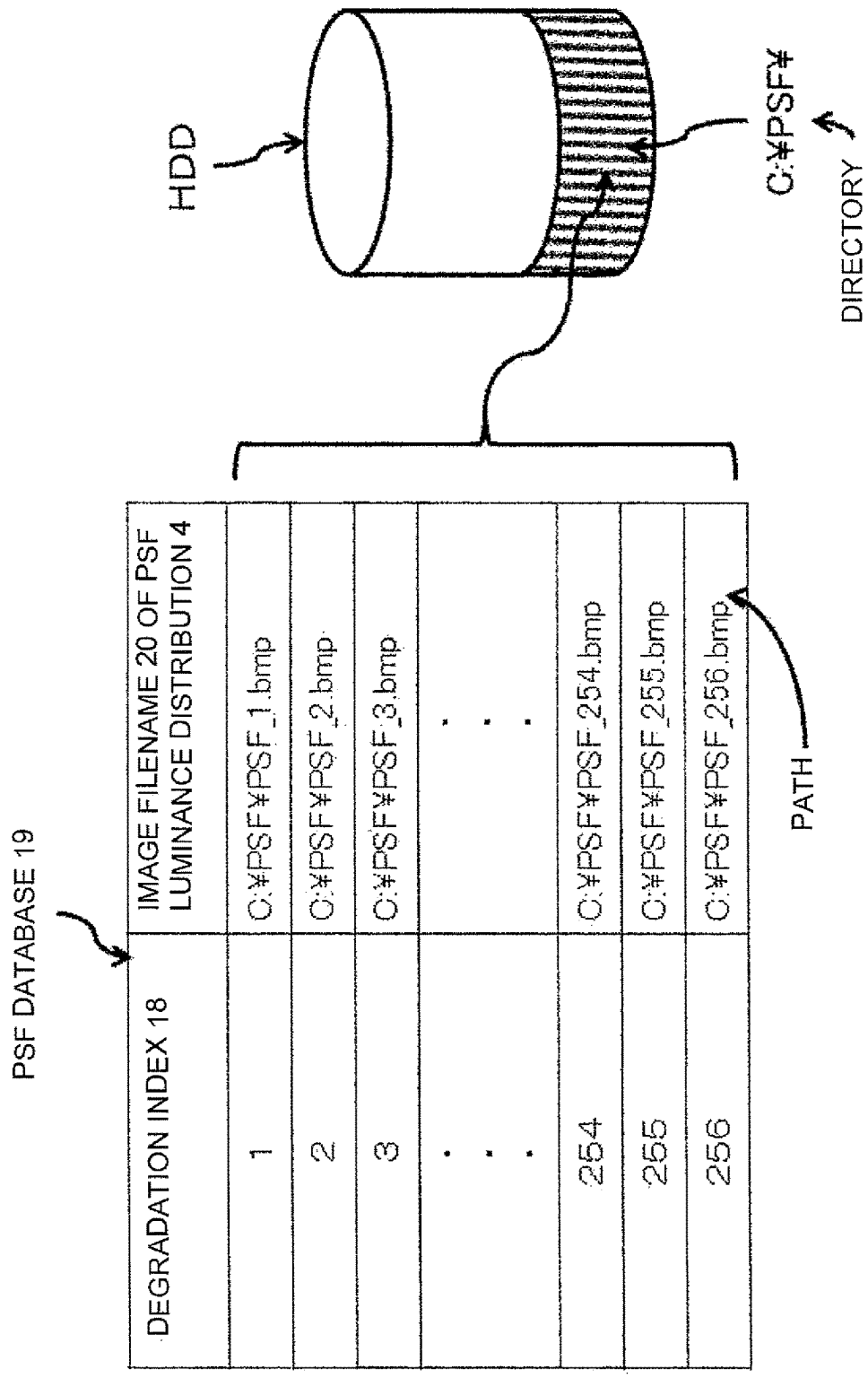
FIG. 10 is a diagram showing an example of data in a PSF database according to the present invention.

FIG. 10 shows an example of data in the PSF database 19 according to the present invention. The PSF database 19 is configured by associating the image filenames 20 of PSF luminance distributions 4, in the form of the entire paths including the image filenames 20, one by one with degradation indices 18 of 256 levels. In the example shown in FIG. 10, the PSF database 19 is a table. This table is stored, for example, in a CSV file or an array. Furthermore, in the example shown in FIG. 10, each path has the structure "drive¥directory¥filename". For example, in the case where the degradation index 18 is 1, the path representing the image filename 20 of the PSF luminance distribution 4 is "C:¥PSF¥PSF_1.bmp". The filename has a structure in which PSF is followed by an underscore, further followed by the degradation index 18, further followed by a dot, and followed by the file format bmp at the end.

In the processing procedure of the first PSF identifying step S3 and the second PSF identifying step S60 in the example shown in FIG. 10, the PSF database 19 is referred to by using the degradation index 18 set in step S120, the image filename 20 of the PSF luminance distribution associated with the degradation index 18 is extracted, and the PSF luminance distribution 4 stored as an image in a large-capacity random-access storage device, such as an HDD (Hard Disk Drive), is read by using the image filename 20 of the PSF luminance distribution.

Figure 11:
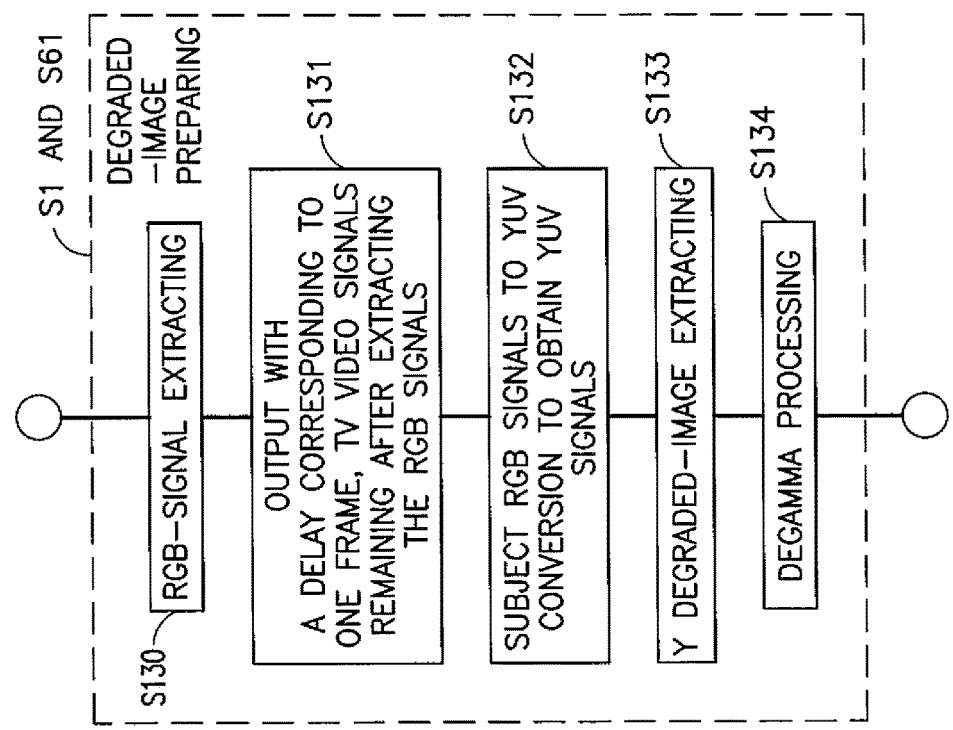
FIG. 11 is a flowchart showing an example of a processing procedure in a first degraded-image preparing step and a second degraded-image preparing step of an eighth invention according to the present invention.

FIG. 11 shows, in the form of a flowchart, an example of a processing procedure in a first degraded-image preparing step S1 and a second degraded-image preparing step S61 of an eighth invention according to the present invention. The first degraded-image preparing step S1 and the second degraded-image preparing step S61 shown in FIG. 11 are characterized by including (S130) an RGB-signal extracting step of extracting RGB signals 22 constituting a frame from TV video signals 21 for the frame; (S131) a delaying step of outputting, with a delay corresponding to one frame, the TV video signals 23 remaining after extracting the RGB signals 22 from the TV video signals 21 for the frame; (S132) a YUV conversion step of subjecting the RGB signals 22 to YUV conversion to obtain YUV signals 24; (S133) a Y-degraded-image extracting step of extracting a luminance distribution 1 of a degraded image constituted of only Y signals representing luminance components among the YUV signals 24 to obtain a luminance distribution 25 of a Y degraded image and keeping a distribution 26 of a U degraded image constituted of only the remaining U signals and a distribution 27 of a V degraded image constituted of only the remaining V signals; and (S134) a degamma processing step of executing degamma processing of the luminance distribution 25 of the Y degraded image to obtain and output a luminance distribution 1 of a degraded image constituted of a single-frame luminance distribution.

Figure 12:
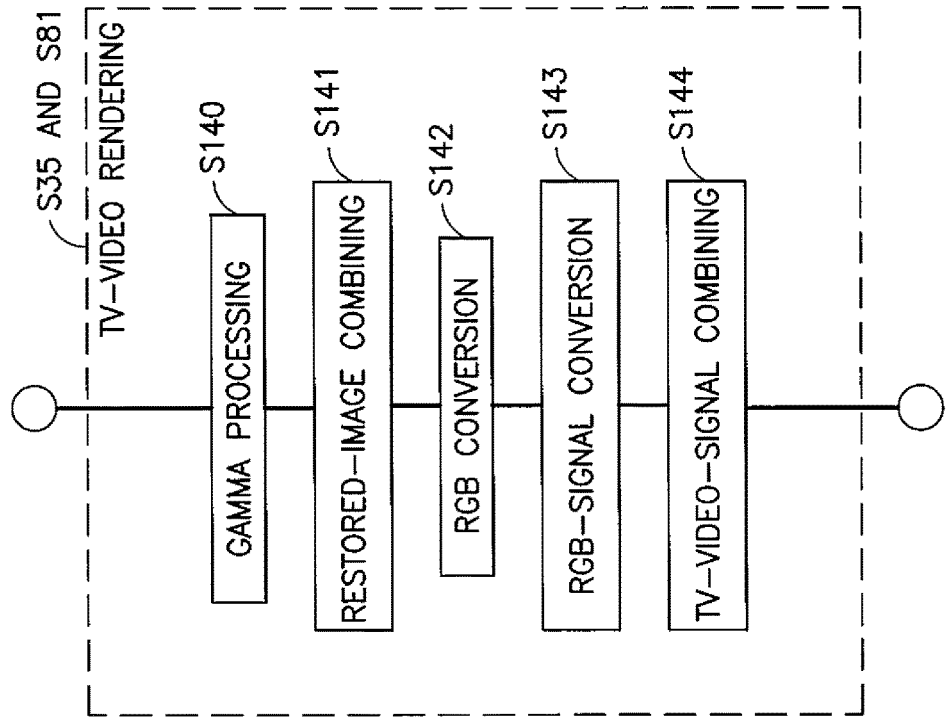
FIG. 12 is a flowchart showing an example of a processing procedure in a first TV-video rendering step and a second TV-video rendering step of a ninth invention according to the present invention.

FIG. 12 shows, in the form of a flowchart, an example of a processing procedure in a first TV-video rendering step S35 and a second TV-video rendering step S81 of a ninth invention according to the present invention. The first TV-video rendering step S34 and the second TV-video rendering step S78 shown in FIG. 12 are characterized by including (S140) a gamma processing step of executing gamma processing of the luminance distribution 12 of the maximum-likelihood restored image; (S141) a restored-image combining step of combining the distribution 26 of the U degraded image and the distribution 27 of the V degraded image kept in the Y-degraded-image extracting step S123 with the luminance distribution 12 of the maximum-likelihood restored image after the gamma processing constituted of Y components to obtain a distribution 28 of a single YUV restored image; (S142) an RGB conversion step of executing RGB conversion of the distribution 28 of the YUV restored image to obtain a distribution 29 of an RGB restored image; (S143) an RGB-signal conversion step of reading the distribution 29 of the RGB restored image and outputting RGB signals 30; and (S144) a TV-video-signal combining step of combining the RGB signals 30 with the single-frame TV video signals 23 excluding the RGB signals 22, output in the delaying step S121, to obtain and output single-frame super-resolution TV video signals 13. The ninth invention is the same as the invention described in Claim 9.

Figure 13:
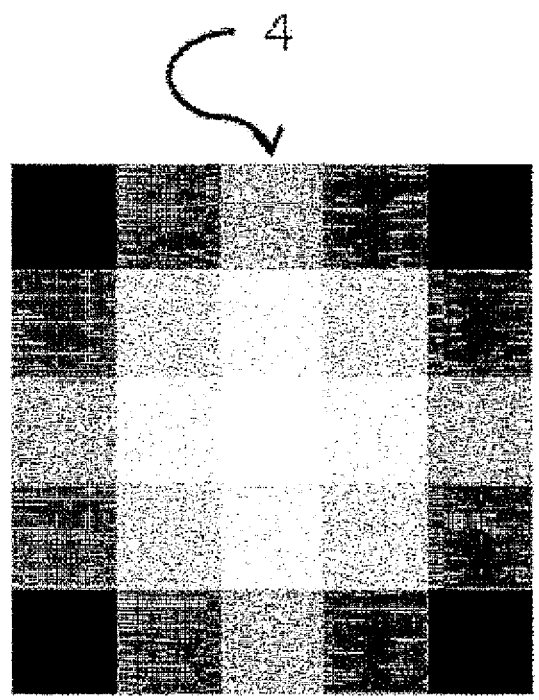
FIG. 13 is a drawing showing an example of a PSF luminance distribution of a tenth invention according to the present invention.

FIG. 13 shows an example of a PSF luminance distribution 4 of a tenth invention according to the present invention. The PSF luminance distribution shown in FIG. 13 is characterized by being constituted of frameless square pixels of the same size, constituting a two-dimensional normal distribution in which the center is brightest, and having a size of 5×5 pixels.

TABLE 1

| | Aspect | PSF restoring means | | Image restoring means | | Program name | Storage medium |
|---|---|---|---|---|---|---|---|
| First TV-video super-resolution processing method | First aspect | PSF-restoring-computation preparing step | First PSF restoring computation step | First image-restoring computation preparing step | First image restoring computation step | First super-resolution processing program | First storage medium |
| | Second aspect | | Second PSF restoring computation step | | | Second super-resolution processing program | |
| | Third aspect | | First PSF restoring computation step | | Second image restoring computation step | Third super-resolution processing program | |
| | Fourth aspect | | Second PSF restoring computation step | | Second image restoring computation step | Fourth super-resolution processing program | |
| Second TV-video super-resolution processing method | First aspect | N/A | N/A | Second image-restoring computation preparing step | Third image restoring computation step | Fifth super-resolution processing program | Second storage medium |
| | Second aspect | | | | Fourth image restoring | Sixth super-resolution | |

TABLE 1-continued

| Aspect | PSF restoring means | Image restoring means | Program name | Storage medium |
|---|---|---|---|---|
| Third aspect | | computation step Fifth image restoring computation step | processing program Seventh super-resolution processing program | |

Table 1 is a table showing a list of four aspects of the first TV-video super-resolution processing method and three aspects of the second TV-video super-resolution processing method, configured by using first to seventh super-resolution processing programs. According to Table 1, the first super-resolution processing program is a program for causing a computer to execute all the steps constituting the first aspect of the first TV-video super-resolution processing method; the second super-resolution processing program is a program for causing a computer to execute all the steps constituting the second aspect of the first TV-video super-resolution processing method; the third super-resolution processing program is a program for causing a computer to execute all the steps constituting the third aspect of the first TV-video super-resolution processing method; the fourth super-resolution processing program is a program for causing a computer to execute all the steps constituting the fourth aspect of the first TV-video super-resolution processing method; the fifth super-resolution processing program is a program for causing a computer to execute all the steps constituting the first aspect of the second TV-video super-resolution processing method; the sixth super-resolution processing program is a program for causing a computer to execute all the steps constituting the second aspect of the second TV-video super-resolution processing method; and the seventh super-resolution processing program is a program for causing a computer to execute all the steps constituting the third aspect of the second TV-video super-resolution processing method. Although programs individually written in C++ are used here as the first to seventh super-resolution processing programs, for example, programs written in another single language or a combination of other languages, such as JAVA (registered trademark), HTML, and XTML, may be used.

As shown in Table 1, a first storage medium of a thirty-fourth invention according to the present invention is a storage medium for storing first to fourth super-resolution processing programs for respectively executing the first to fourth aspects of the first TV-video super-resolution processing method. The first storage medium may be of any type as long as it supports a function that allows encryption and decryption by encryption and decryption circuits or a computer that is connected for read/write operations. For example, a USB (Universal Serial Bus) flash memory, an SD memory card, a CD (Compact Disk), a DVD (Digital Versatile Disk), etc. having a capacity not less than 4 GBytes can be used.

As shown in Table 1, a second storage medium of a thirty-fifth invention according to the present invention is a storage medium for storing fifth to seventh super-resolution processing programs for respectively executing the first to third aspects of the second TV-video super-resolution processing method. A storage medium having the same specifications as the first storage medium can be used as the second storage medium.

Figure 14A:
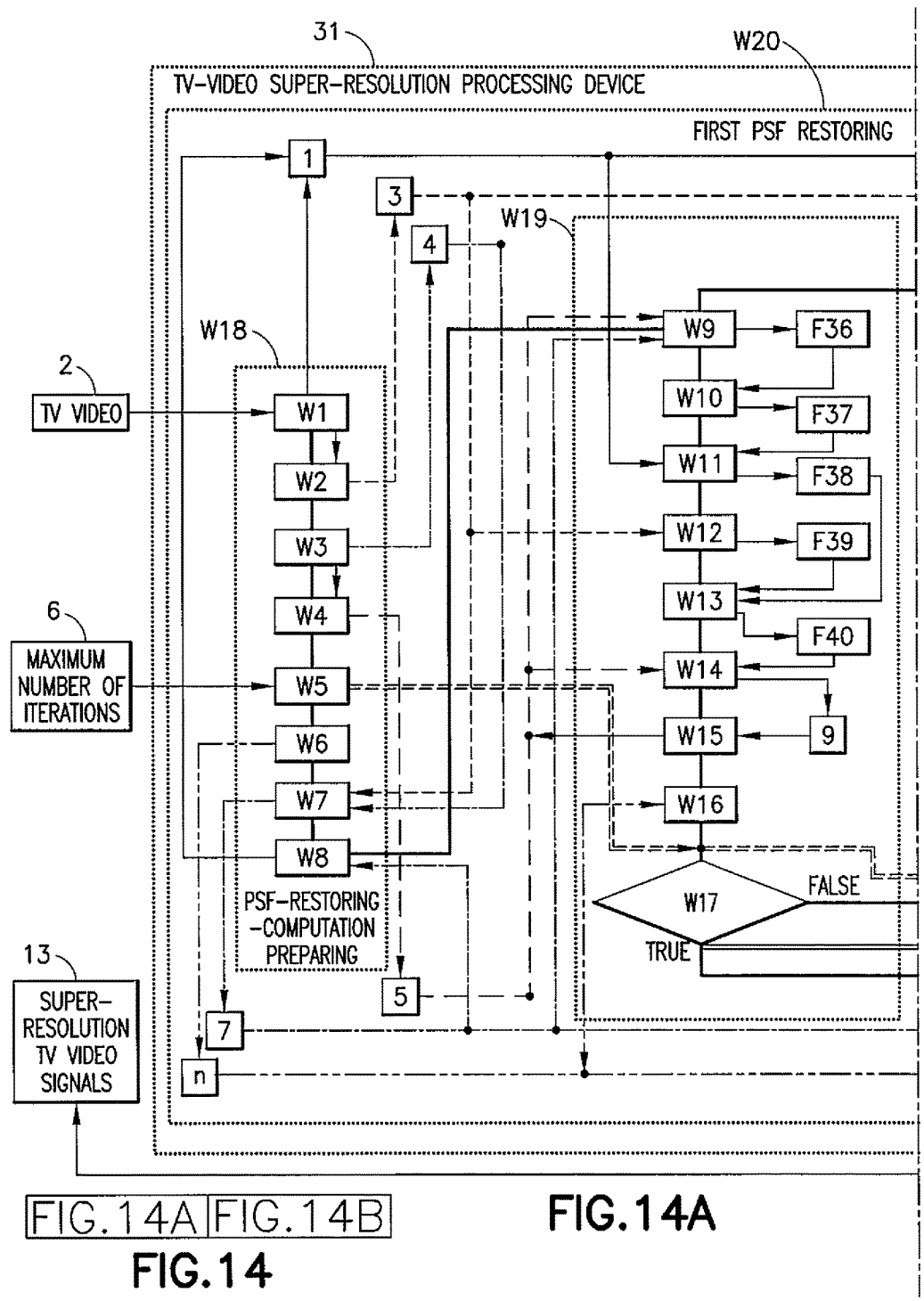
Figure 14B:
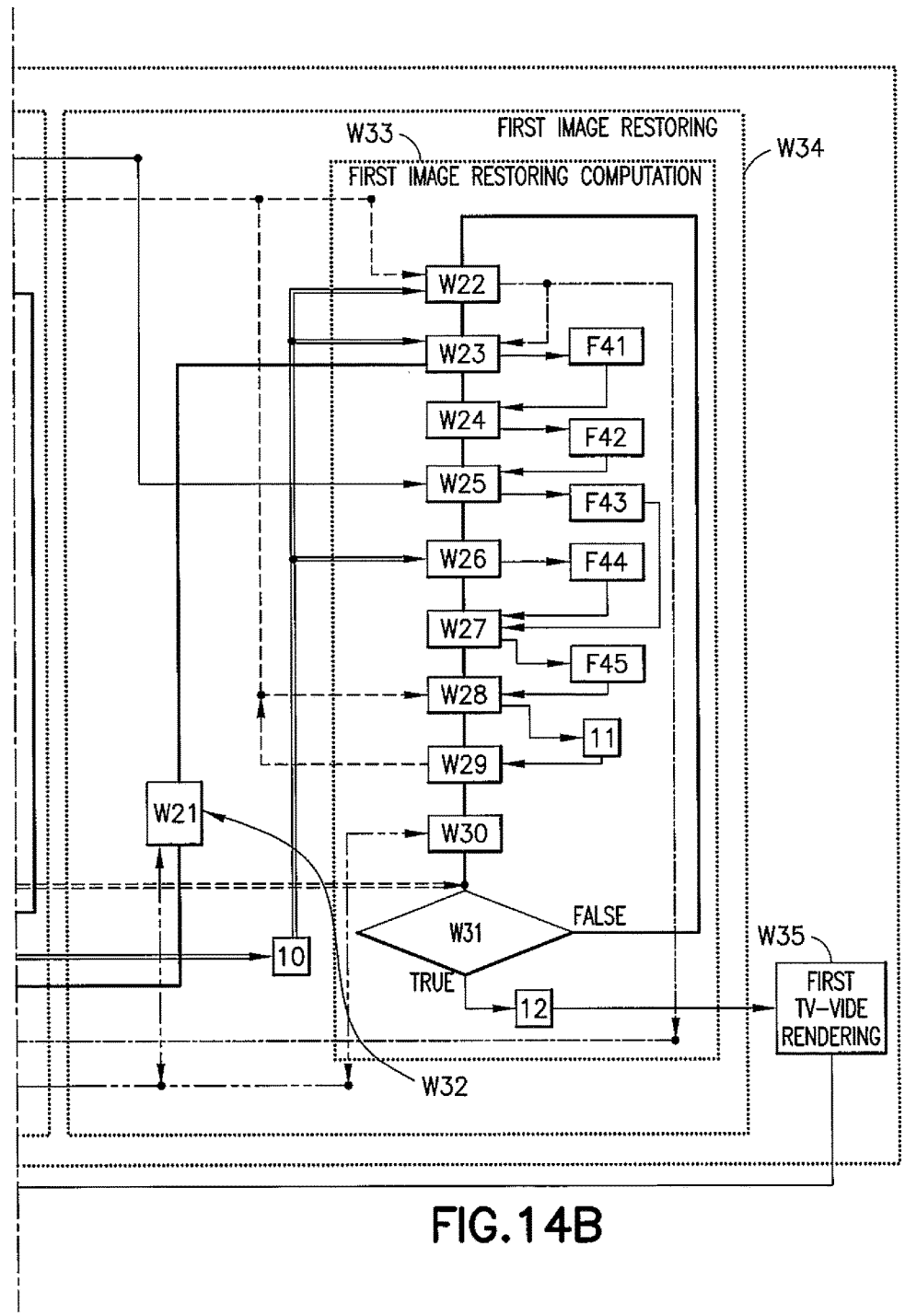

FIG. 14 (FIGS. 14A and 14B) shows an example relating to the configuration of a first TV-video super-resolution processing device 31 of an eighteenth invention according to the present invention. The first TV-video super-resolution processing device 31 shown in FIG. 14A is characterized by including (W1) a first degraded-image preparing means for preparing, from the TV video 2, a luminance distribution 1 of a degraded image constituted of a single-frame luminance distribution; (W2) a means for setting the luminance distribution 1 of the degraded image as an estimated luminance distribution 3 of restored-image initial values; (W3) a first PSF identifying means for identifying a PSF luminance distribution 4; (W4) a means for setting the identified PSF luminance distribution 4 as an estimated luminance distribution 5 of PSF initial values; (W5) a means for setting a maximum number of iterations 6; (W6) a means for resetting a counter that counts the number of iterations; (W7) a first restored-image-initial-value correcting means for copying the estimated luminance distribution 3 of the restored-image initial values and setting the estimated luminance distribution 3 as an estimated luminance distribution 7 of corrected-restored-image initial values and, when convolving the PSF luminance distribution 4 with the estimated luminance distribution 7 of the corrected-restored-image initial values, calculating a region 8 where computation is difficult, the region 8 occurring in a peripheral region in the estimated luminance distribution 7 of the corrected-restored-image initial values, on the basis of the image size of the PSF luminance distribution 4, copying the pixels in the region 8 where computation is difficult, and pasting the copied pixels to the outside of the boundary of the estimated luminance distribution 7 of the corrected-restored-image initial values in mirror symmetry with respect to the boundary, thereby correcting the estimated luminance distribution 7 of the corrected-restored-image initial values to obtain an estimated luminance distribution 7 of the corrected-restored-image initial values; (W8) a means for setting the estimated luminance distribution 7 of the corrected-restored-image initial values as a luminance distribution 1 of the degraded image; (W9) a means for convolving the estimated luminance distribution 5 of the PSF initial values with the estimated luminance distribution 7 of the corrected-restored-image initial values to obtain a thirty-sixth function F36; (W10) a means for inverting the thirty-sixth function F36 to obtain a thirty-seventh function F37; (W11) a means for multiplying the thirty-seventh function F37 by the luminance distribution 1 of the degraded image to obtain a thirty-eighth function F38; (W12) a means for obtaining an inverted function of the estimated luminance distribution 7 of the corrected-restored-image initial values and setting the inverted function as a thirty-ninth function F39; (W13) a means for convolving the thirty-ninth function F39 with the thirty-eighth function F38 to obtain a fortieth function F40; (W14) a means for multiplying the estimated luminance distribution 5 of the PSF initial values by the fortieth function F40 to obtain an estimated luminance distribution 9 of a restored PSF; (W15) a means for substituting the estimated luminance distribution 9 of the restored PSF for the estimated luminance distribution 5 of the PSF initial values; (W16) a means for incrementing the counter by 1; (W17) a means for testing a hypothesis that the value of the counter has exceeded the maximum number of iterations 6, returning to means (W9) if the test result is false, and outputting the estimated luminance distribution 9 of the restored PSF as a luminance distribution 10 of a maximum-likelihood restored PSF if the test result is true; (W18) a PSF-restoring-computation preparing means constituted of means (W1) to (W8); and (W19) a first PSF restoring computation means constituted of means (W9) to (W17), is also characterized by including (W20) a first PSF restoring means for completing the maximum number of iterations 6 by executing iterations in ascending order of the index on S in the PSF-restoring-computation preparing means W17 and the first PSF restoring computation means W18 and outputting the luminance distribution 10 of the maximum-likelihood restored PSF; (W21) a means for resetting the counter and jumping to (W23); (W22) a second restored-image-initial-value correcting means, constituted of the same processing procedure as the first restored-image-initial-value correcting means, for correcting the estimated luminance distribution 3 of the restored-image initial values on the basis of the image size of the luminance distribution 10 of the maximum-likelihood restored PSF to obtain an estimated luminance distribution 7 of the corrected-restored-image initial values; (W23) a means for convolving the luminance distribution 10 of the maximum-likelihood restored PSF with the estimated luminance distribution 7 of the corrected-restored-image initial values to obtain a forty-first function F41; (W24) a means for inverting the forty-first function F41 to obtain a forty-second function F42; (W25) a means for multiplying the forty-second function F42 by the luminance distribution 1 of the degraded image to obtain a forty-third function F43; (W26) a means for obtaining an inverted function of the luminance distribution 10 of the maximum-likelihood restored PSF and setting the inverted function as a forty-fourth function F44; (W27) a means for convolving the forty-fourth function F44 with the forty-third function F43 to obtain a forty-fifth function F45; (W28) a means for multiplying the estimated luminance distribution 3 of the restored-image initial values by the forty-fifth function F45 to obtain an estimated luminance distribution 11 of the restored image; (W29) a means for substituting the estimated luminance distribution 11 of the restored image for the estimated luminance distribution 3 of the restored-image initial values; (W30) a means for incrementing the counter by 1; (W31) a means for testing a hypothesis that the value of the counter has exceeded the maximum number of iterations 6, returning to means (W22) if the test result is false, and outputting the estimated luminance distribution 11 of the restored image as a luminance distribution 12 of a maximum-likelihood restored image if the test result is true; (W32) a first image-restoring computation preparing means constituted of means (W21); and (W33) a first image restoring computation means constituted of means (W22) to (W31), and is also characterized by including (W34) a first image restoring means for completing the maximum number of iterations 6 by executing iterations in ascending order of the index on S in the first image-restoring computation preparing means W32 and the first image restoring computation means W33 and outputting the luminance distribution 12 of the maximum-likelihood restored image; and (W35) a first TV-video rendering means for rendering the luminance distribution 12 of the maximum-likelihood restored image into TV video and outputting single-frame super-resolution TV video signals 13.

The first image-restoring computation preparing means W7 is a means for correcting the estimated luminance distribution 3 of the restored-image initial values according to the processing procedure of the first image-restoring computation preparing step S7 to obtain an estimated luminance distribution 7 of corrected-restored-image initial values.

Figure 15:
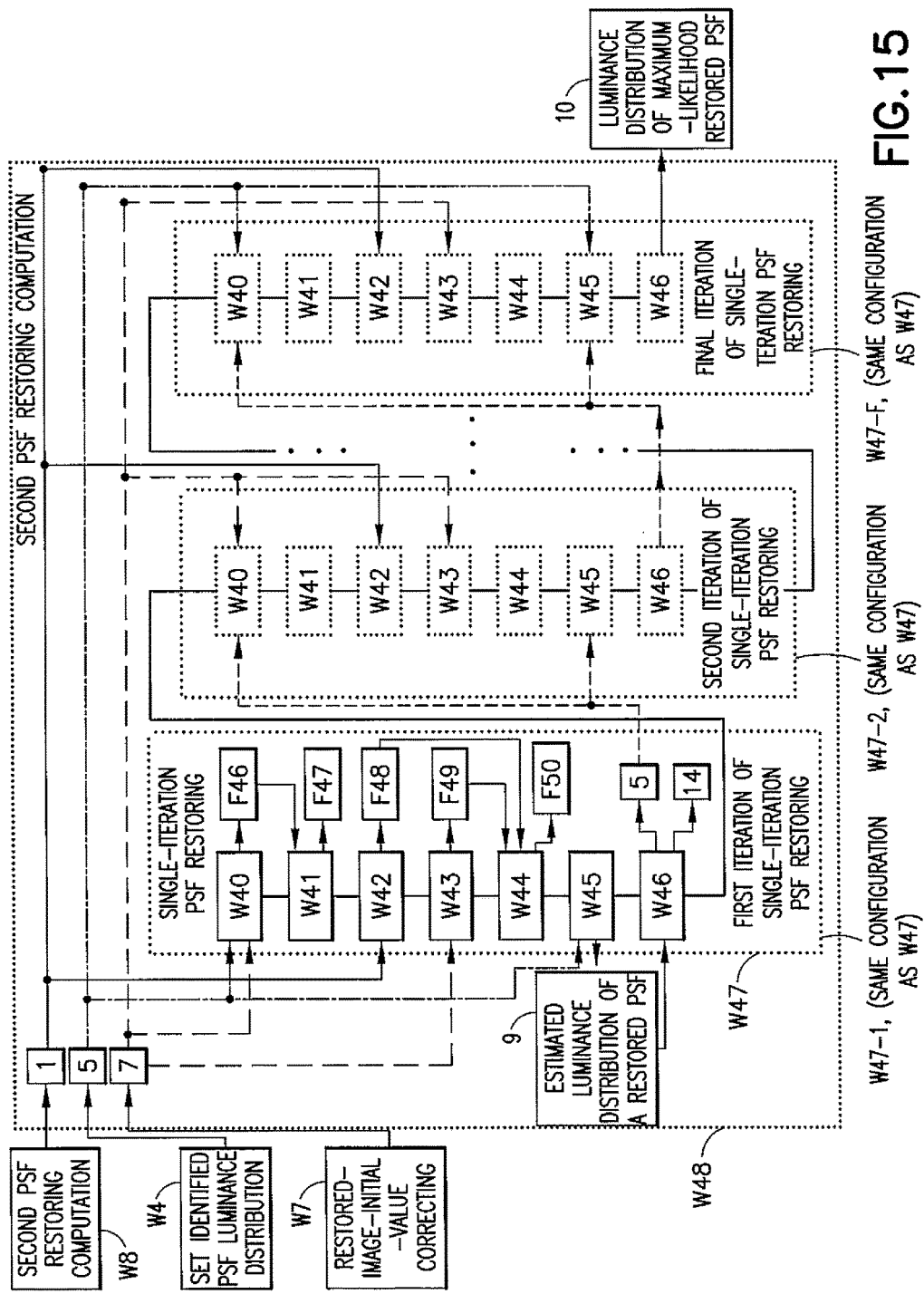
FIG. 15 is a diagram showing an example relating to the configuration of a second PSF restoring computation means of a nineteenth invention according to the present invention.

FIG. 15 shows an example relating to the configuration of a second PSF restoring computation means W48 of a nineteenth invention according to the present invention. The second PSF restoring computation means is characterized by including (W40) a means for convolving the estimated luminance distribution 5 of the PSF initial values with the estimated luminance distribution 7 of the corrected-restored-image initial values to obtain a forty-sixth function F46; (W41) a means for inverting the forty-sixth function F46 to obtain a forty-seventh function F47; (W42) a means for multiplying the forty-seventh function F47 by the luminance distribution 1 of the degraded image to obtain a forty-eighth function F48; (W43) a means for obtaining an inverted function of the estimated luminance distribution 7 of the corrected-restored-image initial values and setting the inverted function as a forty-ninth function F49; (W44) a means for convolving the forty-ninth function F49 with the forty-eighth function F48 to obtain a fiftieth function F50; (W45) a means for multiplying the estimated luminance distribution 5 of the PSF initial values by the fiftieth function F50 to obtain an estimated luminance distribution 9 of a restored PSF; (W46) a means for outputting the estimated luminance distribution 9 of the restored PSF as the estimated luminance distribution 3 of the PSF initial values and the final values 14 of the estimated luminance distribution 9 of the restored PSF; (W47) a single-iteration PSF restoring means, including means (W40) to (W46), for executing one iteration sequentially in ascending order of the index on S; and (W48) a second PSF restoring computation means constituted of a series connection of a number of stages of the single-iteration PSF restoring means, corresponding to the maximum number of iterations, and is characterized in that, in the second PSF restoring computation means W48, a number of iterations corresponding to the number of stages of the single-iteration PSF restoring means W47 connected in series are executed, and the final values 14 of the estimated luminance distribution 9 of the restored PSF output from the final stage W47-F of the single-iteration PSF restoring means are output as a luminance distribution 10 of the maximum-likelihood restored PSF.

Figure 16:
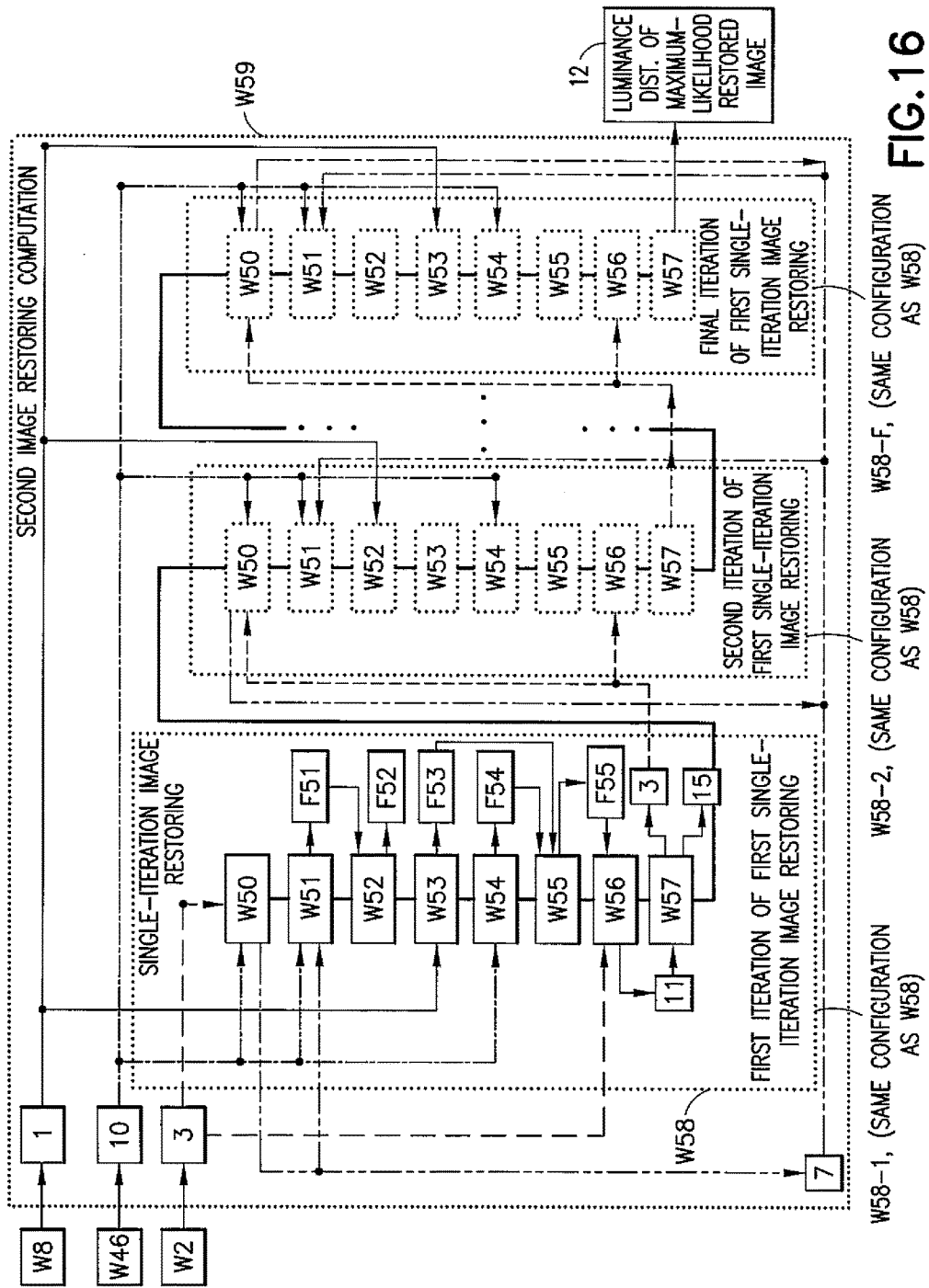
FIG. 16 is a diagram showing an example relating to the configuration of a second image restoring computation means of a twentieth invention according to the present invention.

FIG. 16 shows an example relating to the configuration of a second image restoring computation means of a twentieth invention according to the present invention. The second image restoring computation means W59 shown in FIG. 16 is characterized by including (W50) a third restored-image-initial-value correcting means, constituted of the same configuration as the first restored-image-initial-value correcting means, for correcting the estimated luminance distribution 3 of the restored-image initial values on the basis of the image size of the luminance distribution 10 of the maximum-likelihood restored PSF to obtain an estimated luminance distribution 7 of the corrected-restored-image initial values; (W51) a means for convolving the luminance distribution 10 of the maximum-likelihood restored PSF with the estimated luminance distribution 7 of the corrected-restored-image initial values to obtain a fifty-first function; (W52) a means for inverting the fifty-first function to obtain a fifty-second function; (W53) a means for multiplying the fifty-second function by the luminance distribution 1 of the degraded image to obtain a fifty-third function; (W54) a means for obtaining an inverted function of the luminance distribution 10 of the maximum-likelihood restored PSF and setting the inverted function as a fifty-fourth function; (W55) a means for convolving the fifty-fourth function with the fifty-third function to obtain a fifty-fifth function; (W56) a means for multiplying the estimated luminance distribution 3 of the restored-image initial values by the fifty-fifth function to obtain an estimated luminance distribution 11 of the restored image; (W57) a means for outputting the estimated luminance distribution 11 of the restored image as the estimated luminance distribution 3 of the restored-image initial values and the final values 15 of the estimated luminance distribution 11 of the restored image; (W58) a single-iteration image restoring means, including means (W50) to (W57), for executing one iteration sequentially in ascending order of the index on S; and (W59) a second image restoring computation means constituted of a series connection of a number of stages of the single-iteration image restoring means S58, corresponding to the maximum number of iterations 6, and is characterized in that, in the second image restoring computation means W59, a number of iterations corresponding to the number of stages of the single-iteration image restoring means W58 connected in series are executed, and the final values 15 of the estimated luminance distribution 11 of the restored image output from the final stage W58-F of the single-iteration image restoring means are output as a luminance distribution 12 of the maximum-likelihood restored image.

Figure 17:
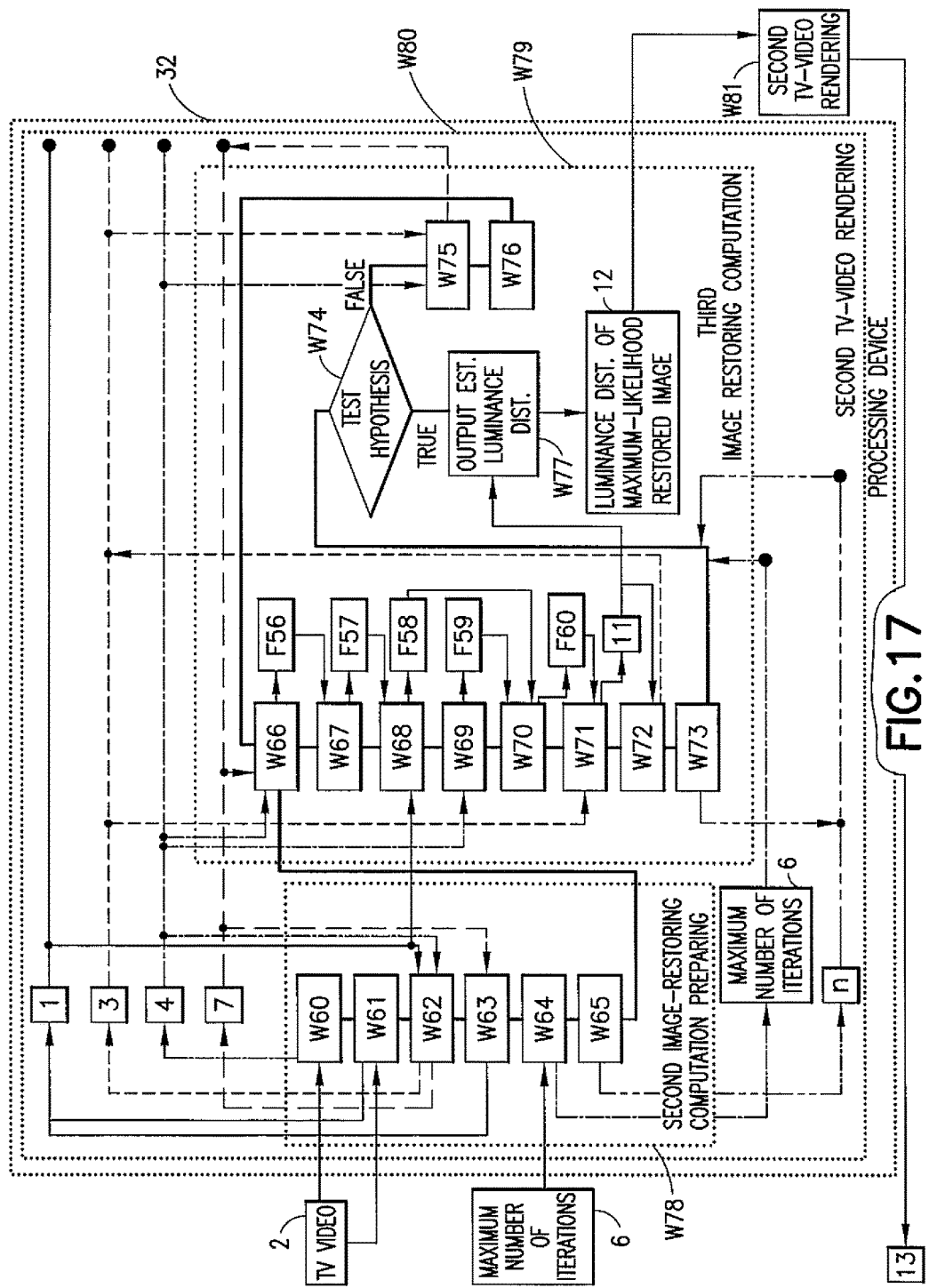
FIG. 17 is a diagram showing an example relating to the configuration of a second TV-video super-resolution processing device of a twenty-first invention according to the present invention.

FIG. 17 shows an example relating to the configuration of a second TV-video super-resolution processing device 32 of a twenty-first invention according to the present invention. The second TV-video super-resolution processing device 32 shown in FIG. 17 is characterized by including (W60) a second PSF identifying means for identifying a PSF luminance distribution 4 suitable for the degradation state of the TV video while the TV video 2 is being viewed; (W61) a second degraded-image preparing means for preparing, from the TV video 2, a luminance distribution 1 of a degraded image constituted of a single-frame luminance distribution; (W62) a fourth restored-image-initial-value correcting means, constituted of the same processing procedure as the first restored-image-initial-value correcting means, of copying the luminance distribution 1 of the degraded image and setting the luminance distribution as an estimated luminance distribution 3 of the restored-image initial values, and correcting the estimated luminance distribution 3 of the restored-image initial values on the basis of the image size of the PSF luminance distribution 4 to obtain an estimated luminance distribution 7 of corrected-restored-image initial values; (W63) a means for setting the estimated luminance distribution 7 of the corrected-restored-image initial values as a luminance distribution 1 of the degraded image; (W64) a means for setting a maximum number of iterations 6; (W65) a means for resetting the value n of a counter that counts the number of iterations to 0; (W66) a means for convolving the identified PSF luminance distribution 4 with the estimated luminance distribution 7 of the corrected-restored-image initial values to obtain a fifty-sixth function F56; (W67) a means for inverting the fifty-sixth function F56 to obtain a fifty seventh function F57; (W68) a means for multiplying the fifty-seventh function F57 by the luminance distribution 1 of the degraded image to obtain a fifty-eighth function F58; (W69) a means for obtaining an inverted function of the PSF luminance distribution 4 and setting the inverted function as a fifty-ninth function F59; (W70) a means for convolving the fifty-ninth function F59 with the fifty-eighth function F58 to obtain a sixtieth function F60; (W71) a means for multiplying the estimated luminance distribution 3 of the restored-image initial values by the sixtieth function F60 to obtain an estimated luminance distribution 11 of the restored image; (W72) a means for substituting the estimated luminance distribution 11 of the restored image for the estimated luminance distribution 3 of the restored-image initial values; (W73) a means for incrementing the counter by 1; (W74) a means for testing a hypothesis that the value of the counter is greater than or equal to the maximum number of iterations 6, jumping to means (W75) if the test result is false, and jumping to means (W77) if the test result is true; (W75) a fifth restored-image-initial-value correcting means, constituted of the same processing procedure as the first restored-image-initial-value correcting means, for correcting the estimated luminance distribution 3 of the restored-image initial values on the basis of the image size of the PSF luminance distribution 4 to obtain an estimated luminance distribution 7 of the corrected-restored-image initial values; (W76) a means for jumping to W66; (W77) a means for outputting the estimated luminance distribution 11 of the restored image as a luminance distribution 12 of a maximum-likelihood restored image; (W78) a second image-restoring computation-preparing means constituted of means (W60) to (W65); (W79) a third image restoring computation means constituted of means (W66) to (W78); (W80) a second image restoring means, including the second image-restoring computation preparing means S78 and the third image restoring computation means S79, of completing the maximum number of iterations 6 by executing iterations in ascending order of the index on S and outputting the luminance distribution 12 of the maximum-likelihood restored image; and (W81) a second TV-video rendering means for rendering the luminance distribution 12 of the maximum-likelihood restored image into TV video and outputting single-frame super-resolution TV video signals 13.

Figure 18:
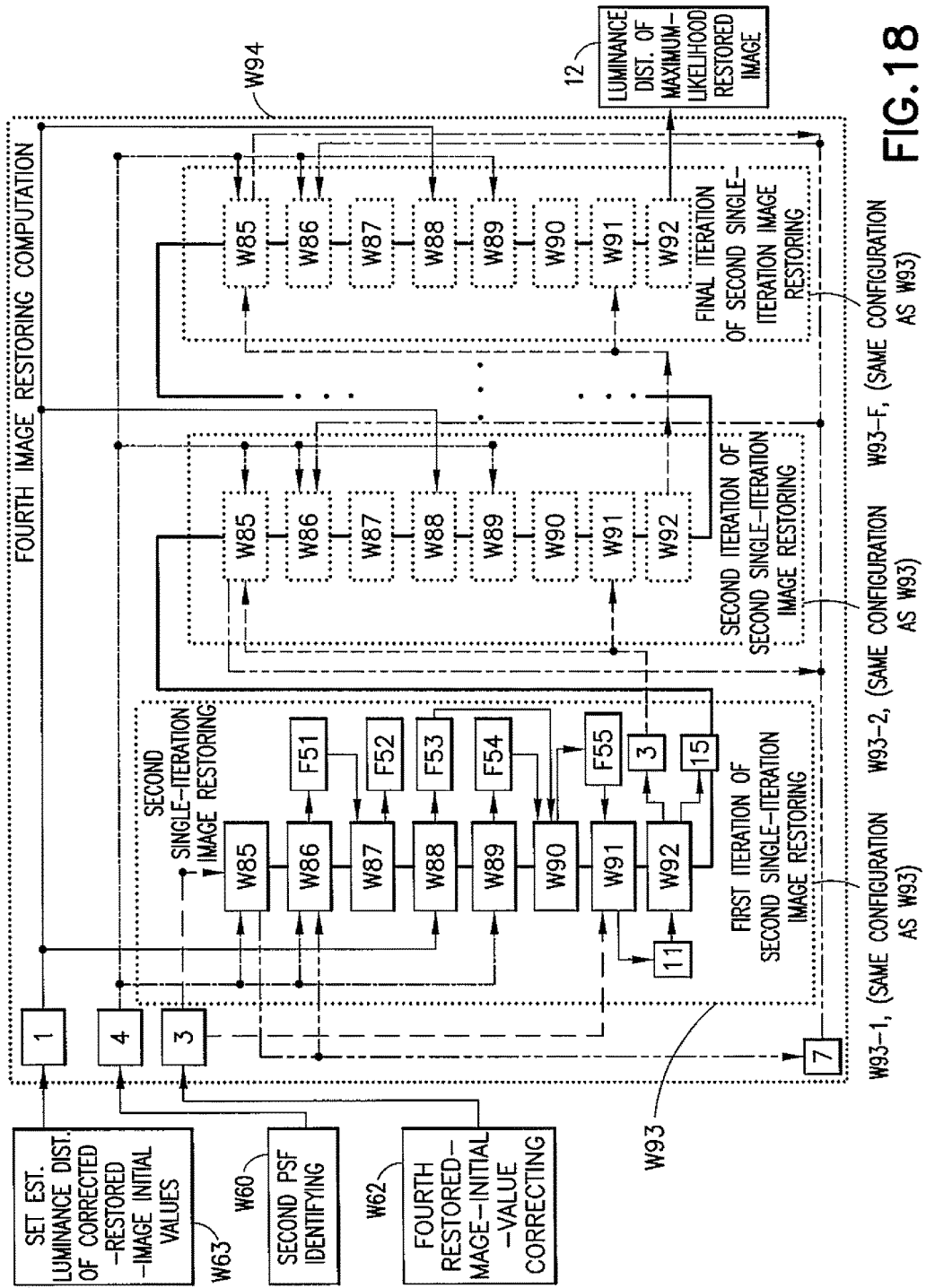
FIG. 18 is a diagram showing an example relating to the configuration of a fourth image restoring computation means of a twenty-second invention according to the present invention.

FIG. 18 shows an example relating to the configuration of a fourth image restoring computation means W94 of a twenty-second invention according to the present invention. The fourth image restoring computation means W94 shown in FIG. 18 is characterized by including (W85) a sixth restored-image-initial-value correcting means, constituted of the same processing procedure as the first restored-image-initial-value correcting means, for correcting the estimated luminance distribution 3 of the restored-image initial values on the basis of the image size of the PSF luminance distribution 4 to obtain an estimated luminance distribution 7 of corrected-restored-image initial values; (W86) a means for convolving the PSF luminance distribution 4 with the estimated luminance distribution 7 of the corrected restored-image initial values to obtain a sixty-first function; (W87) a means for inverting the sixty-first function to obtain a sixty-second function; (W88) a means for multiplying the sixty-second function by the luminance distribution 1 of the degraded image to obtain a sixty-third function; (W89) a means for obtaining an inverted function of the PSF luminance distribution 4 and setting the inverted function as a sixty-fourth function; (W90) a means for convolving the sixty-fourth function with the sixty-third function to obtain a sixty-fifth function; (W91) a means for multiplying the estimated luminance distribution 3 of the restored-image initial values by the sixty-fifth function to obtain an estimated luminance distribution of the restored image; (W92) a means for outputting the estimated luminance distribution 11 of the restored image as the estimated luminance distribution 3 of the restored-image initial values and the final values 15 of the estimated luminance distribution 11 of the restored image; (W93) a second single-iteration image restoring means, including means (W85) to (W92), for executing one iteration sequentially in ascending order of the index on S; and (W94) a fourth image restoring computation means constituted of a series connection of a number of stages of the second single-iteration image restoring means W93, corresponding to the maximum number of iterations 6, and is characterized in that, in the fourth image restoring computation means W94, a number of iterations corresponding to the number of stages of the second single-iteration image restoring means W93 connected in series are executed, and the final values 15 of the estimated luminance distribution 11 of the restored image output from the final stage W93-F of the second single-iteration image restoring means are output as a luminance distribution of the maximum-likelihood restored image.

Figure 19:
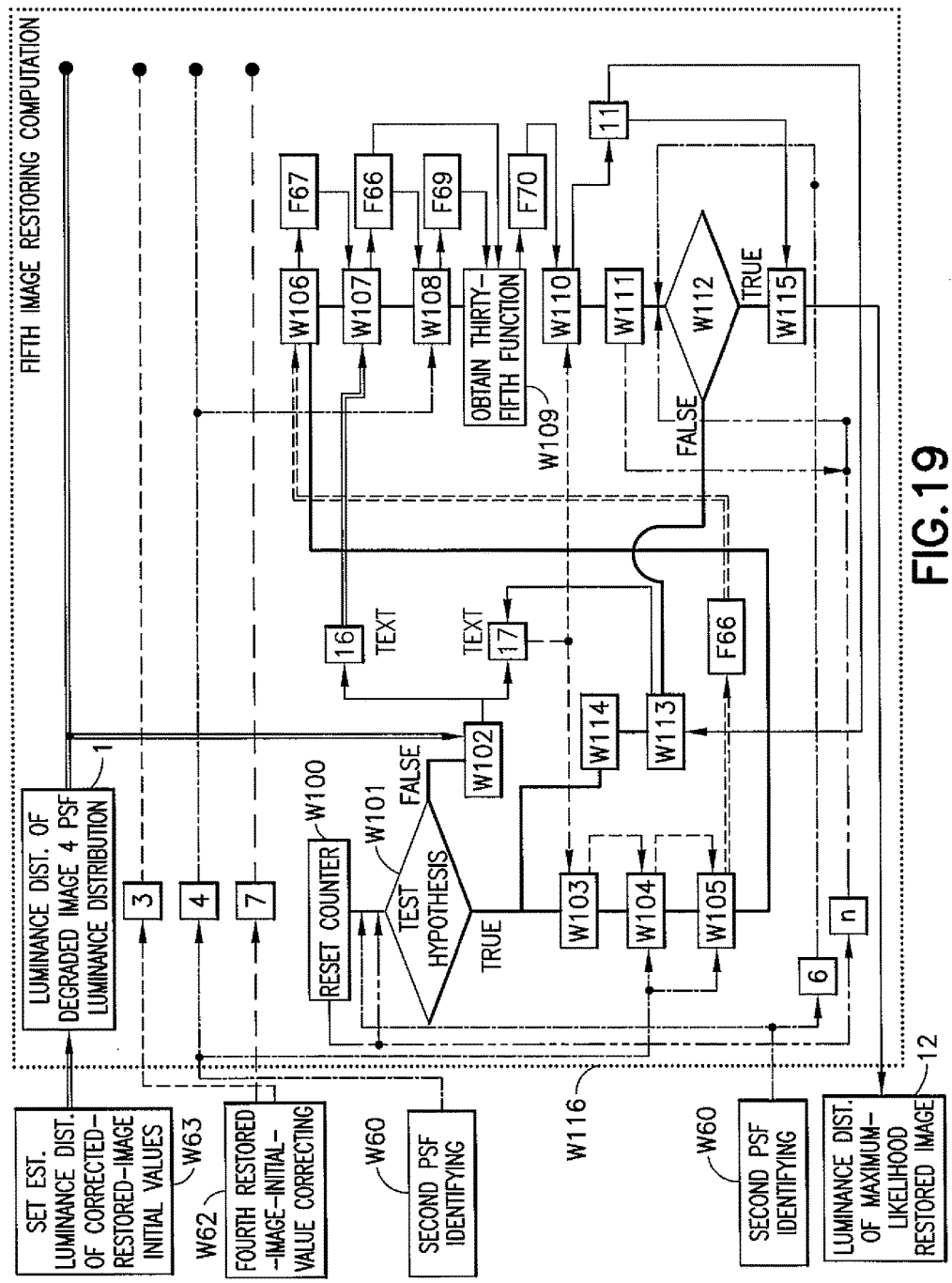
FIG. 19 is a diagram showing an example relating to the configuration of a fifth image restoring computation means of a twenty-third invention according to the present invention.

FIG. 19 shows an example relating to the configuration of a fifth image restoring computation means of a twenty-third invention according to the present invention. The fifth image restoring computation means shown in FIG. 19 is characterized by including (W100) a means for resetting the value n of the counter that counts the number of iterations; (W101) a means for testing a hypothesis that the value of the counter is not 0, jumping to (W102) if the test result is false, and jumping to (W103) if the test result is true; (W102) a means for transferring the luminance distribution 1 of the degraded image to a buffer 16 for saving the luminance distribution of the degraded image and to a buffer 17 for the estimated luminance distribution of the restored-image initial values; (W103) a means for loading the estimated luminance distribution 3 of the restored-image initial values from the buffer 17 for the estimated luminance distribution of the restored-image initial values; (W104) a seventh restored-image-initial-value correcting means, constituted of the same processing procedure as the first restored-image-initial-value correcting means, for correcting the estimated luminance distribution 3 of the restored-image initial values on the basis of the image size of the PSF luminance distribution 4 to obtain an estimated luminance distribution 7 of corrected-restored-image initial values; (W105) a means for convolving the PSF luminance distribution 4 with the estimated luminance distribution 7 of the corrected-restored-image initial values to obtain a sixty-sixth function F66; (W106) a means for inverting the sixty-sixth function to obtain a sixty-seventh function F67; (W107) a means for multiplying the sixty-seventh function F67 with the luminance distribution 1 of the degraded image to obtain a sixty-eighth function F68; (W108) a means for obtaining an inverted function of the PSF luminance distribution and setting the inverted function as a sixty-ninth function F69; (W109) a means for convolving the sixty-ninth function F69 with the sixty-eighth function F68 to obtain a seventieth function F70; (W110) a means for multiplying the estimated luminance distribution 3 of the restored-image initial values by the thirty-fifth function to obtain an estimated luminance distribution 11 of the restored image; (W111) a means for incrementing the counter by 1; (W112) a means for testing a hypothesis that the value of the counter has exceeded the maximum number of iterations 6, jumping to (W113) if the test result is false, and jumping to (W115) if the test result is true; (W113) a means for transferring the estimated luminance distribution 11 of the restored image to the buffer 17 for the estimated luminance distribution of the restored-image initial values; (W114) a means for jumping to (W103); (W115) a means for outputting the estimated luminance distribution 11 of the restored image as the luminance distribution 12 of the maximum-likelihood restored image; and (W116) a fifth image restoring computation means, including means (W100) to (W115), for completing the maximum number of iterations 6 by executing iterations sequentially in ascending order of the index on S and outputting the luminance distribution 12 of the maximum-likelihood restored image. The twenty-third invention is the same as the invention described in Claim 23.

Figure 20:
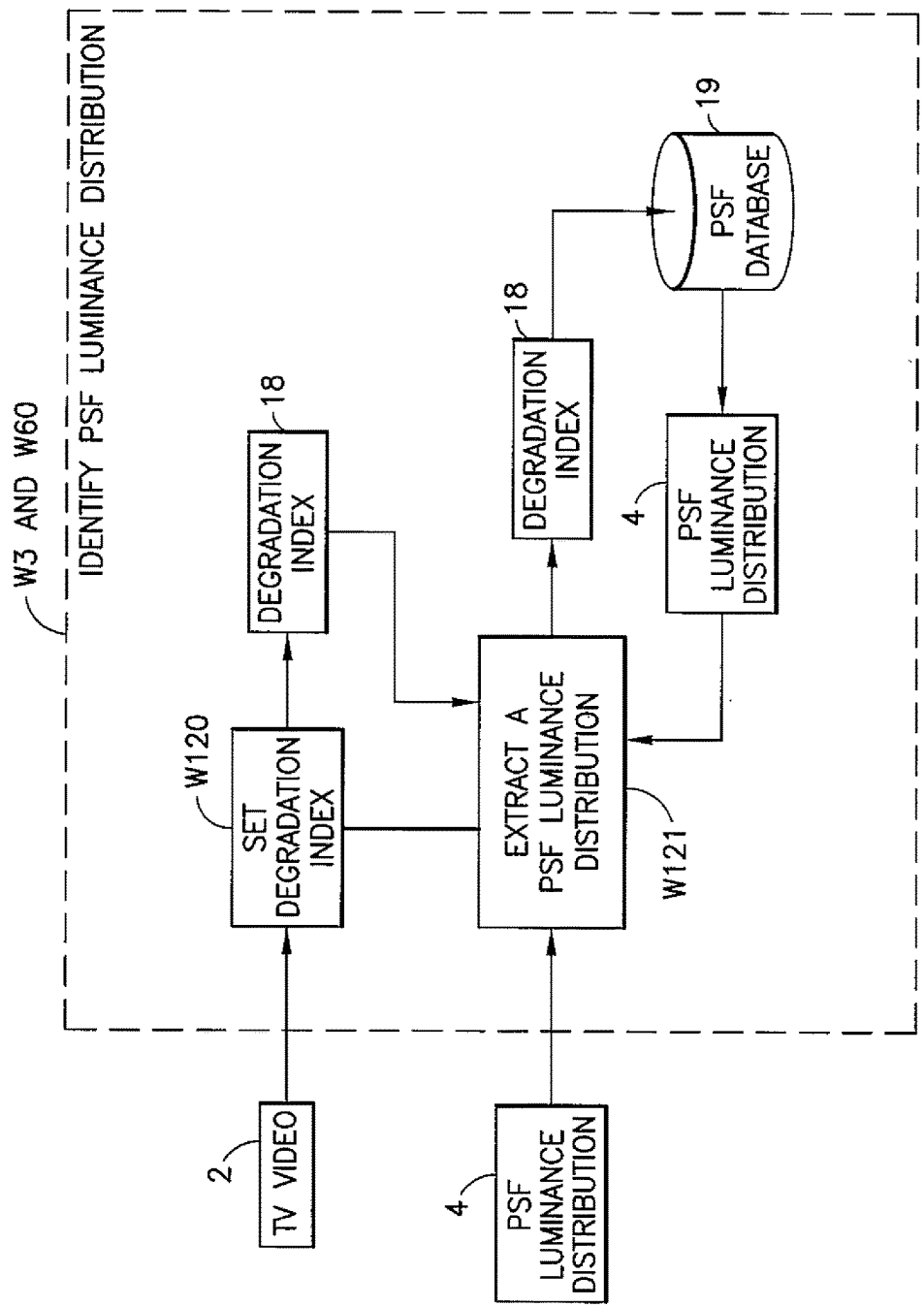
FIG. 20 is a diagram showing an example relating to the configuration of a first PSF identifying means and a second PSF identifying means of a twenty-fourth invention according to the present invention.

FIG. 20 shows an example relating to the configuration of a first PSF identifying means W3 and a second PSF identifying means W60 of a twenty-fourth invention according to the present invention. The first PSF identifying means W3 and the second PSF identifying means W60 shown in FIG. 20 are characterized by including (W120) a means for setting a degradation index 18 corresponding to the degree of optical degradation of TV video 2 displayed on a monitor; and (W121) a means for extracting a PSF luminance distribution 4 associated with the degradation index 18 from a PSF database 19.

Figure 21:
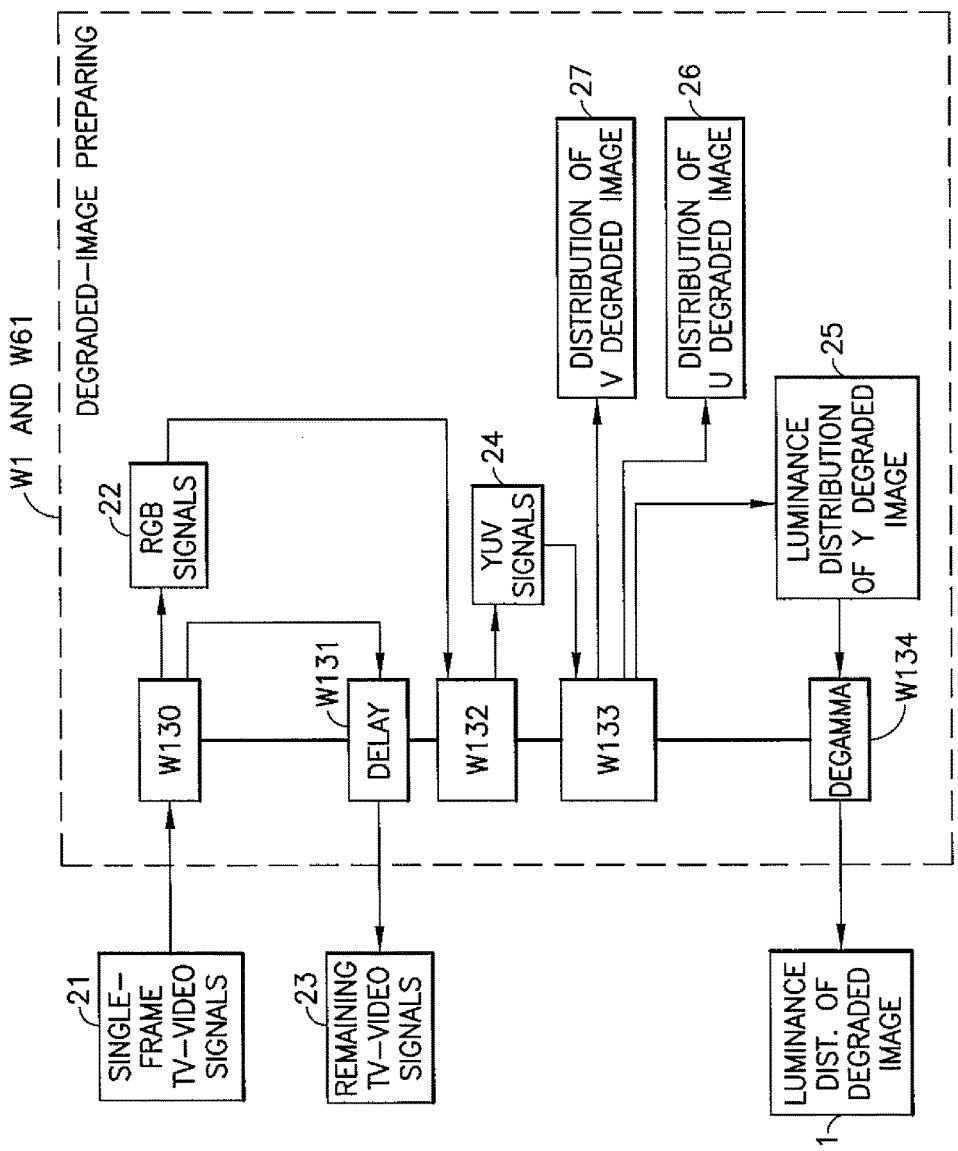
FIG. 21 is a diagram showing an example relating to the configuration of a first degraded-image preparing means and a second degraded-image preparing means of a twenty-fifth invention according to the present invention.

FIG. 21 shows an example relating to the configuration of a first degraded-image preparing means W1 and a second degraded-image preparing means W61 of a twenty-fifth invention according to the present invention. The first degraded-image preparing means W1 and the second degraded-image preparing means W61 shown in FIG. 21 are characterized by including (W130) an RGB-signal extracting means for extracting RGB signals 22 constituting a frame from TV video signals 21 for the frame; (W131) a delaying means for outputting, with a delay corresponding to one frame, the TV video signals 23 remaining after extracting the RGB signals 22 from the single-frame TV video signals 21; (W132) a YUV conversion means for subjecting the RGB signals 22 to YUV conversion to obtain YUV signals 24; (W133) a Y-degraded-image extracting means for extracting a luminance distribution 1 of a degraded image constituted of only Y signals representing luminance components among the YUV signals 24 to obtain a luminance distribution 25 of a Y degraded image and keeping a distribution 26 of a U degraded image constituted of only the remaining U signals and a distribution 27 of a V degraded image constituted of only the remaining V signals; and (W134) a degamma processing means for executing degamma processing of the luminance distribution 25 of the Y degraded image to obtain and output a luminance distribution 1 of a degraded image constituted of a single-frame luminance distribution. The twenty-fifth invention is the same as the invention described in Claim 25.

Figure 22:
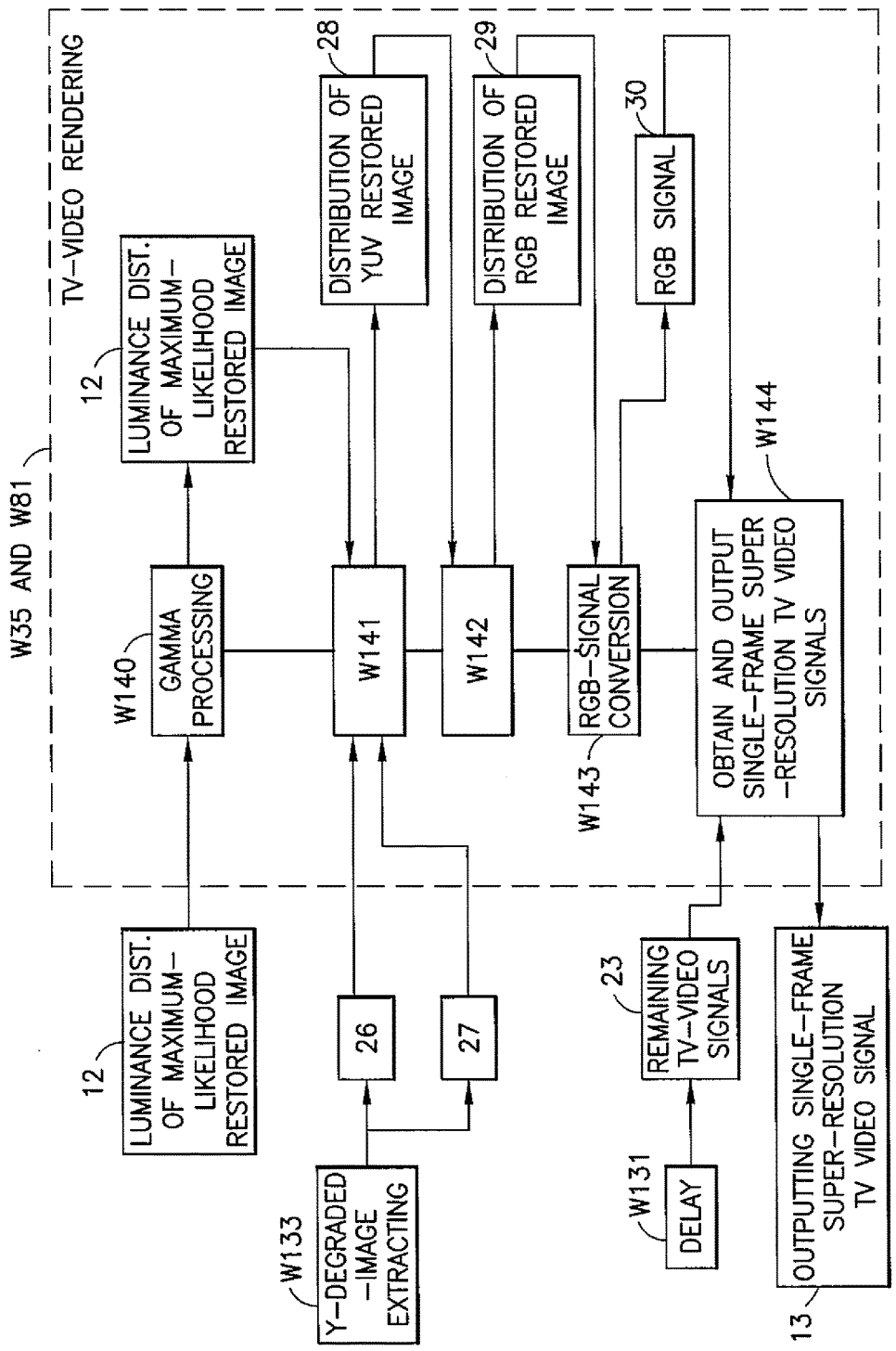
FIG. 22 is a diagram showing an example relating to the configuration of a first TV-video rendering means and a second TV-video rendering means of a twenty-sixth invention according to the present invention.

FIG. 22 shows an example relating to the configuration of a first TV-video rendering means W35 and a second TV-video rendering means W81 of a twenty-sixth invention according to the present invention. The first TV-video rendering means W35 and the second TV-video rendering means W81 shown in FIG. 22 are characterized by including (W140) a gamma processing means for executing gamma processing of the luminance distribution 12 of the maximum-likelihood restored image; (W141) a restored-image combining means for combining the distribution 26 of the U degraded image and the distribution 27 of the V degraded image kept by the Y-degraded-image extracting means W133 with the luminance distribution 12 of the maximum-likelihood restored image after the gamma processing constituted of Y components to obtain a distribution 28 of a single YUV restored image; (W142) an RGB conversion means for executing RGB conversion of the distribution 28 of the YUV restored image to obtain a distribution 29 of an RGB restored image; (W143) an RGB-signal conversion means for reading the distribution 29 of the RGB restored image and outputting RGB signals 30; and (W144) a TV-video-signal combining means for combining the RGB signals 30 with the TV video signals 23 remaining after extracting the RGB signals 22 and output by the delaying means W131 to obtain and output single-frame super-resolution TV video signals 13.

implementing all the means constituting the third aspect of the second TV-video super-resolution processing device 32 and causing a computer to execute these means. Although programs individually written in C++ are used here as the eighth to fourteenth super-resolution processing programs, for example, programs written in another single language or a combination of other languages, such as JAVA (registered trademark), HTML, and XTML, may be used.

TABLE 2

| | Aspect | PSF restoring means | | Image restoring means | | Program name | Storage medium |
|---|---|---|---|---|---|---|---|
| First TV-video super-resolution processing device 31 | First aspect | PSF-restoring-computation preparing means | First PSF restoring computation means | First image-restoring computation preparing means | First image restoring computation means | First super-resolution processing device program | Third storage medium |
| | Second aspect | | Second PSF restoring computation means | | | Second super-resolution processing device program | |
| | Third aspect | | First PSF restoring computation means | | Second image restoring computation means | Third super-resolution processing device program | |
| | Fourth aspect | | Second PSF restoring computation means | | Second image restoring computation means | Fourth super-resolution processing device program | |
| Second TV-video super-resolution processing device 32 | First aspect | N/A | N/A | Second image-restoring computation preparing means | Third image restoring computation means | Fifth super-resolution processing device program | Fourth storage medium |
| | Second aspect | | | | Fourth image restoring computation means | Sixth super-resolution processing device program | |
| | Third aspect | | | | Fifth image restoring computation means | Seventh super-resolution processing device program | |

Table 2 is a table showing a list of four aspects of the first TV-video super-resolution processing device 31 and three aspects of the second TV-video super-resolution processing device 32, configured by using eighth to fourteenth super-resolution processing programs. According to Table 2, the eighth super-resolution processing program is a program for implementing all the means constituting the first aspect of the first TV-video super-resolution processing device 31 and causing a computer to execute these means; the ninth super-resolution processing program is a program for implementing all the means constituting the second aspect of the first TV-video super-resolution processing device 31 and causing a computer to execute these means; the tenth super-resolution processing program is a program for implementing all the means constituting the third aspect of the first TV-video super-resolution processing device 31 and causing a computer to execute these means; the eleventh super-resolution processing program is a program for implementing all the means constituting the fourth aspect of the first TV-video super-resolution processing device 31 and causing a computer to execute these means; the twelfth super-resolution processing program is a program for implementing all the means constituting the first aspect of the second TV-video super-resolution processing device 32 and causing a computer to execute these means; the thirteenth super-resolution processing program is a program for implementing all the means constituting the second aspect of the second TV-video super-resolution processing device 32 and causing a computer to execute these means; and the fourteenth super-resolution processing program is a program for As shown in Table 2, a third storage medium of a thirty-sixth invention according to the present invention is a storage medium for storing the eighth to eleventh super-resolution processing programs for implementing all the means respectively in the first to fourth aspects of the first TV-video super-resolution processing device 31 and executing all these means. A storage medium having the same specifications as the first storage medium can be used as the third storage medium.

As shown in Table 2, a fourth storage medium of a thirty-seventh invention according to the present invention is a storage medium for storing the twelfth to fourteenth super-resolution processing programs for implementing all the means respectively in the first to third aspects of the second TV-video super-resolution processing device 32 and executing all these means. A storage medium having the same specifications as the first storage medium can be used as the fourth storage medium.

The eighth to fourteenth super-resolution processing programs have the same structures in that they are device programs for implementing all the means in accordance with the types and aspects of TV-video super-resolution processing devices and defining execution procedures, in that they all involve a common super-resolution-processing-window creating program for creating a super-resolution processing window for performing operations relating to super-resolution processing and displaying the super-resolution processing window on a monitor of a computer, and in that they all involve a common super-resolution-processing-window monitoring program for constantly monitoring the position designated by using a mouse and right clicking and left clicking at the position and executing suitable processing, for actions involving targets for which right clicking, left clicking, etc. are monitored.

Embodiments

A first embodiment is a first TV-video super-resolution processing system 35 in which the first aspect of the first TV-video super-resolution processing device 31 according to the present invention (Table 2) is implemented on a computer 34 by using the first super-resolution processing device program 33. The second to fourth aspects of the first TV-video super-resolution processing device 31 do not differ from the first aspect thereof from the viewpoints of system configuration and super-resolution processing quality. Thus, the first aspect is chosen as the first embodiment as a representative example of the first TV-video super-resolution processing device 31.

Figure 23:
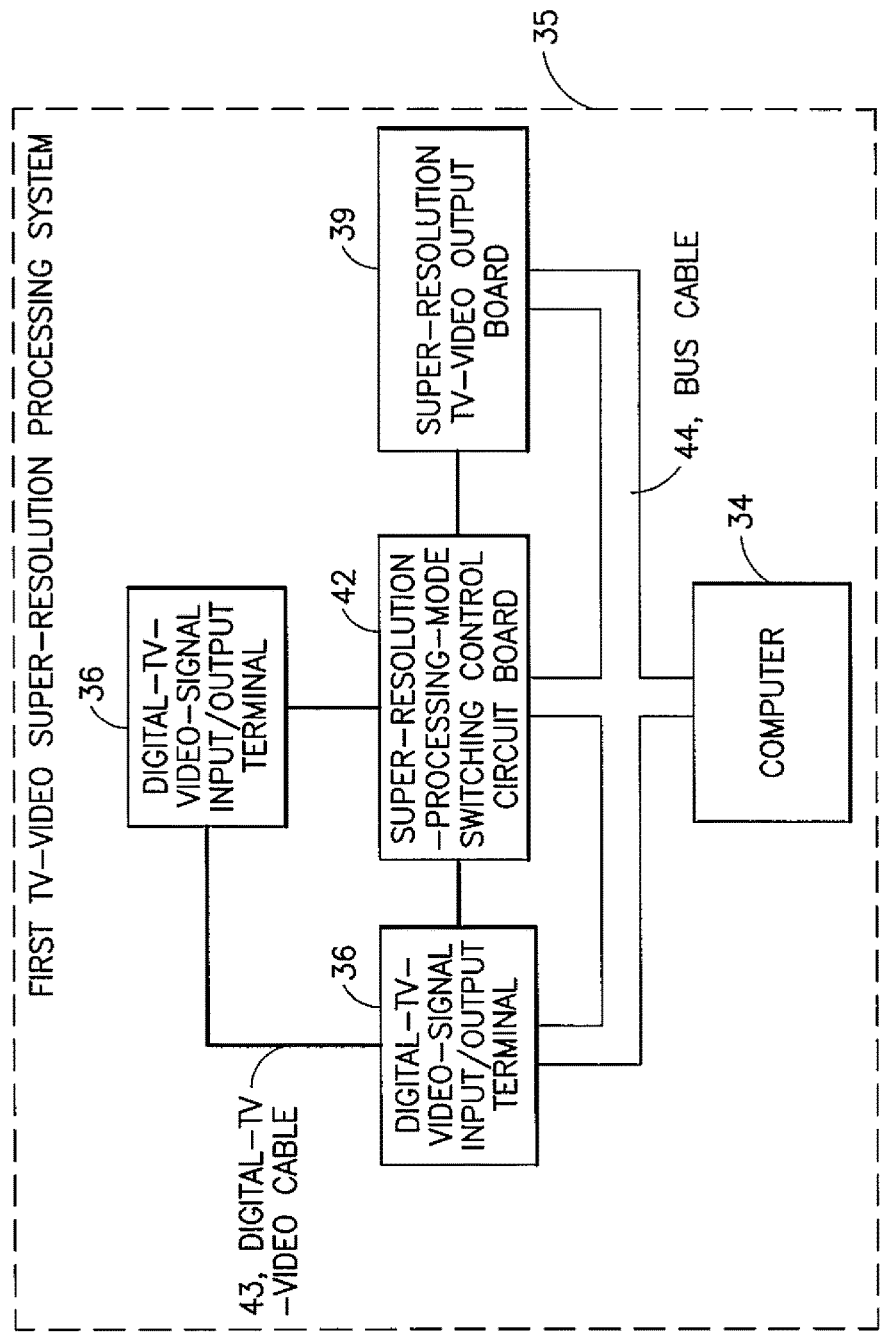
FIG. 23 is a diagram showing an example relating to the configuration of a first TV-video super-resolution processing system of a first embodiment according to the present invention.

FIG. 23 shows an example relating to the configuration of the first TV-video super-resolution processing system 35 of the first embodiment according to the present invention. The first TV-video super-resolution processing system 35 shown in FIG. 23 is constituted of: a digital-TV-video-signal input/output terminal 36 used for input/output of digital TV video signals; a computer 34 having the first TV-video super-resolution processing device 31 installed thereon; a TV-video input board 37 on which the first degraded-image preparing means W1 for preparing a luminance distribution 1 of a degraded image relating to input of TV video signals from TV video 2 is implemented by using an FPGA; a super-resolution TV-video output board 39 on which the first TV-video rendering means W35 for rendering a luminance distribution 12 of a maximum-likelihood restored image relating to output of super-resolution TV video 38 into TV video and outputting single-frame super-resolution TV-video signals 13 is implemented by using an FPGA; a super-resolution-processing-mode switching control circuit board 42 that reflects, on the super-resolution TV video signals 13, a video display method and whether to superimpose super-resolution processing conditions, which are designated by using a video-display-mode designating button 40 and a condition-display designating button 41, respectively; a digital TV-video cable 43; and a bus cable 44. In FIG. 23, a power supply cable is omitted.

Referring to FIG. 23, since hardware is used as the TV-video input board 37 and the super-resolution TV-video output board 39 in the first degraded-image preparing means W1 and the first TV-video rendering means W35 of the first TV-video super-resolution processing device 31 in the first TV-video super-resolution processing system 35 implemented on the computer 34, in the computer 34, the first degraded-image preparing means W1 is configured as a means for obtaining the luminance distribution 1 of the degraded image, output from the TV-video input board 37, and the first TV-video rendering means W35 is configured as a means for transferring the luminance distribution 12 of the maximum-likelihood restored image to the super-resolution TV-video output board 39.

Figure 24:
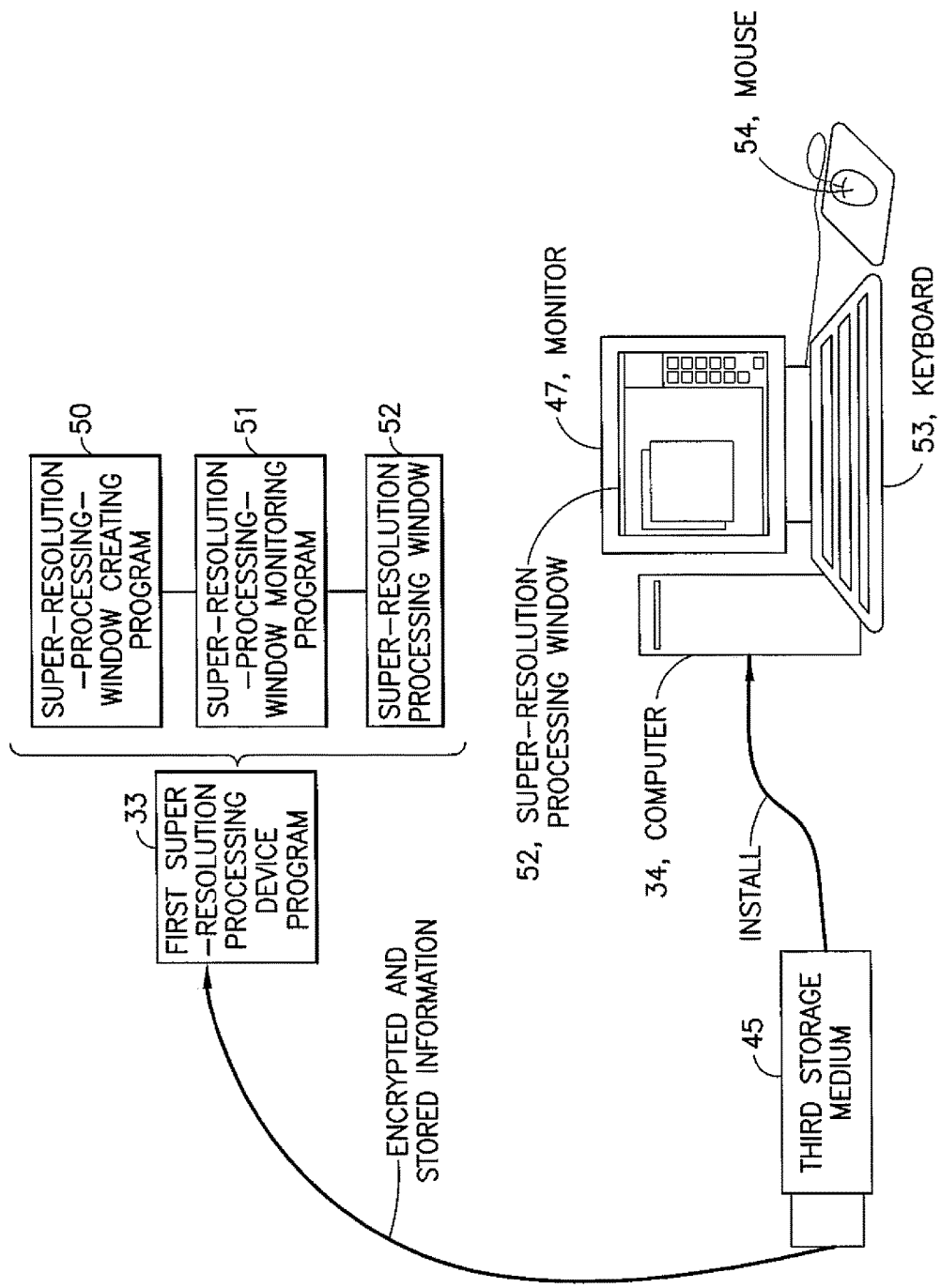
FIG. 24 is an illustration showing an example of the structure, as well as a manner of installation, of a first super-resolution processing device program according to the present invention.

Referring to FIG. 23, in configuring the first TV-video super-resolution processing device 31 on the computer 34, first, following an example shown in FIG. 24, the third storage medium 45 is connected to a USB terminal on the rear side of the computer 34, and then the first super-resolution processing device program 33 stored in the third storage medium 45 is installed on the computer 34. Then, the computer 34 displays a first TV-video super-resolution processing device icon 46 used to activate the first TV-video super-resolution processing device 31 on a screen displayed on a monitor 47. Then, a user 48 clicks on the first TV-video super-resolution processing device icon 46 to activate the first TV-video super-resolution processing device 31. Then, first, a device program 49 in the first super-resolution processing device program 33 is activated, thus realizing all the means in the first TV-video super-resolution processing device 31 for executing processing according to the first TV-video super-resolution processing method. Then, a super-resolution-processing-window creating program 50 is activated, whereby a super-resolution processing window 52 used for performing operations relating to super-resolution processing in the first TV-video super-resolution processing device 31 is created and displayed on the monitor 47. Then, a super-resolution-processing-window monitoring program 51 is activated, whereby processing for monitoring a position designated by using buttons on a keyboard 53 of the computer 34 or a mouse 54 of the computer 34 and right clicking or left clicking at that position, as well as processing for executing processing suitable for actions involving targets for which right clicking and left clicking are monitored, are continued until a close button 52 in the super-resolution processing window 52 is pressed.

Figure 25:
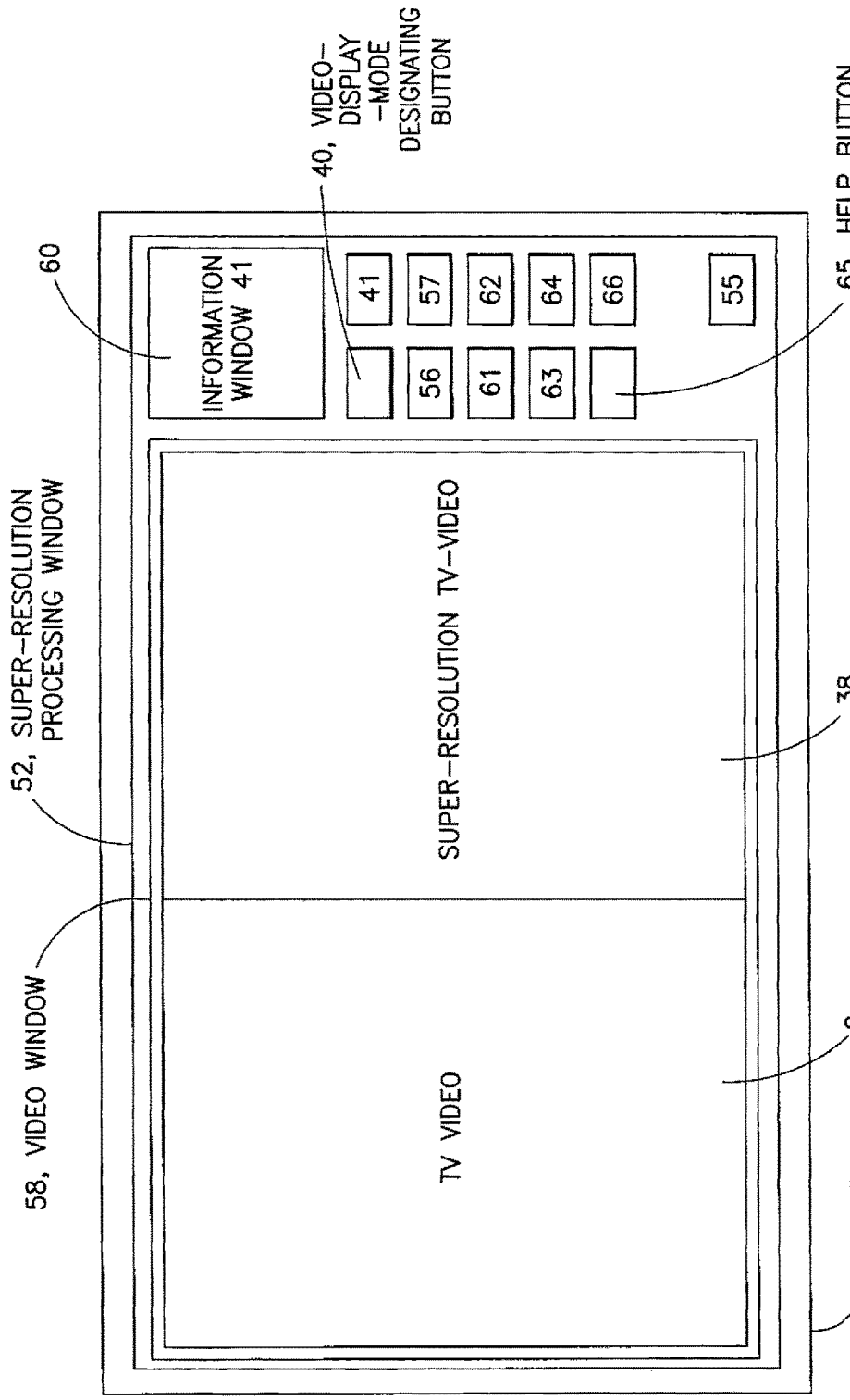
FIG. 25 is an illustration showing an example relating to the configuration of a super-resolution processing window according to the present invention.

FIG. 25 shows an example relating to the configuration of the super-resolution processing window 52. The super-resolution processing window 52 shown in FIG. 25 is constituted of a video-display-mode designating button 40 used for selecting, from a pull-down menu, one of a half-division test mode, an input-video mode for displaying only TV video 2, and a super-resolution TV-video mode for displaying only super-resolution TV video 38 as a video display mode in a video window 58; a condition-display designating button 41 in the form of a toggle switch, used for displaying a maximum number of iterations 6 and a degradation index 18 as super-resolution processing conditions in such a manner as to be superimposed at the top right corner of the super-resolution TV video 38; a close button 55 used to close the super-resolution-processing window 52; a degradation-index setting button 56 for setting the degradation index 18 by designating a number from 0 to 255 representing 256 levels from a pull-down menu (a default value is indicated by a pale blue background in the pull-down menu in the present invention); a maximum-number-of-iterations setting button 57 used to select a value from a list in a combo box that opens when the button is clicked on or to directly enter and set a maximum number of iterations 6 over a default value displayed in a text box; a video window 58 for displaying TV video 2, super-resolution TV video 38, etc.; an information window 60 for displaying the current date and time, super-resolution conditions, system messages, etc., having a vertical scroll bar at the right end; a super-resolution-processing start button 61 that is clicked on to start super-resolution processing under the set conditions; a super-resolution-processing suspend button 62 that is clicked on to suspend super-resolution processing; a super-resolution-processing resume button 63 for resuming suspended super-resolution processing; a super-resolution-processing stop button 64 that is clicked on to stop super-resolution processing; a help button 65 for opening a help window and searching and displaying help content; and a video enlarge/reduce button 66 that is used after video that is to be enlarged or reduced in the video window 58 is designated by clicking, the designated video being displayed in an enlarged form when "+" in this button is pressed, in an enlarged form when "−" is pressed, and at the original default magnification factor when "0" is pressed. FIG. 25 shows the state of video display in the test mode.

The computer 34 is constituted of a 64-bit instruction set, 32-bit, 6-core/chip CPU (Central Processing Unit), a GPU (Graphic Processing Unit), a memory not less than 32 GBytes, an HDD having a storage capacity not less than 1 TBytes, an SDD (Solidstate Disk Drive) having a storage capacity not less than 128 GBytes, at least three USB terminals, at least one LAN (Local Area Network) terminal, a wireless communication module such as a WiFi (Wireless Fidelity) or Bluetooth (registered trademark) module, a phone terminal, a keyboard 53, a mouse 54, an FHD (Full High Definition) display, Windows (registered trademark) 8 O/S from Microsoft, Visual Studio 2010 (registered trademark) (including Visual C++ 2010) from Microsoft, and Office 2013 (registered trademark) from Microsoft. The computer 34 can communicate with other computers by way of WiFi, Bluetooth (registered trademark), LAN, USB, and the Internet. As the computer 34, a computer selected from a variety of desktop computers that are mass-produced and available on the market is used. Alternatively, however, a workstation having similar specifications may be used. Furthermore, although the type of O/S differs, a server may be used.

Figure 26:
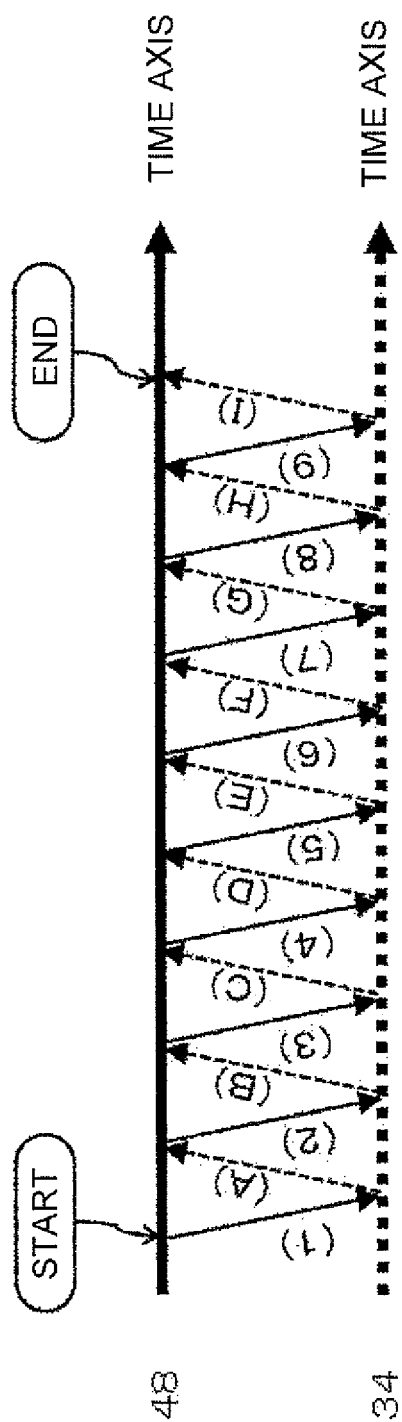
FIG. 26 is a diagram showing, in the form of a transaction table, an example of a procedure for executing super-resolution processing in a first TV-video super-resolution processing system according to the present invention.

FIG. 26 shows, in the form of a transaction table, an example of a procedure for executing super-resolution processing in the first TV-video super-resolution processing system 35. The transaction table shown in FIG. 26 is constituted of a time axis (solid line) for the user 48, solid arrows representing operations input by the user 48, diagonally extending from the time axis for the user 48, a time axis (dotted line) for the computer 34, dotted arrows representing responses by the computer 34, diagonally extending from the time axis for the computer 34, and text-containing ellipses representing the start and end timings.

The procedure for executing super-resolution processing in the first TV-video super-resolution processing system 35 according to the transaction table shown in FIG. 26 is as follows. (1) In an "activation" step, the user 48 clicks on the first TV-video super-resolution processing device icon 46, and then the computer 34 (A) displays the super-resolution processing window 52 on the monitor 47. (2) In a "super-resolution-processing-condition input-1" step, the user 48 clicks on the degradation-index setting button 56, and then the computer 34 (B) expands and displays a pull-down menu at the position of the degradation-index setting button 56. (3) In a "super-resolution-processing-condition input-2" step, the user 48 selects an appropriate value from the pull-down menu, and then the computer 34 (C) captures the degradation index 18 and closes the pull-down menu. (4) In a "super-resolution-processing-condition input-3" step, the user 48 clicks on the maximum-number-of-iterations setting button 57, and then the computer 34 (D) expands a combo box at the position of the maximum-number-of-iterations setting button 57. (5) In a "super-resolution-processing-condition input-4" step, the user 48 selects from the combo box or enters an appropriate value, and then the computer 34 (E) captures the maximum number of iterations 6 and closes the combo box. (6) In a "super-resolution-processing-condition input-5" step, the user 48 clicks on the video-display-mode designating button 40, and then the computer 34 (F) expands a pull-down menu at the position of the video-display-mode designating button 40. (7) In a "super-resolution-processing-condition input-6" step, the user 48 selects an appropriate mode from the pull-down menu, and then the computer 34 (G) captures the video-display-mode designating button 40 and closes the pull-down menu. (8) In a "super-resolution-processing-condition input-7" step, the user 48 clicks on the condition-display designating button 41, and then the computer 34 (H) inverts the color of the condition-display designating button 41 to indicate display setting. (9) In a "super-resolution-processing start" step, the user 48 clicks on the super-resolution-processing start button 48, and then the computer 34 (I) executes super-resolution processing to display super-resolution TV video 38 and TV video 2 in the video window 58 according to the video-display-mode designating button 40 and the condition-display designating button 41. Since accesses to the buttons in the super-resolution processing window 52 are constantly being monitored even during super-resolution processing, if the super-resolution-processing conditions are to be changed, when the user 48 clicks on the video-display-mode designating button 40, the condition-display designating button 41, the degradation-index setting button 56, or the maximum-number-of-iterations setting button 57 to set the conditions again, the changes in the super-resolution-processing conditions are reflected while the video is continuously displayed. When the user 48 wants to quit super-resolution processing, the user 48 clicks on the close button 55. Then, the computer 34 closes the super-resolution processing window 52 in response to this clicking and also deactivates the first TV-video super-resolution processing device 31.

According to the super-resolution processing procedure shown in FIG. 26, the user 48 first executed step (1) to display the super-resolution processing window 52 on the monitor 47. Then, the user 48 executed step (2) to expand and display a pull-down menu at the position of the degradation-index setting button 56. Then, in step (3), perceiving that the degree of degradation of the TV video 2 was small while viewing terrestrial digital TV 59 in which the TV video 2 was being displayed, the user 48 selected 14 as the degradation index 18 (the default value was 60 among 256 levels). Then, the user 48 executed step (4) to expand a combo box at the position of the maximum-number-of-iterations setting button 57. Then, in step (5), perceiving that the degree of degradation of the TV video 2 was small while viewing terrestrial digital TV 59 in which the TV video 2 was being displayed, the user 48 selected 4 as the maximum number of iterations 6 (the default value was 3). Then, the user 48 executed step (6) to expand a pull-down menu at the position of the video-display-mode designating button 40. Then, in step (7), since the super-resolution processing conditions were not fixed yet, the user 48 selected the test mode. Then, the user 48 executed step (8) to select display setting with the condition-display designating button 41. Then, the user 48 executed step (9) to execute super-resolution processing. Then, the TV video 2 and the super-resolution TV video 38 were displayed side by side in a half-division fashion in the video window 58 of the super-resolution processing window 52. The user 48 was satisfied with these super-resolution processing conditions and operated the terrestrial digital TV 59 to switch the input setting to video, whereby the video being displayed in the video window 58 was displayed full-screen on the terrestrial digital TV 59. Then, the user 48 operated the video-display-mode designating button 40 to switch to the super-resolution-TV-video mode, viewing the super-resolution TV video 38 displayed in the video window 58 and full-screen on the terrestrial digital TV 59.

Figure 27:
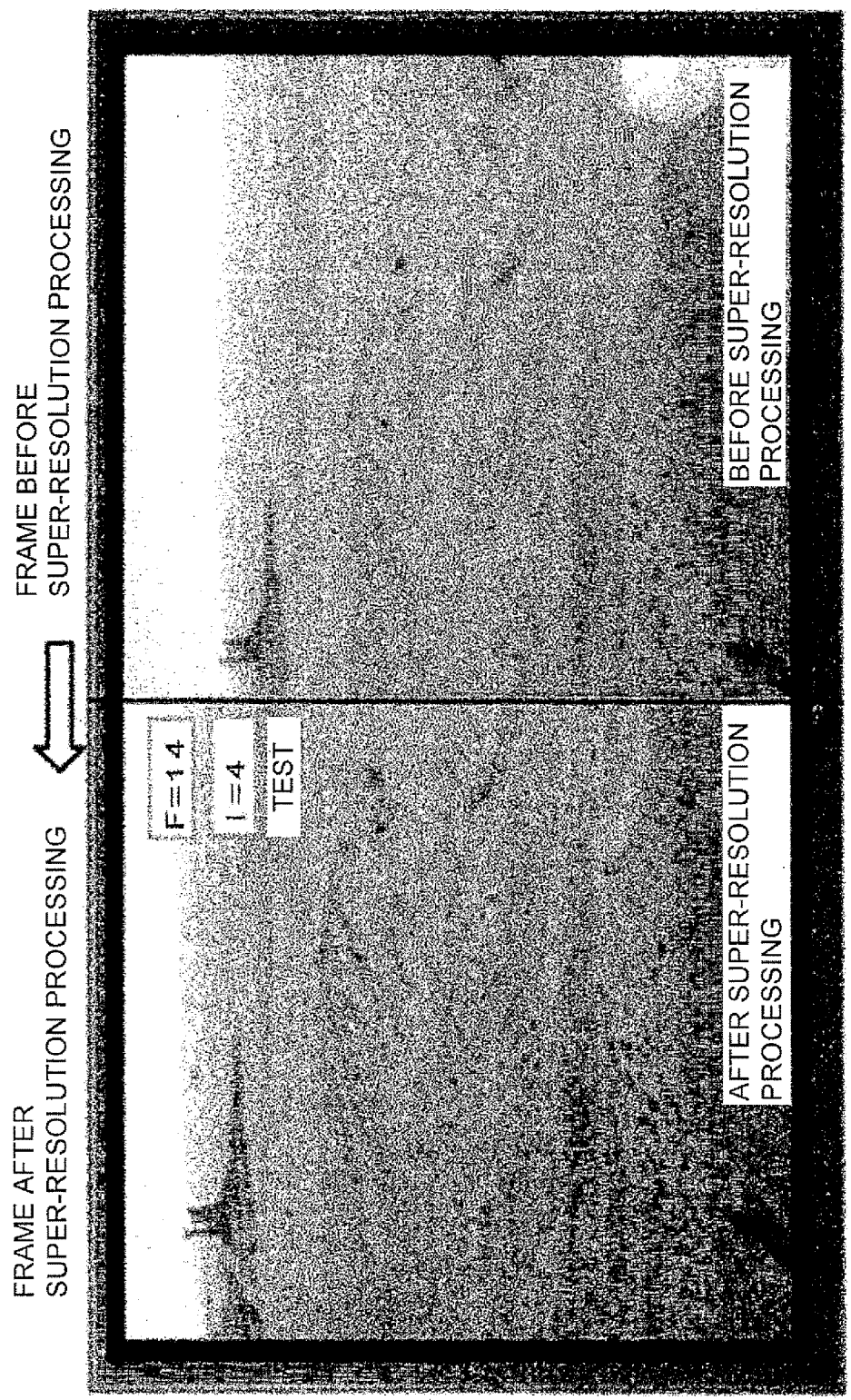
FIG. 27 is a drawing showing an example of the state of super-resolution processing according to the first embodiment.

FIG. 27 is a drawing showing an example of the state of super-resolution processing according to the first embodiment. FIG. 27 shows one video frame displayed in a half-division fashion in the test mode such that the TV video 2 and the super-resolution TV video 38 are displayed side by side. The right half represents a frame of the TV video 2 before super-resolution processing, and the left half represents a frame of the super-resolution TV video 38, obtained by subjecting the frame in the right half to super-resolution processing. At the top right corner of the frame of the super-resolution TV video 38, the degradation index 18 is displayed with a symbol F, the maximum number of iterations 6 is displayed with a symbol I, and an abbreviation "test" is displayed to indicate that the video display mode is the test mode. It is understood from FIG. 27 that, although the display start position of the TV video 2 is somewhat shifted to the right compared with that of the super-resolution TV video 38, the super-resolution quality achieved by the first TV-video super-resolution processing system 35 of the first embodiment according to the present invention is sufficiently practical.

A second embodiment is a second TV-video super-resolution processing system 67, which is an application of the first aspect of the second TV-video super-resolution processing device 32 according to the present invention (Table 2). The second TV-video super-resolution processing system 67 is configured by replacing the first super-resolution processing device program 33 for the first TV-video super-resolution processing system 35 with a fifth super-resolution processing device program 68. However, since there is no change to the super-resolution processing window 52, which is the interface between the user 48 and the computer 34, there is no change in the system or the super-resolution processing procedure as viewed from the user 48. However, since the first PSF restoring means W19 is not included in the second TV-video super-resolution processing system 67, the number of processing means is about half, which provides a feature that the processing execution speed is high. On the other hand, there is a disadvantage in that it is sensitive to the setting of the degradation index 18. As long as TV video is used and the settings of super-resolution processing conditions are the same as in the first embodiment, the quality of super-resolution processing is substantially the same as that in the first embodiment, and results similar to those in the example shown in FIG. 27 are obtained. Furthermore, the second and third aspects of the second TV-video super-resolution processing device 32 do not differ from the first aspect thereof from the viewpoints of system configuration and super-resolution-processing quality.

A third embodiment is a first set-top box 69, which is a hardware implementation of the fourth aspect of the first TV-video super-resolution processing device 31 (Table 2).

Figure 28:
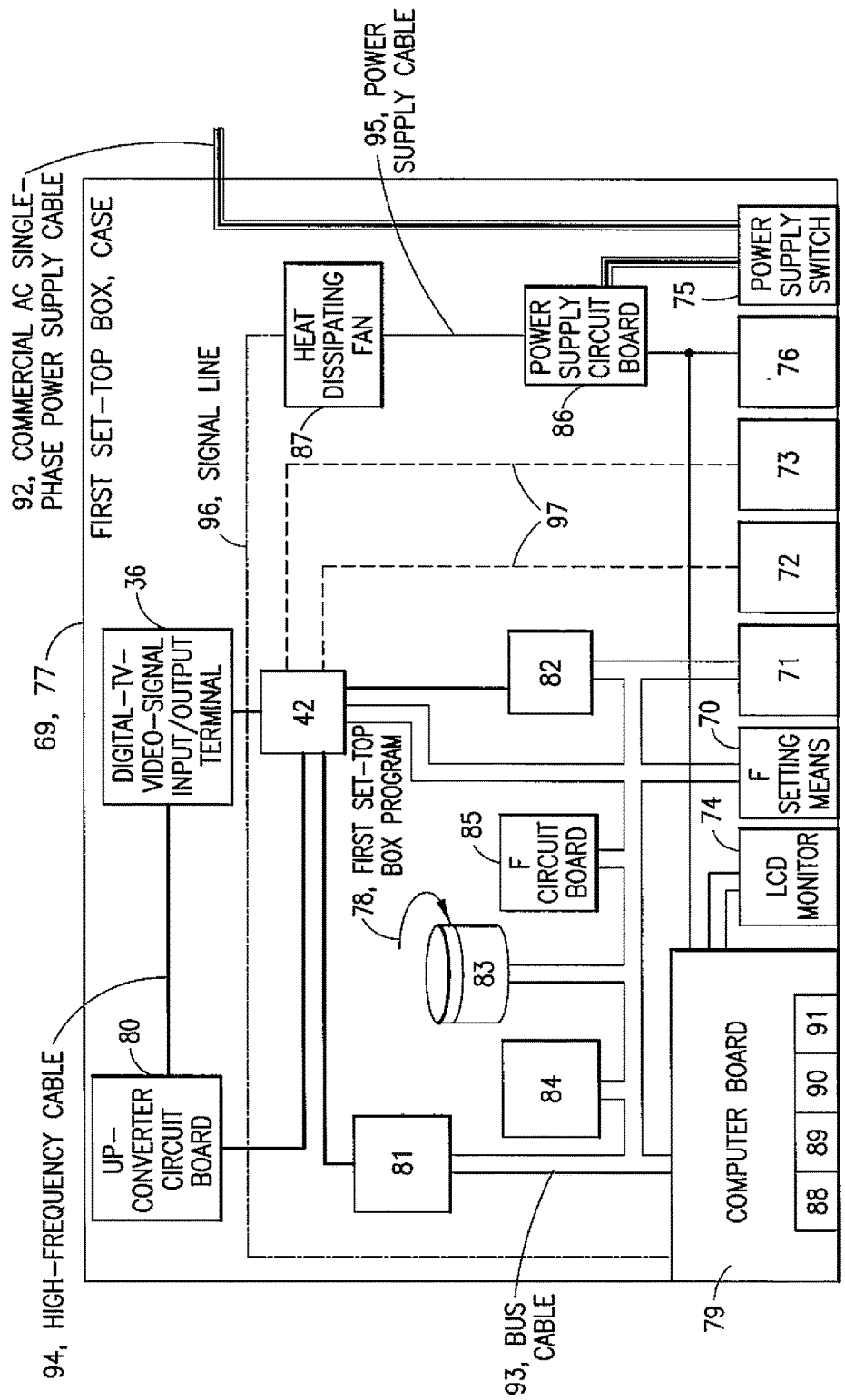
FIG. 28 is a diagram showing an example relating to the internal configuration of a first set-top box according to a third embodiment.

FIG. 28 is a diagram showing an example of the internal configuration of the first set-top box 69 according to the third embodiment. The first set-top box 69 shown in FIG. 28 is constituted of: a digital-TV-video-signal input/output terminal 36 used for input/output of digital TV-video signals; an F setting means 70 used to set a degradation index 18 indicating a degree of degradation of TV video 2; an I setting means 71 used to set a maximum number of iterations 6; a mode switch 72 for switching the super-resolution processing mode between testing and main processing; a condition-display switch 73 for designating whether to superimpose the super-resolution processing mode and the values of the F setting means 70 and I setting means 71 on TV video signals; an LCD (Liquid Crystal Display) monitor 74 for constantly monitoring the super-resolution processing mode and the values of the F setting means 70 and I setting means 71; a power supply switch 75 used to turn on/off the power supply for the first set-top box 69; an LED (Light Emitting Diode) lamp 76 that turns on only when the power supply switch 75 is on; a case 77; a computer board 79 in which all the means of the fourth aspect of the first TV-video super-resolution processing device 31, except the first PSF restoring computation means W18 and the first image restoring computation means W32, are defined in advance by installing a first set-top box program 78; an up-converter circuit board 80 that automatically determines whether digital TV video signals are digital interlace or digital progressive TV-video signals and that converts the digital TV-video signals into digital progressive TV video signals only in the case of digital interlace signals; a G circuit board 81 in, which a first degraded-image preparing means W1 for preparing, from TV video 2, a luminance distribution of a degraded image constituted of a single-frame luminance distribution is implemented in the form of circuitry; an R circuit board 82 in which a first TV-video rendering means 35 for rendering a luminance distribution 12 of a maximum-likelihood restored image into TV video and outputting single-frame super-resolution TV video signals is implemented in the form of circuitry; a super-resolution-processing-mode switching control circuit board 42; an HDD 83; a P circuit board 84 in which a second PSF restoring computation means W48 including a first PSF restoring computation means W19 configured by connecting six single-iteration PSF restoring computation means W47 in series is fabricated by using an FPGA; an F circuit board 85 in which a second image restoring computation means W59 including a first image restoring computation means W33 configured by connecting six single-iteration image restoring computation means W58 in series is fabricated by using an FPGA; a power-supply circuit board 86 that supplies appropriate electric power as needed to the components in the first set-top box 69; a heat dissipating fan 87 that receives optimal driving conditions from the computer board 79 and assists heat dissipation with a suitable amount of wind; a LAN terminal 88; USB terminals 89 to 91; a commercial AC single-phase 100 V power supply cable 92; a bus cable 93; a high-frequency cable 94; a power supply cable 95; a signal line 96; and a signal line 97.

The F setting means 70 is a means that is common to the first PSF identifying means W3 of the first TV-video super-resolution processing device 31 and the second PSF identifying means W60 of the second TV-video super-resolution processing device 32. The F setting means 70 corresponds to the means W120 for setting a degradation index 18 corresponding to a degree of optical degradation of TV video 2 displayed on a monitor, such as a terrestrial digital TV 59. Furthermore, the I setting means corresponds to the means W5 of the first TV-video super-resolution processing device 31 and the means W64 of the second TV-video super-resolution processing device 32. The F setting means 70 and I setting means 71 are bit switches that allow setting of three-digit decimal numbers. Data and electric power are supplied via the bus cable 93, and means having specifications such that it is possible to directly read setting values are preferred. Means having such specifications are available on the market.

The first set-top box program 78 is a program written in C++ and can be loaded and executed by a CPU installed in the computer board 79. The first set-top box program 78 is installed in advance, and the first PSF identifying means W3 and the means 121 (FIG. 20) in the second PSF identifying means W60 are defined in the computer in the computer board 79. Furthermore, a PSF database 19 (FIGS. 10 and 20) referred to by the means W121 is stored in the HDD 83. Furthermore, the first set-top box program 78 is programmed such that all the means of the fourth aspect of the first TV-video super-resolution processing device 31, except the first PSF restoring computation means W18 and the first image restoring computation means W32, are defined and such that information can be exchanged smoothly with the hardware in the first set-top box 69. When the power supply switch 75 is turned on, the first set-top box program 78 is initialized and then automatically executed.

Figure 29:
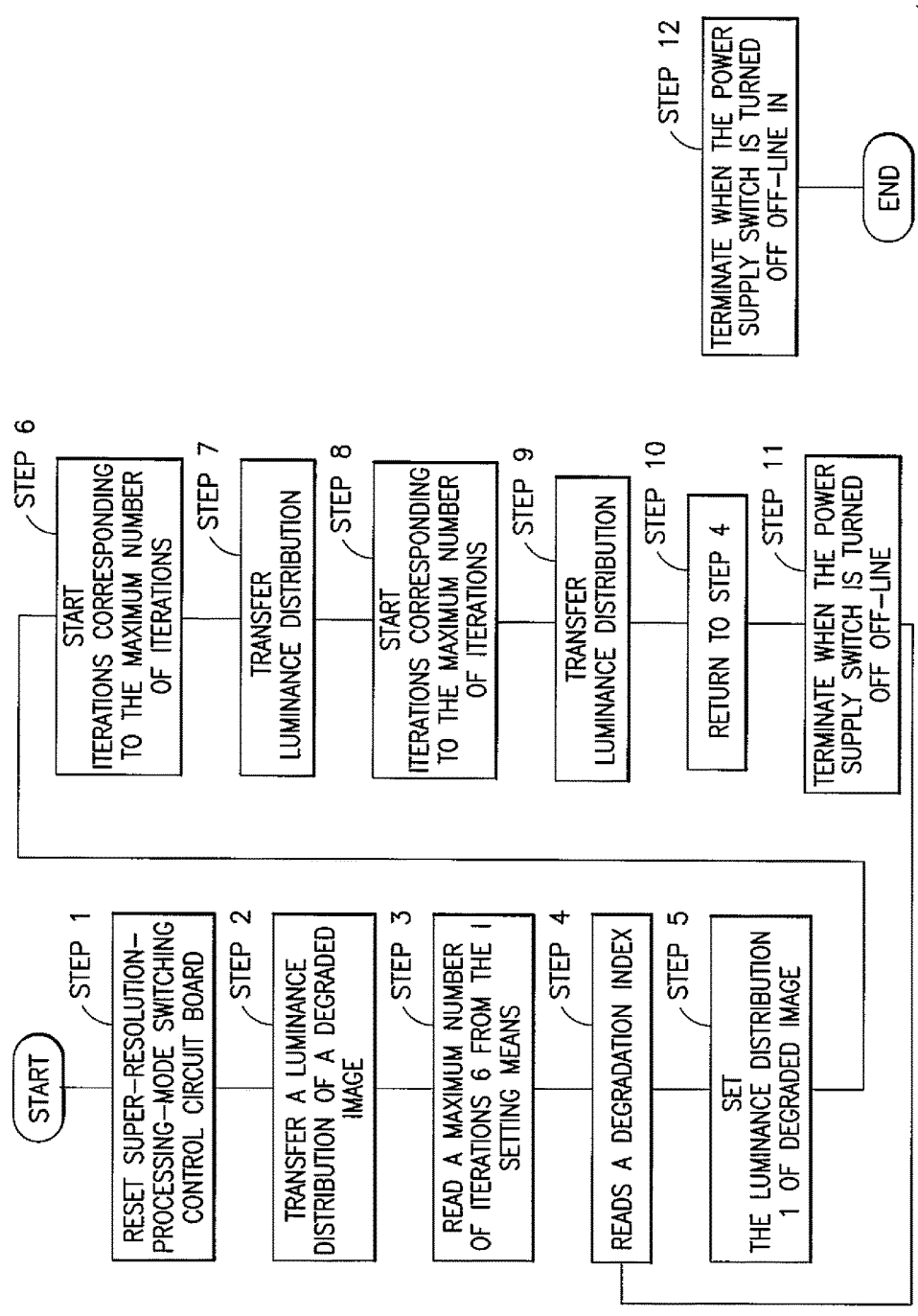
FIG. 29 is a flowchart showing an example of a processing procedure in the first set-top box according to the third embodiment.

FIG. 29 shows, in the form of a flowchart, an example of a processing procedure in the first set-top box 69. The flowchart shown in FIG. 29 is constituted of (Step 1) a step of resetting the super-resolution-processing-mode switching control circuit board 42, the up-converter circuit board 80, the G circuit board 81, the R circuit board 82, the P circuit board 84, and the F circuit board 85 upon power-on; (Step 2) a step of transferring a luminance distribution of a degraded image transferred from the G circuit board 81 to the P circuit board 84 and the F circuit board 85; (Step 3) a step in which the means W5 defined in the computer board 79 reads a maximum number of iterations 6 from the I setting means 71; (Step 4) a step in which the first PSF identifying means W3 defined in the computer board 79 reads a degradation index 18 from the F setting means 70, searches the PSF database 19 by using the degradation index 18 to obtain a PSF luminance distribution 4, and transfers the PSF luminance distribution 4 to the P circuit board 84; (Step 5) a step in which the first restored-image-initial-value correcting means W7 defined in the computer board 79 sets the luminance distribution 1 of the degraded image transferred from the G circuit board 81 as an estimated luminance distribution 3 of restored-image initial values and an estimated luminance distribution 7 of corrected-restored-image initial values, calculates a region 8 where computation is difficult in the estimated luminance distribution 7 of the corrected-restored-image initial values on the basis of the image size of the PSF luminance distribution 4, corrects the region 8 where computation is difficult in the estimated luminance distribution 7 of the corrected-restored-image initial values, sets the estimated luminance distribution 7 of the corrected-restored-image initial values as a luminance distribution 1 of the degraded image, and transfers the estimated luminance distribution of the corrected-restored-image initial values to the P circuit board 84 and the F circuit board 85; (Step 6) a step in which the computer in the computer board 79 starts a number of iterations corresponding to the maximum number of iterations 6 in the P circuit board 84; (Step 7) a step in which the computer in the computer board 79 transfers a luminance distribution 10 of a maximum-likelihood PSF output from the P circuit board 84 to the F circuit board 85; (Step 8) a step in which the computer in the computer board 79 starts a number of iterations corresponding to the maximum number of iterations 6 in the F circuit board 85; (Step 9) a step in which the computer in the computer board 79 transfers a luminance distribution 12 of a maximum-likelihood PSF output from the F circuit board 85 to the R circuit board 82; (Step 10) a step of returning to (Step 4); (Step 11) a step of terminating when the power supply switch 75 is turned off off-line. The processing starts from (Step 1), then iterates (Step 3) to (Step 11), and is terminated when the power supply switch 75 is turned off off-line in (Step 12).

The computer board 79 is a computer based on the latest Windows (registered trademark) OS (Operating System) and is a PC motherboard that supports C++. The PC motherboard is preferred since it has many external connection terminals, such as various I/O (Input/Output interface) terminals, LAN terminal 88, USB terminals 89 to 91, a microphone terminal, and a speaker terminal, and it is not so expensive. Various types of PC motherboard are available on the market, and any high-end motherboard can be used as long as it has a large amount of high-speed memory, such as a 16-GByte memory. Furthermore, C++ may be installed after purchasing the PC motherboard.

The super-resolution-processing-mode switching control circuit board 42 constantly reads and automatically determines the states of the mode switch 72 and the condition display switch 73. (Mode 1) If the mode switch 72 designates the main-processing mode and the condition display switch 73 designates no superimposition, the super-resolution-processing-mode switching control circuit board 42 receives single-frame TV-video signals 21 from the up-converter circuit board 80 and outputs the TV-video signals 21 to the G circuit board 81, and outputs single-frame super-resolution TV-video signals 13 after super-resolution processing, output from the R circuit board 82, to the digital-TV-video-signal input/output terminal 36. (Mode 2) If the mode switch 72 designates the main-processing mode and the condition display switch 73 designates superimposition, the super-resolution-processing-mode switching control circuit board 42 receives single-frame TV-video signals 21 from the up-converter circuit board 80 and outputs the TV-video signals 21 to the G circuit board 81, and then outputs single-frame super-resolution TV-video signals 13 after super-resolution processing, output from the R circuit board 82, with information read from the computer board 79 superimposed at the top right corner, to the digital-TV-video-signal input/output terminal 36. (Mode 1) If the mode switch 72 designates the test mode and the condition display switch 73 designates no superimposition, the super-resolution-processing-mode switching control circuit board 42 receives single-frame TV-video signals 21 from the up-converter circuit board 80, copies the TV-video signals 21, outputs one version to the G circuit board 81 while simultaneously delaying the other version by one frame, compresses the delayed version such that the horizontal width becomes half and it fits the right half of one screen, compresses single-frame super-resolution TV-video signals 13 after super-resolution processing, output from the R circuit board 82, such that the horizontal width becomes half and it fits the left half of one screen, combines these two halves, and outputs single-frame super-resolution TV-video signals 13, adjusted such that the right half of one screen is the frame before super-resolution processing and the left half of the screen is the frame after super-resolution processing, to the digital-TV-video-signal input/output terminal 36. (Mode 4) If the mode switch 72 designates the test mode and the condition display switch 73 designates superimposition, the super-resolution-processing-mode switching control circuit board 42 receives single-frame TV-video signals 21 from the up-converter circuit board 80, copies the TV-video signals 21, outputs one version to the G circuit board 81 while simultaneously delaying the other version by one frame, compresses the delayed version such that the horizontal width becomes half and it fits the right half of one screen, compresses single-frame super-resolution TV-video signals 13 after super-resolution processing, output from the R circuit board 82, such that the horizontal width becomes half and it fits the left half of one screen, combines these two halves, and outputs single-frame super-resolution TV-video signals 13, adjusted such that the right half of one screen is the frame before super-resolution processing and the left half of the screen is the frame after super-resolution processing, with information read from the computer board 79 superimposed at the top right corner, to the digital-TV-video-signal input/output terminal 36. Signals and information are conveyed automatically between the up-converter circuit board 80 and the G circuit board 81, between the G circuit board 81 and the super-resolution-processing-mode switching control circuit board 42, and between the super-resolution-processing-mode switching control circuit board 42 and the R circuit board 82.

The HDD 83 stores Windows OS (not shown), C++ (not shown), the PSF database 19 (not shown), etc. as well as the first set-top box program 78. The HDD 83 may be any HDD as long as it has a capacity not less than 1 TBytes, allows high-speed random read/write operations, has a bus interface and a buffer having a capacity not less than 8 Mbytes, and has specifications such that data and signals are sent and received and electric power is supplied via the bus cable 93. Although various kinds of HDDs are available on the market, an HDD of the 2.5-inch size is preferred, considering the space.

The super-resolution-processing-mode switching control circuit board 42, the up-converter circuit board 80, the G circuit board 81, the R circuit board 82, the P circuit board 84, and the F circuit board 85 have to be custom fabricated using FPGAs. However, as for the up-converter circuit board 80 and the power-supply circuit board 86, it is possible to purchase existing products satisfying design specifications on the market.

Figure 30:
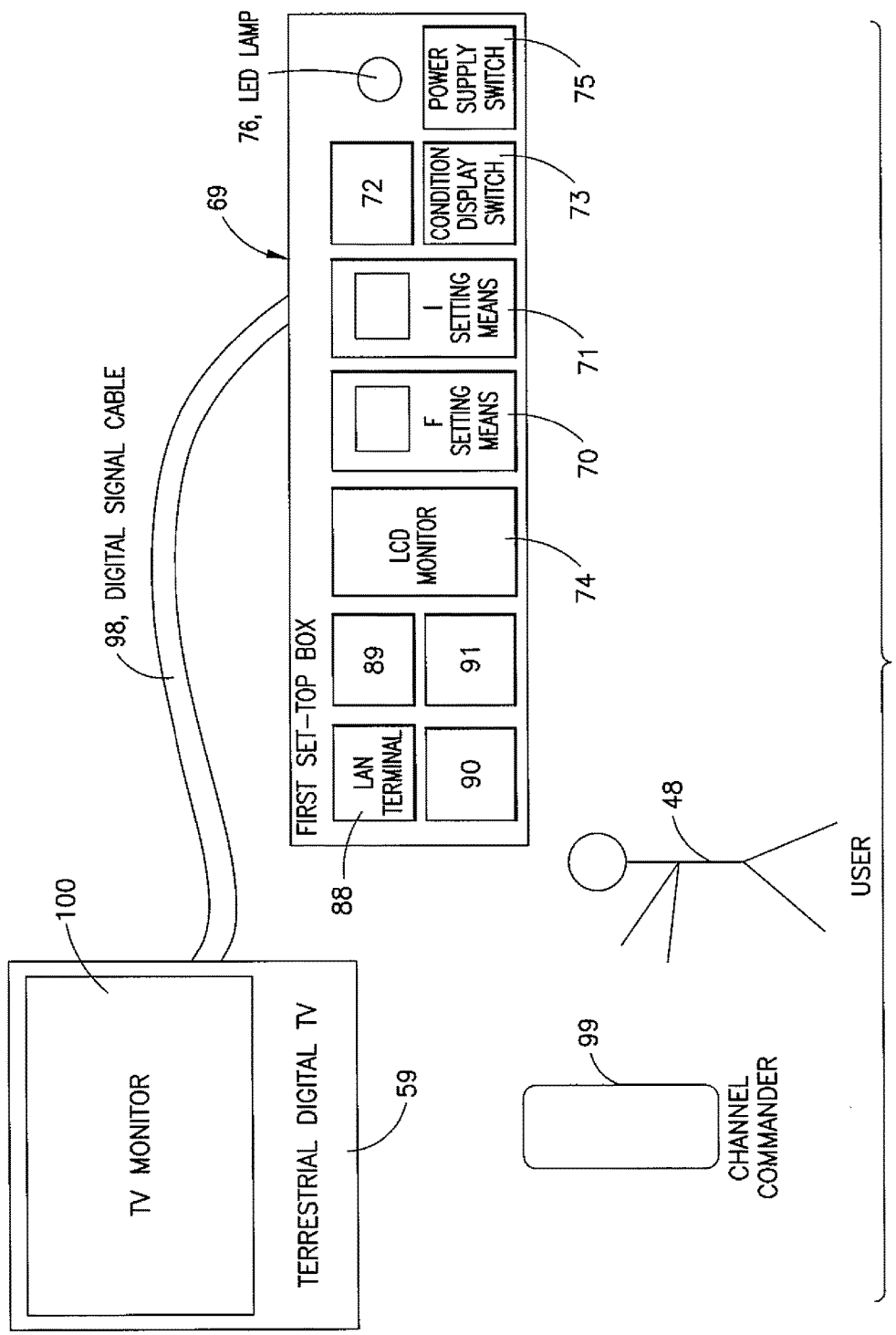
FIG. 30 is an illustration showing an example of the set-up state of the first set-top box according to the third embodiment.

FIG. 30 shows an example of the set-up state of the first set-top box 69 according to the third embodiment. Referring to FIG. 30, the user 48 connected a digital signal cable 98 extending from a digital-video-signal/audio input/output terminal of the terrestrial digital TV 59 to the digital-TV-video-signal input/output terminal 36 of the first set-top box 69.

Then, the user 48 first turned on the power supply switch 75 of the first set-top box 69 for power-on, then powered on the terrestrial digital TV 59, tuned in to a channel of interest by using a channel changer 99 of the terrestrial digital TV 59, and switched the mode switch 72 to the test mode and the condition display switch 73 to the superimposition mode while viewing TV broadcast video on a TV monitor 100 of the terrestrial digital TV 59. Then, TV broadcast video before super-resolution processing is displayed in the right half of the TV monitor 100, and TV broadcast video after super-resolution processing under default conditions is displayed without delay in the left half of the TV monitor 100. Furthermore, at the top right corner of the TV monitor 100, the value of the maximum number of iterations 6 is displayed as "I=6," the value of the degradation index 18 is displayed as "F=60," and the test mode is indicated as "test," superimposed on the TV video.

Then, since the optical degradation of the frame was small, the user 48 changed the setting of the degree of degradation from the default value of 60 to 30 among the 256 levels by using the F setting means 70, maintained the maximum number of iterations at the default value of 3 among the 256 values by using the I setting means 71, and checked, on the TV monitor 100, how the image quality changed after the substantially real-time super-resolution processing. As a result, it was found that there was no significant change in the image quality and that values not greater than the default values work. This is because, since the TV-video super-resolution device 27 of the first set-top box 69 restores the PSF luminance distribution, a sufficient restoration ability is exhibited even if there is a slight variation in the estimated luminance distribution 6 of PSF initial values associated with the degradation index 18 set by using the F setting means 70. Furthermore, the user 48 can then discover a state of optimal image quality by changing the F setting means 70 and the I setting means 71 while checking, on the TV monitor 100, changes in the image quality after the substantially real-time super-resolution processing. Once the super-resolution processing conditions (the setting values of the F setting means 70 and the I setting means 71) are determined, it is possible to enjoy TV broadcast video after the super-resolution processing in full-screen on the TV monitor 100 by switching the mode switch 72. Even in this state, the super-resolution processing conditions can be changed.

A fourth embodiment is a second set-top box 101, which is a hardware implementation of the second aspect of the second TV-video super-resolution processing device 32 according to the present invention. The second set-top box 101 is the same as the first set-top box 69 except that the P circuit board 84 is omitted from the hardware configuration of the first set-top box 69 and that a second set-top box program 102 is used instead of the first set-top box program 78. Thus, FIG. 28 is not redrawn. Furthermore, FIG. 30 is not redrawn since the differences between the first set-top box 69 and the second set-top box 101 are only the reference numbers of these set-top boxes.

The second set-top box program 102 is a program written in C++ and can be loaded and executed by a CPU installed in the computer board 79. The second set-top box program 102 is installed in advance, and the means 121 (FIG. 20) in the second PSF identifying means W60 for identifying a PSF luminance distribution is defined in the computer in the computer board 79. Furthermore, a PSF database 19 (FIGS. 10 and 20) referred to by the means W98 is stored in the HDD 83. Furthermore, the second set-top box program 102 is programmed such that all the means of the second aspect of the second TV-video super-resolution processing device 32, except the fourth image restoring computation means W94, are defined and such that information can be exchanged smoothly with the hardware in the second set-top box 101. When the power supply switch 75 is turned on, the second set-top box program 102 is initialized and then automatically executed.

In an example of a processing procedure in the second set-top box 101, (Step 2) to (Step 7) in the flowchart shown in FIG. 28 are changed as follows, but the other steps are not changed. (Step 2) is changed to "a step of transferring a luminance distribution of a degraded image transferred from the G circuit board 81 to the F circuit board 85." (Step 3) is changed to "a step in which the means W64 defined in the computer board 79 reads a maximum number of iterations 6 from the I setting means 71." (Step 4) is changed to "a step in which the second PSF identifying means W60 defined in the computer board 79 reads a degradation index 18 from the F setting means 70, searches the PSF database 19 by using the degradation index 18 to obtain a PSF luminance distribution 4, and transfers the PSF luminance distribution 4 to the F circuit board 85." (Step 5) is changed to "a step in which the first restored-image-initial-value correcting means W7 defined in the computer board 79 sets the luminance distribution 1 of the degraded image transferred from the G circuit board 81 as an estimated luminance distribution 3 of restored-image initial values and an estimated luminance distribution 7 of corrected-restored-image initial values, calculates a region 8 where computation is difficult in the estimated luminance distribution 7 of the corrected-restored-image initial values on the basis of the image size of the PSF luminance distribution 4, corrects the region 8 where computation is difficult in the estimated luminance distribution 7 of the corrected-restored-image initial values, sets the estimated luminance distribution 7 of the corrected-restored-image initial values as a luminance distribution 1 of the degraded image, and transfers the estimated luminance distribution of the corrected-restored-image initial values to the F circuit board 85." (Step 6) and (Step 7) are omitted.

The second TV-video super-resolution processing device 32 of the second set-top box 101 does not include a PSF restoring means. Thus, the processing speed of the second set-top box 101 is substantially double that of the first set-top box 69. However, there is a disadvantage in that the second set-top box 101 is sensitive to the degradation index 18 set by using the setting means 70. Since the second set-top box 101 is high-speed, it is possible to improve the image restoration quality by utilizing the processing time reduced as a result of increased speed to increase the number of iterations. Thus, the default setting of the I setting means 71 of the second set-top box 101 is 5 among the 256 values.

It was confirmed that the image restoration ability of the second set-top box 101 is comparable to that of the first set-top box 69 if the identification of a PSF luminance distribution by using the F setting means 70 is done carefully and accurately.

A fifth invention is a third set-top box 103, which is a hardware implementation of the third aspect of the second TV-video super-resolution processing device 32 according to the present invention. The third set-top box 103 is fabricating by changing the program for the FPGA of the F circuit board 85 in the second set-top box 101 such that the fifth image restoring means W116 can be configured. Thus, the internal configuration of the third set-top box 103 is the same as that of the first set-top box 69 except that the P circuit board 84 is omitted from the configuration shown in FIG. 28 and that a third set-top box program 104 is used instead of the first set-top box program 78. Thus, FIG. 28 is not redrawn. Furthermore, FIG. 30 is not redrawn since the differences between the first set-top box 69 and the third set-top box 103 are only the reference numbers of these set-top boxes.

The third set-top box program 104 is a program written in C++ and can be loaded and executed by a CPU installed in the computer board 79. The third set-top box program 104 is installed in advance, and the means 121 (FIG. 20) in the second PSF identifying means W60 for identifying a PSF luminance distribution is defined in the computer in the computer board 79. Furthermore, a PSF database 19 (FIGS. 10 and 20) referred to by the means W121 is configured in the HDD 83. Furthermore, the third set-top box program 104 is programmed such that all the means of the third aspect of the second TV-video super-resolution processing device 32, except the fifth image restoring means W116, are defined and such that information can be exchanged smoothly with the hardware in the third set-top box 103. When the power supply switch 75 is turned on, the third set-top box program 104 is initialized and then automatically executed.

A processing procedure in the third set-top box according to a fifth embodiment is the same as that of the second set-top box 101.

Similarly to the second set-top box 101, the third set-top box 103 does not include a PSF-luminance-distribution restoring means, and thus the processing speed thereof is higher than that of the first set-top box 69. However, since the image restoring means involves a loop structure, the processing speed thereof is lower than that of the second set-top box 101. However, compared with the fourth image restoring computation means W94, in which a maximum of six stages of the second single-iteration image restoring means W93 are connected in series, the fifth image restoring computation means W116 is used, in which one stage of computation means corresponding to the second single-iteration image restoring means W93 suffices, so that the gate scale in the FPGA can be reduced to about one fifth, which is economical. The reason that the gate scale is not reduced to one sixth is that a buffer 16 for saving a luminance distribution of a degraded image and a buffer for an estimated luminance distribution of restored-image initial values must be provided, which consume a large amount of block memory in the FPGA. Furthermore, from the viewpoint of the quality of super-resolution processing, although the third set-top box 103 is affected by the degradation index 18 similarly to the second set-top box 101, the third set-top box 103 is practically no different from the first set-top box 69, and results similar to those in the example shown in FIG. 27 are obtained.

INDUSTRIAL APPLICABILITY

The present invention is applicable to any application that utilizes TV video. Thus, the present invention can be utilized in the precision equipment industry and electronics industry that develop and manufacture video cameras and digital cameras, the software industry involving applications, games, etc., the medical equipment industry involving endoscopes, MRI, etc., the information equipment industry involving monitors, etc., the anti-disaster and anti-crime equipment industry involving surveillance cameras, etc., the archiving industries, etc.

REFERENCE SIGNS LIST

1 Luminance distribution of degraded image
2 TV video
3 Estimated luminance distribution of restored-image initial values
4 PSF luminance distribution
5 Estimated luminance distribution of PSF initial values
6 Maximum number of iterations
7 Estimated luminance distribution of corrected-restored-image initial values
8 Region where computation is difficult
9 Estimated luminance distribution of a restored PSF
10 Luminance distribution of maximum-likelihood restored PSF
11 Estimated luminance distribution of restored image
12 Luminance distribution of maximum-likelihood restored image
13 Super-resolution TV-video signals
14 Final values
15 Final values
16 Buffer for saving luminance distribution of degraded image
17 Buffer for estimated luminance distribution of restored-image initial values
18 Degradation index
19 PSF database
20 Image filename
21 Single-frame TV-video signals
22 RGB signals
23 Remaining TV-video signals
24 YUV signals
25 Luminance distribution of Y degraded image
26 Distribution of U degraded image
27 Distribution of V degraded image
28 Distribution of YUV restored image
29 Distribution of RGB restored image
30 RGB signal
31 First TV-video super-resolution processing device
32 Second TV-video super-resolution processing device 33 First super-resolution processing device program
34 Computer
35 First TV-video super-resolution processing system
36 Digital-TV-video-signal input/output terminal
37 TV-video input board
38 Super-resolution TV-video
39 Super-resolution TV-video output board
40 Video-display-mode designating button
41 Condition-display designating button
42 Super-resolution-processing-mode switching control circuit board
43 Digital-TV-video cable
44 Bus cable
45 Third storage medium
46 First TV-video super-resolution processing device icon
47 Monitor
48 User
49 Device program
50 Super-resolution-processing-window creating program
51 Super-resolution-processing-window monitoring program
52 Super-resolution processing window
53 Keyboard
54 Mouse
55 Close button
56 Degradation-index setting button
57 Maximum-number-of-iterations setting button
58 Video window
59 Terrestrial digital TV
60 Information window 41
61 Super-resolution-processing start button 44
62 Super-resolution-processing suspend button 45
63 Super-resolution-processing resume button 46
64 Super-resolution-processing stop button 47
65 Help button
66 Video enlarge/reduce button 49
67 Second TV-video super-resolution processing system
68 Fifth super-resolution processing device program 54
69 First set-top box
70 F setting means
71 I setting means
72 Mode switch
73 Condition display switch
74 LCD monitor
75 Power supply switch
76 LED lamp
77 Case
78 First set-top box program
79 Computer board
80 Up-converter circuit board
81 G circuit board
82 R circuit board
83 HDD
84 P circuit board
85 F circuit board
86 Power supply circuit board
87 Heat dissipating fan
88 LAN terminal
89 USB terminal
90 USB terminal
91 USB terminal
92 Commercial AC single-phase power supply cable
93 Bus cable
94 High-frequency cable
95 Power supply cable
96 Signal line
97 Signal line
98 Digital signal cable
99 Channel commander
100 TV monitor
101 Second set-top box
102 Second set-top box program
103 Third set-top box
103 Third set-top box program
F36 Thirty-sixth function
F37 Thirty-seventh function
F38 Thirty-eighth function
F39 Thirty-ninth function
F40 Fortieth function
F41 Forty-first function
F42 Forty-second function
F43 Forty-third function
F44 Forty-fourth function
F45 Forty-fifth function
F46 Forty-sixth function
F47 Forty-seventh function
F48 Forty-eighth function
F49 Forty-ninth function
F50 Fiftieth function
F51 Fifty-first function
F52 Fifty-second function
F53 Fifty-third function
F54 Fifty-fourth function
F55 Fifty-fifth function
F56 Fifty-sixth function
F57 Fifty-seventh function
F58 Fifty-eighth function
F59 Fifty-ninth function
F60 Sixtieth function
F61 Sixty-first function
F62 Sixty-second function
F63 Sixty-third function
F64 Sixty-fourth function
F65 Sixty-fifth function
F66 Sixty-sixth function
F67 Sixty-seventh function
F68 Sixty-eighth function
F69 Sixty-ninth function
F70 Seventieth function
F Degradation index
HDD Hard Disk Drive
I Maximum number of iterations
S1 First degraded-image preparing step
S2 Step
S3 First PSF identifying step
S4 to S6 Steps
S7 First restored-image-initial-value correcting step
S8 to S16 Steps
S17 PSF-restoring-computation preparing step
S18 First PSF restoring computation step
S19 First PSF restoring step
S20 Step
S21 Second restored-image-initial-value correcting step
S22 to S30 Steps
S31 First image-restoring computation preparing step
S32 First image restoring computation step
S33 First image restoring step
S34 First TV-video rendering step
S40 to S46 Steps
S47 Single-iteration PSF restoring step
S47-1 First iteration of single-iteration PSF restoring step
S47-2 Second iteration of single-iteration PSF restoring step
S47-F Final iteration of single-iteration PSF restoring step
S48 Second PSF restoring computation step S49 to S57 Steps
S58 First single-iteration image restoring step
S58-1 First iteration of first single-iteration image restoring step
S58-2 Second iteration of first single-iteration image restoring step
S58-F Final iteration of first single-iteration image restoring step
S59 Second image restoring computation step
S60 Second PSF identifying step
S61 Second degraded-image preparing step
S62 to S64 Steps
S65 Fourth restored-image-initial-value correcting step
S66 to S74 Steps
S75 Second image-restoring computation preparing step
S76 Third image restoring computation step
S77 Second image restoring step
S78 Second TV-video rendering step
S80 to S87 Steps
S88 Second single-iteration image restoring step
S88-1 First iteration of second single-iteration image restoring step
S88-2 Second iteration of second single-iteration image restoring step
S88-F Final iteration of second single-iteration image restoring step
S89 Fourth image restoring computation step
S90 to S92 Steps
S93 Sixth restored-image-initial-value correcting step
S94 to S105 Steps
S106 Fifth image restoring computation step
S110 to Sill Steps
S120 RGB-signal extracting step
S121 Delaying step
S122 YUV conversion step
S123 Y-degraded-image extracting step
S124 Degamma step
S130 to S134 Steps
W1 First degraded-image preparing means
W2 Means
W3 First PSF identifying means
W4 to W6 Means
W7 First restored-image-initial-value correcting means
W8 to W17 Means
W18 PSF-restoring-computation preparing means
W19 First PSF restoring computation means
W20 First PSF restoring means
W21 Second restored-image-initial-value correcting means
W22 to W31 Means
W32 First image-restoring computation preparing means
W33 First image restoring computation means
W34 First image restoring means
W35 First TV-vide rendering means
W40 to W46 Means
W47 Single-iteration PSF restoring means
W47-1 First stage of single-iteration PSF restoring means
W47-2 Second stage of single-iteration PSF restoring means
W47-F Final stage of single-iteration PSF restoring means
W48 Second PSF restoring computation means
W50 to W57 Means
W58 First single-iteration image restoring means
W58-1 First stage of first single-iteration image restoring means
W58-2 Second stage of first single-iteration image restoring means
W58-F Final stage of first single-iteration image restoring means
W59 Second image restoring computation means
W60 Second PSF identifying means
W61 Second degraded-image preparing means
W62 Fourth restored-image-initial-value correcting means
W63 Means
W64 Set a maximum number of iterations 6
W65 to W74 Means
W75 Fifth restored-image-initial-value correcting means
W76 to W77 Means
W78 Second image-restoring computation preparing means
W79 Third image restoring computation means
W80 Second image restoring means
W81 Second TV-video rendering means
W85 Sixth restored-image-initial-value correcting means
W86 to W92 Means
W93 Second single-iteration image restoring means
W93-1 First stage of second single-iteration image restoring means
W93-2 Second stage of second single-iteration image restoring means
W93-F Final stage of second single-iteration image restoring means
W94 Fourth image restoring computation means
W100 to W103 Means
W104 Seventh restored-image-initial-value correcting step
W105 to W115 Means
W116 Fifth image restoring computation step
W120 to W121 Means
W130 RGB-signal extracting means
W131 Delaying means
W132 YUV conversion means
W133 Y-degraded-image extracting means
W134 Degamma means
W140 to W144 Means

The invention claimed is:

1. A first TV-video super-resolution processing method for restoring TV video by outputting super-resolution TV video signals obtained by reducing optical degradation in a frame constituting the TV video to restore the degraded frame to a pre-degradation frame, the first TV-video super-resolution processing method characterized by comprising:
(S1) a first degraded-image preparing step of preparing, from the TV video, a luminance distribution of a degraded image constituted of a single-frame luminance distribution;
(S2) a step of setting the luminance distribution of the degraded image as an estimated luminance distribution of restored-image initial values;
(S3) a first point spread function (PSF) identifying step of identifying a PSF luminance distribution;
(S4) a step of setting the identified PSF luminance distribution as an estimated luminance distribution of PSF initial values;
(S5) a step of setting a maximum number of iterations;
(S6) a step of resetting a counter that counts the number of iterations;
(S7) a first restored-image-initial-value correcting step of copying the estimated luminance distribution of the restored-image initial values and setting the estimated luminance distribution as an estimated luminance distribution of corrected-restored-image initial values and, when convolving the PSF luminance distribution with the estimated luminance distribution of the corrected-restored-image initial values, calculating a region where computation is difficult, the region occurring in a peripheral region in the estimated luminance distribution of the corrected-restored-image initial values, on the basis of the image size of the PSF luminance distribution, copying the pixels in the region where computation is difficult, and pasting the copied pixels to the outside of the boundary of the estimated luminance distribution of the corrected-restored-image initial values in mirror symmetry with respect to the boundary, thereby correcting the estimated luminance distribution of the corrected-restored-image initial values to obtain an estimated luminance distribution of the corrected-restored-image initial values;

(S8) a step of setting the estimated luminance distribution of the corrected-restored-image initial values as a luminance distribution of the degraded image;

(S9) a step of convolving the estimated luminance distribution of the PSF initial values with the estimated luminance distribution of the corrected-restored-image initial values to obtain a first function;

(S10) a step of inverting the first function to obtain a second function;

(S11) a step of multiplying the second function by the luminance distribution of the degraded image to obtain a third function;

(S12) a step of obtaining an inverted function of the estimated luminance distribution of the corrected-restored-image initial values and setting the inverted function as a fourth function;

(S13) a step of convolving the fourth function with the third function to obtain a fifth function;

(S14) a step of multiplying the estimated luminance distribution of the PSF initial values by the fifth function to obtain an estimated luminance distribution of a restored PSF;

(S15) a step of substituting the estimated luminance distribution of the restored PSF for the estimated luminance distribution of the PSF initial values;

(S16) a step of incrementing the counter by 1;

(S17) a step of testing a hypothesis that the value of the counter has exceeded the maximum number of iterations, returning to step (S9) if the test result is false, and outputting the estimated luminance distribution of the restored PSF as a luminance distribution of a maximum-likelihood restored PSF if the test result is true;

(S18) a PSF-restoring-computation preparing step constituted of steps (S1) to (S8);

(S19) a first PSF restoring computation step constituted of steps (S9) to (S17);

(S20) a first PSF restoring step, including the PSF-restoring-computation preparing step and the first PSF restoring computation step, of completing the maximum number of iterations by executing iterations in ascending order of the index on S in the PSF-restoring-computation preparing step and the first PSF restoring computation step and outputting the luminance distribution of the maximum-likelihood restored PSF;

(S21) a step of resetting the counter and jumping to (S23);

(S22) a second restored-image-initial-value correcting step, constituted of the same processing procedure as the first restored-image-initial-value correcting step, of correcting the estimated luminance distribution of the restored-image initial values on the basis of the image size of the luminance distribution of the maximum-likelihood restored PSF to obtain an estimated luminance distribution of the corrected-restored-image initial values;

(S23) a step of convolving the luminance distribution of the maximum-likelihood restored PSF with the estimated luminance distribution of the restored-image initial values to obtain a sixth function;

(S24) a step of inverting the sixth function to obtain a seventh function;

(S25) a step of multiplying the seventh function by the luminance distribution of the degraded image to obtain an eighth function;

(S26) a step of obtaining an inverted function of the luminance distribution of the maximum-likelihood restored PSF and setting the inverted function as a ninth function;

(S27) a step of convolving the ninth function with the eighth function to obtain a tenth function;

(S28) a step of multiplying the estimated luminance distribution of the restored-image initial values by the tenth function to obtain an estimated luminance distribution of the restored image;

(S29) a step of substituting the estimated luminance distribution of the restored image for the estimated luminance distribution of the restored-image initial values;

(S30) a step of incrementing the counter by 1;

(S31) a step of testing a hypothesis that the value of the counter has exceeded the maximum number of iterations, returning to step (S22) if the test result is false, and outputting the estimated luminance distribution of the restored image as a luminance distribution of a maximum-likelihood restored image if the test result is true;

(S32) a first image-restoring computation preparing step constituted of step (S21);

(S33) a first image restoring computation step constituted of steps (S22) to (S31);

(S34) a first image restoring step, including the first image-restoring computation preparing step and the first image restoring computation step, of completing the maximum number of iterations by executing iterations in ascending order of the index on S in the first image-restoring computation preparing step and the first image restoring computation step and outputting the luminance distribution of the maximum-likelihood restored image; and (S35) a first TV-video rendering step of rendering the luminance distribution of the maximum-likelihood restored image into TV video and outputting single-frame super-resolution TV video signals.

2. A first TV-video super-resolution processing method according to claim 1, characterized in that:

a second aspect of the first PSF restoring computation step includes:

(S40) a step of convolving the estimated luminance distribution of the PSF initial values with the estimated luminance distribution of the corrected-restored-image initial values to obtain an eleventh function;

(S41) a step of inverting the eleventh function to obtain a twelfth function;

(S42) a step of multiplying the twelfth function by the luminance distribution of the degraded image to obtain a thirteenth function;

(S43) a step of obtaining an inverted function of the estimated luminance distribution of the restored-image initial values and setting the inverted function as a fourteenth function;

(S44) a step of convolving the fourteenth function with the thirteenth function to obtain a fifteenth function;

(S45) a step of multiplying the estimated luminance distribution of the PSF initial values by the fifteenth function to obtain an estimated luminance distribution of a restored PSF;

(S46) a step of outputting the estimated luminance distribution of the restored PSF as the estimated luminance distribution of the PSF initial values and the final values of the estimated luminance distribution of the restored PSF;

(S47) a single-iteration PSF restoring step, including steps (S40) to (S46), of executing one iteration sequentially in ascending order of the index on S; and (S48) a second PSF restoring computation step constituted of a series connection of a number of iterations of the single-iteration PSF restoring step S47, corresponding to the maximum number of iterations, and in the second PSF restoring computation step, a number of iterations corresponding to the number of iterations of the single-iteration PSF restoring step connected in series are executed, and the final values of the estimated luminance distribution of the restored PSF output from the final iteration of the single-iteration PSF restoring step are output as a luminance distribution of the maximum-likelihood restored PSF.

3. A non-transitory computer readable medium including a second super-resolution processing program for executing all the steps in the PSF-restoring-computation preparing step, the second PSF restoring computation step, and the first image restoring step constituting the first TV-video super-resolution processing method according to claim 2.

4. A first TV-video super-resolution processing method according to claim 1, characterized in that:

a second aspect of the first image restoring computation step includes:

(S50) a third restored-image-initial-value correcting step, constituted of the same processing procedure as the first restored-image-initial-value correcting step, of correcting the estimated luminance distribution of the restored-image initial values on the basis of the image size of the luminance distribution of the maximum-likelihood restored PSF to obtain an estimated luminance distribution of the corrected-restored-image initial values;

(S51) a step of convolving the luminance distribution of the maximum-likelihood restored PSF with the estimated luminance distribution of the corrected-restored-image initial values to obtain a sixteenth function;

(S52) a step of inverting the sixteenth function to obtain a seventeenth function;

(S53) a step of multiplying the seventeenth function by the luminance distribution of the degraded image to obtain an eighteenth function;

(S54) a step of obtaining an inverted function of the luminance distribution of the maximum-likelihood restored PSF and setting the inverted function as a nineteenth function;

(S55) a step of convolving the nineteenth function with the eighteenth function to obtain a twentieth function;

(S56) a step of multiplying the estimated luminance distribution of the restored-image initial values by the twentieth function to obtain an estimated luminance distribution of the restored image;

(S57) a step of outputting the estimated luminance distribution of the restored image as the estimated luminance distribution of the restored-image initial values and the final values of the estimated luminance distribution of the restored image;

(S58) a single-iteration image restoring step, including steps (S50) to (S57), of executing one iteration sequentially in ascending order of the index on S; and (S59) a second image restoring computation step constituted of a series connection of a number of iterations of the single-iteration image restoring step, corresponding to the maximum number of iterations, and in the second image restoring computation step, a number of iterations corresponding to the number of iterations of the single-iteration image restoring step connected in series are executed, and the final values of the estimated luminance distribution of the restored image output from the final iteration of the single-iteration image restoring step are output as a luminance distribution of the maximum-likelihood restored image.

5. A non-transitory computer readable medium including a third super-resolution processing program for executing all the steps in the first PSF restoring step, the first image-restoring computation preparing step, and the second image restoring computation step constituting the first TV-video super-resolution processing method according to claim 4.

6. A non-transitory computer readable medium including a fourth super-resolution processing program for executing all the steps in the PSF-restoring-computation preparing step, the second PSF restoring computation step, the first image-restoring computation preparing step, and the second image restoring computation step constituting the first TV-video super-resolution processing method according to claim 4.

7. A first TV-video super-resolution processing method according to claim 1, wherein the first PSF identifying step includes:

(S120) a step of setting a degradation index corresponding to the degree of optical degradation of TV video displayed on a monitor; and (S121) a step of extracting a PSF luminance distribution associated with the degradation index from a PSF luminance distribution database and outputting the PSF luminance distribution.

8. A first TV-video super-resolution processing method according to claim 1, wherein the first degraded-image preparing step includes:

(S130) an RGB-signal extracting step of extracting RGB signals constituting a frame from TV video signals for the frame;

(S131) a delaying step of outputting, with a delay corresponding to one frame, the TV video signals remaining after extracting the RGB signals from the TV video signals for the frame;

(S132) a YUV conversion step of subjecting the RGB signals to YUV conversion to obtain YUV signals;

(S133) a Y-degraded-image extracting step of extracting a luminance distribution of a degraded image constituted of only Y signals representing luminance components among the YUV signals to obtain a luminance distribution of a Y degraded image and keeping a distribution of a U degraded image constituted of only the remaining U signals and a distribution of a V degraded image constituted of only the remaining V signals; and (S134) a degamma processing step of executing degamma processing of the luminance distribution of the Y degraded image to obtain and output a luminance distribution of a degraded image constituted of a single-frame luminance distribution.

9. A first TV-video super-resolution processing method according to claim 1, wherein the first TV-video rendering step includes:

(S140) a gamma processing step of executing gamma processing of the luminance distribution of the maximum-likelihood restored image;

(S141) a restored-image combining step of combining the distribution of the U degraded image and the distribution of the V degraded image kept in the Y-degraded-image extracting step with the luminance distribution of the maximum-likelihood restored image after the gamma processing constituted of Y components to obtain a distribution of a single YUV restored image;

(S142) an RGB conversion step of executing RGB conversion of the distribution of the YUV restored image to obtain a distribution of an RGB restored image;

(S143) an RGB-signal conversion step of reading the distribution of the RGB restored image and outputting RGB signals; and (S144) a TV-video-signal combining step of combining the RGB signals with the TV video signals remaining after extracting the RGB signals and output in the delaying step to obtain and output single-frame super-resolution TV video signals.

10. A first TV-video super-resolution processing method according to claim 1, wherein the PSF luminance distributions are constituted of frameless square pixels of the same size, constitute two-dimensional normal distributions in which the centers are brightest, and have a size of 5×5 pixels.

11. A non-transitory computer readable medium including a first super-resolution processing program for executing all the steps in the first PSF restoring step and the first image restoring step constituting the first TV-video super-resolution processing method according to claim 1.

12. A second TV-video super-resolution processing method for restoring TV video by outputting super-resolution TV video signals obtained by reducing optical degradation in a frame constituting the TV video to restore the degraded frame to a pre-degradation frame, the second TV-video super-resolution processing method characterized by comprising:

(S60) a second point spread function (PSF) identifying step of identifying a PSF luminance distribution suitable for the degradation state of the TV video while the TV video is being viewed;

(S61) a second degraded-image preparing step of preparing, from the TV video, a luminance distribution of a degraded image constituted of a single-frame luminance distribution;

(S62) a fourth restored-image-initial-value correcting step, constituted of the same processing procedure as the first restored-image-initial-value correcting step, of copying the luminance distribution of the degraded image and setting the luminance distribution as an estimated luminance distribution of the restored-image initial values, and correcting the estimated luminance distribution of the restored-image initial values on the basis of the image size of the PSF luminance distribution to obtain an estimated luminance distribution of corrected-restored-image initial values;

(S63) a step of setting the estimated luminance distribution of the corrected-restored-image initial values as a luminance distribution of the degraded image;

(S64) a step of setting a maximum number of iterations;

(S65) a step of resetting a counter that counts the number of iterations to 0;

(S66) a step of convolving the identified PSF luminance distribution with the estimated luminance distribution of the corrected-restored-image initial values to obtain a twenty-first function;

(S67) a step of inverting the twenty-first function to obtain a twenty-second function;

(S68) a step of multiplying the twenty-second function by the luminance distribution of the degraded image to obtain a twenty-third function;

(S69) a step of obtaining an inverted function of the PSF luminance distribution and setting the inverted function as a twenty-fourth function;

(S70) a step of convolving the twenty-fourth function with the twenty-third function to obtain a twenty-fifth function;

(S71) a step of multiplying the estimated luminance distribution of the restored-image initial values by the twenty-fifth function to obtain an estimated luminance distribution of the restored image;

(S72) a step of substituting the estimated luminance distribution of the restored image for the estimated luminance distribution of the restored-image initial values;

(S73) a step of incrementing the counter by 1;

(S74) a step of testing a hypothesis that the value of the counter is greater than or equal to the maximum number of iterations, jumping to step (S75) if the test result is false, and jumping to step (S77) if the test result is true;

(S75) a fifth restored-image-initial-value correcting step, constituted of the same processing procedure as the first restored-image-initial-value correcting step, of correcting the estimated luminance distribution of the restored-image initial values on the basis of the image size of the PSF luminance distribution to obtain an estimated luminance distribution of the corrected-restored-image initial values;

(S76) a step of jumping to S66;

(S77) a step of outputting the estimated luminance distribution of the restored image as a luminance distribution of a maximum-likelihood restored image;

(S78) a second image-restoring computation preparing step constituted of steps (S60) to (S65);

(S79) a third image restoring computation step constituted of steps (S66) to (S77);

(S80) a second image restoring step, including the second image-restoring computation preparing step and the third image restoring computation step, of completing the maximum number of iterations by executing iterations in ascending order of the index on S and outputting the luminance distribution of the maximum-likelihood restored image; and (S81) a second TV-video rendering step of rendering the luminance distribution of the maximum-likelihood restored image having the maximized likelihood into TV video and outputting single-frame super-resolution TV video signals.

13. A second TV-video super-resolution processing method according to claim 12, characterized in that:
a second aspect of the third image restoring computation step includes:

(S85) a sixth restored-image-initial-value correcting step, constituted of the same processing procedure as the first restored-image-initial-value correcting step, of correcting the estimated luminance distribution of the restored-image initial values on the basis of the image size of the PSF luminance distribution to obtain an estimated luminance distribution of corrected-restored-image initial values;

(S86) a step of convolving the PSF luminance distribution with the estimated luminance distribution of the restored-image initial values to obtain a twenty-sixth function;

(S87) a step of inverting the twenty-sixth function to obtain a twenty-seventh function;

(S88) a step of multiplying the twenty-seventh function by the luminance distribution of the degraded image to obtain a twenty-eighth function;

(S89) a step of obtaining an inverted function of the PSF luminance distribution and setting the inverted function as a twenty-ninth function;

(S90) a step of convolving the twenty-ninth function with the twenty-eighth function to obtain a thirtieth function;

(S91) a step of multiplying the estimated luminance distribution of the restored-image initial values by the thirtieth function to obtain an estimated luminance distribution of the restored image;

(S92) a step of outputting the estimated luminance distribution of the restored image as the estimated luminance distribution of the restored-image initial values and the final values of the estimated luminance distribution of the restored image;

(S93) a second single-iteration image restoring step, including steps (S85) to (S92), of executing one iteration sequentially in ascending order of the index on S; and (S94) a fourth image restoring computation step constituted of a series connection of a number of iterations of the second single-iteration image restoring step, corresponding to the maximum number of iterations, and in the fourth image restoring computation step, a number of iterations corresponding to the number of iterations of the second single-iteration image restoring step connected in series are executed, and the final values of the estimated luminance distribution of the restored image output from the final iteration of the second single-iteration image restoring step are output as a luminance distribution of the maximum-likelihood restored image.

14. A non-transitory computer readable medium including a sixth super-resolution processing program, the program being configured for executing all the steps in the second image-restoring computation preparing step and the fourth image restoring computation step constituting the second super-resolution processing method according to claim 13.

15. A second TV-video super-resolution processing method according to claim 12, characterized in that a third aspect of the third image restoring computation step includes:

(S100) a step of resetting the counter that counts the number of iterations;

(S101) a step of testing a hypothesis that the value of the counter is not 0, jumping to (S102) if the test result is false, and jumping to (S103) if the test result is true;

(S102) a step of transferring the luminance distribution of the degraded image to a buffer for saving the luminance distribution of the degraded image and to a buffer for the estimated luminance distribution of the restored-image initial values;

(S103) a step of loading the estimated luminance distribution of the restored-image initial values from the buffer for the estimated luminance distribution of the restored-image initial values;

(S104) a seventh restored-image-initial-value correcting step, constituted of the same processing procedure as the first restored-image-initial-value correcting step, of correcting the estimated luminance distribution of the restored-image initial values on the basis of the image size of the PSF luminance distribution to obtain an estimated luminance distribution of corrected-restored-image initial values;

(S105) a step of convolving the PSF luminance distribution with the estimated luminance distribution of the corrected-restored-image initial values to obtain a thirty-first function;

(S106) a step of inverting the thirty-first function to obtain a thirty-second function;

(S107) a step of multiplying the thirty-second function with the luminance distribution of the degraded image to obtain a thirty-third function;

(S108) a step of obtaining an inverted function of the PSF luminance distribution and setting the inverted function as a thirty-fourth function;

(S109) a step of convolving the thirty-fourth function with the thirty-third function to obtain a thirty-fifth function;

(S110) a step of multiplying the estimated luminance distribution of the restored-image initial values by the thirty-fifth function to obtain an estimated luminance distribution of the restored image;

(S111) a step of incrementing the counter by 1;

(S112) a step of testing a hypothesis that the value of the counter has exceeded the maximum number of iterations, jumping to (S113) if the test result is false, and jumping to (S115) if the test result is true;

(S113) a step of transferring the estimated luminance distribution of the restored image to the buffer for the estimated luminance distribution of the restored-image initial values;

(S114) a step of jumping to (S103);

(S115) a step of outputting the estimated luminance distribution of the restored image as the luminance distribution of the maximum-likelihood restored image; and (S116) a fifth image restoring computation step, including steps (S100) to (S115), of completing the maximum number of iterations by executing iterations sequentially in ascending order of the index on S and outputting the luminance distribution of the maximum-likelihood restored image.

16. A non-transitory computer readable medium including a seventh super-resolution processing program, the program being configured for executing all the steps in the second image-restoring computation preparing step and the fifth image restoring computation step constituting the second super-resolution processing method according to claim 15.

17. A non-transitory computer readable medium including a fifth super-resolution processing program, the program being configured for executing all the steps in the second image restoring step constituting the second TV-video super-resolution processing method according to claim 12.

18. A second TV-video super-resolution processing device that restores, by using the second TV-video super-resolution processing method according to claim 12, TV video by outputting super-resolution TV video signals obtained by reducing optical degradation in a frame constituting the TV video to restore the degraded frame to the pre-degradation frame, the second TV-video super-resolution processing device characterized by comprising:

(W60) a second PSF identifying means for identifying a PSF luminance distribution suitable for the degradation state of the TV video while the TV video is being viewed;

(W61) a second degraded-image preparing means for preparing, from the TV video, a luminance distribution of a degraded image constituted of a single-frame luminance distribution;

(W62) a fourth restored-image-initial-value correcting means, constituted of the same processing procedure as the first restored-image-initial-value correcting means, of copying the luminance distribution of the degraded image and setting the luminance distribution as an estimated luminance distribution of the restored-image initial values, and correcting the estimated luminance distribution of the restored-image initial values on the basis of the image size of the PSF luminance distribution to obtain an estimated luminance distribution of corrected-restored-image initial values;

(W63) a means for setting the estimated luminance distribution of the corrected-restored-image initial values as a luminance distribution of the degraded image;

(W64) a means for setting a maximum number of iterations;

(W65) a means for resetting a counter that counts the number of iterations to 0;

(W66) a means for convolving the identified PSF luminance distribution with the estimated luminance distribution of the corrected-restored-image initial values to obtain a fifty-sixth function;

(W67) a means for inverting the fifty-sixth function to obtain a fifty-seventh function;

(W68) a means for multiplying the fifty-seventh function by the luminance distribution of the degraded image to obtain a fifty-eighth function;

(W69) a means for obtaining an inverted function of the PSF luminance distribution and setting the inverted function as a fifty-ninth function;

(W70) a means for convolving the fifty-ninth function with the twenty-third function to obtain a sixtieth function;

(W71) a means for multiplying the estimated luminance distribution of the restored-image initial values by the sixtieth function to obtain an estimated luminance distribution of the restored image;

(W72) a means for substituting the estimated luminance distribution of the restored image for the estimated luminance distribution of the restored-image initial values;

(W73) a means for incrementing the counter by 1;

(W74) a means for testing a hypothesis that the value of the counter is greater than or equal to the maximum number of iterations, jumping to means (W75) if the test result is false, and jumping to means (W77);

(W75) a fifth restored-image-initial-value correcting means, constituted of the same processing procedure as the first restored-image-initial-value correcting means, for correcting the estimated luminance distribution of the restored-image initial values on the basis of the image size of the PSF luminance distribution to obtain an estimated luminance distribution of the corrected-restored-image initial values;

(W76) a means for jumping to W66;

(W77) a means for outputting the estimated luminance distribution of the restored image as a luminance distribution of a maximum-likelihood restored image;

(W78) a second image-restoring computation preparing means constituted of means (W60) to (W65);

(W79) a third image restoring computation means constituted of means (W66) to (W77);

(W80) a second image restoring means, including the second image-restoring computation preparing means and the third image restoring computation means, of completing the maximum number of iterations by executing iterations in ascending order of the index on S and outputting the luminance distribution of the maximum-likelihood restored image; and (W81) a second TV-video rendering means for rendering the luminance distribution of the maximum-likelihood restored image having the maximized likelihood into TV video and outputting single-frame super-resolution TV video signals.

19. A second TV-video super-resolution processing device according to claim 18, characterized in that:

a second aspect of the third image restoring means includes:

(W85) a sixth restored-image-initial-value correcting means, constituted of the same processing procedure as the first restored-image-initial-value correcting means, for correcting the estimated luminance distribution of the restored-image initial values on the basis of the image size of the PSF luminance distribution to obtain an estimated luminance distribution of corrected-restored-image initial values;

(W86) a means for convolving the PSF luminance distribution with the estimated luminance distribution of the restored-image initial values to obtain a sixty-first function;

(W87) a means for inverting the sixty-first function to obtain a sixty-second function;

(W88) a means for multiplying the sixty-second function by the luminance distribution of the degraded image to obtain a sixty-third function;

(W89) a means for obtaining an inverted function of the PSF luminance distribution and setting the inverted function as a sixty-fourth function;

(W90) a means for convolving the sixty-fourth function with the sixty-third function to obtain a sixty-fifth function;

(W91) a means for multiplying the estimated luminance distribution of the restored-image initial values by the sixty-fifth function to obtain an estimated luminance distribution of the restored image;

(W92) a means for outputting the estimated luminance distribution of the restored image as the estimated luminance distribution of the restored-image initial values and the final values of the estimated luminance distribution of the restored image;

(W93) a second single-iteration image restoring means, including means (W85) to (W92), for executing one iteration sequentially in ascending order of the index on S; and (W94) a fourth image restoring computation means constituted of a series connection of a number of stages of the second single-iteration image restoring means, corresponding to the maximum number of iterations, and in the fourth image restoring computation means, a number of iterations corresponding to the number of stages of the second single-iteration image restoring means connected in series are executed, and the final values of the estimated luminance distribution of the restored image output from the final stage of the second single-iteration image restoring means are output as a luminance distribution of the maximum-likelihood restored image.

20. A second TV-video super-resolution processing device according to claim 18, characterized in that a third aspect of the third image restoring means includes:
- (W100) a means for resetting the counter that counts the number of iterations;
- (W101) a means for testing a hypothesis that the value of the counter is not 0, jumping to (W102) if the test result is false, and jumping to (W103) if the test result is true;
- (W102) a means for transferring the luminance distribution of the degraded image to a buffer for saving the luminance distribution of the degraded image and to a buffer for the estimated luminance distribution of the restored-image initial values;
- (W103) a means for loading the estimated luminance distribution of the restored-image initial values from the buffer for the estimated luminance distribution of the restored-image initial values;
- (W104) a seventh restored-image-initial-value correcting means, constituted of the same processing procedure as the first restored-image-initial-value correcting means, for correcting the estimated luminance distribution of the restored-image initial values on the basis of the image size of the PSF luminance distribution to obtain an estimated luminance distribution of corrected-restored-image initial values;
- (W105) a means for convolving the PSF luminance distribution with the estimated luminance distribution of the corrected-restored-image initial values to obtain a thirty-first function;
- (W106) a means for inverting the thirty-first function to obtain a thirty-second function;
- (W107) a means for multiplying the thirty-second function with the luminance distribution of the degraded image to obtain a thirty-third function;
- (W108) a means for obtaining an inverted function of the PSF luminance distribution and setting the inverted function as a thirty-fourth function;
- (W109) a means for convolving the thirty-fourth function with the thirty-third function to obtain a thirty-fifth function;
- (W110) a means for multiplying the estimated luminance distribution of the restored-image initial values by the thirty-fifth function to obtain an estimated luminance distribution of the restored image;
- (W111) a means for incrementing the counter by 1;
- (W112) a means for testing a hypothesis that the value of the counter has exceeded the maximum number of iterations, jumping to (W113) if the test result is false, and jumping to (W115) if the test result is true;
- (W113) a means for transferring the estimated luminance distribution of the restored image to the buffer for the estimated luminance distribution of the restored-image initial values;
- (W114) a means for jumping to (W103);
- (W115) a means for outputting the estimated luminance distribution of the restored image as the luminance distribution of the maximum-likelihood restored image; and
- (W116) a fifth image restoring computation means, including means (W100) to (W115), for completing the maximum number of iterations by executing iterations sequentially in ascending order of the index on S and outputting the luminance distribution of the maximum-likelihood restored image.

21. A second TV-video super-resolution processing device according to claim 18, wherein the second PSF identifying means includes:
- a means for setting a degradation index corresponding to the degree of optical degradation of TV video displayed on a monitor; and
- a means for extracting a PSF luminance distribution associated with the degradation index from a PSF database.

22. A second TV-video super-resolution processing device according to claim 18, wherein the second degraded-image preparing means includes:
- an RGB-signal extracting means for extracting RGB signals constituting a frame from TV video signals for the frame;
- a delaying means for outputting, with a delay corresponding to one frame, the TV video signals remaining after extracting the RGB signals from the TV video signals for the frame;
- a YUV conversion means for subjecting the RGB signals to YUV conversion to obtain YUV signals;
- a Y-degraded-image extracting means for extracting a luminance distribution of a degraded image constituted of only Y signals representing luminance components among the YUV signals to obtain a luminance distribution of a Y degraded image and keeping a distribution of a U degraded image constituted of only the remaining U signals and a distribution of a V degraded image constituted of only the remaining V signals; and
- a digamma processing means for executing digamma processing of the luminance distribution of the Y degraded image to obtain and output a luminance distribution of a degraded image constituted of a single-frame luminance distribution.

23. A second TV-video super-resolution processing device according to claim 18, wherein the second TV-video rendering means includes:
- a gamma processing means for executing gamma processing of the luminance distribution of the maximum-likelihood restored image;
- a restored-image combining means for combining the distribution of the U degraded image and the distribution of the V degraded image kept by the Y-degraded-image extracting means with the luminance distribution of the maximum-likelihood restored image after the gamma processing constituted of Y components to obtain a distribution of a single YUV restored image;
- an RGB conversion means for executing RGB conversion of the distribution of the YUV restored image to obtain a distribution of an RGB restored image;
- an RGB-signal conversion means for reading the distribution of the RGB restored image and outputting RGB signals; and
- a TV-video-signal combining means for combining the RGB signals with the TV video signals remaining after extracting the RGB signals and output by the delaying means to obtain and output single-frame super-resolution TV video signals.

24. A second TV-video super-resolution processing method according to claim 12, wherein the second PSF identifying step includes:
- a step of setting a degradation index corresponding to the degree of optical degradation of TV video displayed on a monitor; and a step of extracting a PSF luminance distribution associated with the degradation index from a PSF luminance distribution database and outputting the PSF luminance distribution.

25. A second TV-video super-resolution processing method according to claim 12, wherein the second degraded-image preparing step includes:
    an RGB-signal extracting step of extracting RGB signals constituting a frame from TV video signals for the frame;
    a delaying step of outputting, with a delay corresponding to one frame, the TV video signals remaining after extracting the RGB signals from the TV video signals for the frame;
    a YUV conversion step of subjecting the RGB signals to YUV conversion to obtain YUV signals;
    a Y-degraded-image'extracting step of extracting a luminance distribution of a degraded image constituted of only Y signals representing luminance components among the YUV signals to obtain a luminance distribution of a Y degraded image and keeping a distribution of a U degraded image constituted of only the remaining U signals and a distribution of a V degraded image constituted of only the remaining V signals; and
    A digamma processing step of executing digamma processing of the luminance distribution of the Y degraded image to obtain and output a luminance distribution of a degraded image constituted of a single-frame luminance distribution.

26. A second TV-video super-resolution processing method according to claim 12, wherein the second TV-video rendering step includes:
    a gamma processing step of executing gamma processing of the luminance distribution of the maximum-likelihood restored image;
    a restored-image combining step of combining the distribution of the U degraded image and the distribution of the V degraded image kept in the Y-degraded-image extracting step with the luminance distribution of the maximum-likelihood restored image after the gamma processing constituted of Y components to obtain a distribution of a single YUV restored image;
    an RGB conversion step of executing RGB conversion of the distribution of the YUV restored image to obtain a distribution of an RGB restored image;
    an RGB-signal conversion step of reading the distribution of the RGB restored image and outputting RGB signals; and
    a TV-video-signal combining step of combining the RGB signals with the TV video signals remaining after extracting the RGB signals and output in the delaying step to obtain and output single-frame super-resolution TV video signals.

27. A second TV-video super-resolution processing method according to claim 12, wherein the PSF luminance distributions are constituted of frameless square pixels of the same size, constitute two-dimensional normal distributions in which the centers are brightest, and have a size of 5×5 pixels.

28. A first TV-video super-resolution processing device that restores, by using the first TV-video super-resolution processing method according to claim 1, TV video by outputting super-resolution TV video signals obtained by reducing optical degradation in a frame constituting the TV video to restore the degraded frame to the pre-degradation frame, the first TV-video super-resolution processing device characterized by comprising:
    (W1) a first degraded-image preparing means for preparing, from the TV video, a luminance distribution of a degraded image constituted of a single-frame luminance distribution;
    (W2) a means for setting the luminance distribution of the degraded image as an estimated luminance distribution of restored-image initial values;
    (W3) a first PSF identifying means for identifying a PSF luminance distribution;
    (W4) a means for setting the identified PSF luminance distribution as an estimated luminance distribution of PSF initial values;
    (W5) a means for setting a maximum number of iterations;
    (W6) a means for resetting a counter that counts the number of iterations;
    (W7) a first restored-image-initial-value correcting means for copying the estimated luminance distribution of the restored-image initial values and setting the estimated luminance distribution as an estimated luminance distribution of corrected-restored-image initial values and, when convolving the PSF luminance distribution with the estimated luminance distribution of the corrected-restored-image initial values, calculating a region where computation is difficult, the region occurring in a peripheral region in the estimated luminance distribution of the corrected-restored-image initial values, on the basis of the image size of the PSF luminance distribution, copying the pixels in the region where computation is difficult, and pasting the copied pixels to the outside of the boundary of the estimated luminance distribution of the corrected-restored-image initial values in mirror symmetry with respect to the boundary, thereby correcting the estimated luminance distribution of the corrected-restored-image initial values to obtain an estimated luminance distribution of the corrected-restored-image initial values;
    (W8) a means for setting the estimated luminance distribution of the corrected-restored-image initial values as a luminance distribution of the degraded image;
    (W9) a means for convolving the estimated luminance distribution of the PSF initial values with the estimated luminance distribution of the corrected-restored-image initial values to obtain a thirty-sixth function;
    (W10) a means for inverting the thirty-sixth function to obtain a thirty-seventh function;
    (W11) a means for multiplying the thirty-seventh function by the luminance distribution of the degraded image to obtain a thirty-eighth function;
    (W12) a means for obtaining an inverted function of the estimated luminance distribution of the corrected-restored-image initial values and setting the inverted function as a thirty-ninth function;
    (W13) a means for convolving the thirty-ninth function with the thirty-eighth function to obtain a fortieth function;
    (W14) a means for multiplying the estimated luminance distribution of the PSF initial values by the fortieth function to obtain an estimated luminance distribution of a restored PSF;
    (W15) a means for substituting the estimated luminance distribution of the restored PSF for the estimated luminance distribution of the PSF initial values;

(W16) a means for incrementing the counter by 1;

(W17) a means for testing a hypothesis that the value of the counter has exceeded the maximum number of iterations, returning to means (W9) if the test result is false, and outputting the estimated luminance distribution of the restored PSF as a luminance distribution of a maximum-likelihood restored PSF if the test result is true;

(W18) a PSF-restoring-computation preparing means constituted of means (W1) to (W8); and (W19) a first PSF restoring computation means constituted of means (W9) to (W17), the first TV-video super-resolution processing device also characterized by comprising:

(W20) a first PSF restoring means for completing the maximum number of iterations by executing iterations in ascending order of the index on S in the PSF-restoring-computation preparing means and the first PSF restoring computation means and outputting the luminance distribution of the maximum-likelihood restored PSF;

(W21) a means for resetting the counter and jumping to (S23);

(W22) a second restored-image-initial-value correcting means, constituted of the same processing procedure as the first restored-image-initial-value correcting means, for correcting the estimated luminance distribution of the restored-image initial values on the basis of the image size of the luminance distribution of the maximum-likelihood restored PSF to obtain an estimated luminance distribution of the corrected-restored-image initial values;

(W23) a means for convolving the luminance distribution of the maximum-likelihood restored PSF with the estimated luminance distribution of the corrected-restored-image initial values to obtain a forty-first function;

(W24) a means for inverting the forty-first function to obtain a forty-second function;

(W25) a means for multiplying the forty-second function by the luminance distribution of the degraded image to obtain a forty-third function;

(W26) a means for obtaining an inverted function of the luminance distribution of the maximum-likelihood restored PSF and setting the inverted function as a forty-fourth function;

(W27) a means for convolving the forty-fourth function with the forty-third function to obtain a forty-fifth function;

(W28) a means for multiplying the estimated luminance distribution of the restored-image initial values by the forty-fifth function to obtain an estimated luminance distribution of the restored image;

(W29) a means for substituting the estimated luminance distribution of the restored image for the estimated luminance distribution of the restored-image initial values;

(W30) a means for incrementing the counter by 1;

(W31) a means for testing a hypothesis that the value of the counter has exceeded the maximum number of iterations, returning to means (W22) if the test result is false, and outputting the estimated luminance distribution of the restored image as a luminance distribution of a maximum-likelihood restored image if the test result is true;

(W32) a first image-restoring computation preparing means constituted of means (W21); and (W33) a first image restoring computation means constituted of means (W22) to (W31), the first TV-video super-resolution processing device also characterized by comprising:

(W34) a first image restoring means for completing the maximum number of iterations by executing iterations in ascending order of the index on S in the first image-restoring computation preparing means and the first image restoring computation means and outputting the luminance distribution of the maximum-likelihood restored image; and (W35) a first TV-video rendering means for rendering the luminance distribution of the maximum-likelihood restored image into TV video and outputting single-frame super-resolution TV video signals.

29. A first TV-video super-resolution processing device according to claim 28, characterized in that:

a second aspect of the first PSF restoring means includes:

a means for convolving the estimated luminance distribution of the PSF initial values with the estimated luminance distribution of the corrected-restored-image initial values to obtain a forty-sixth function;

a means for inverting the forty-sixth function to obtain a forty-seventh function;

a means for multiplying the forty-seventh function by the luminance distribution of the degraded image to obtain a forty-eighth function;

a means for obtaining an inverted function of the estimated luminance distribution of the restored-image initial values and setting the inverted function as a forty-ninth function;

a means for convolving the forty-ninth function with the forty-eighth function to obtain a fiftieth function;

a means for multiplying the estimated luminance distribution of the PSF initial values by the fiftieth function to obtain an estimated luminance distribution of a restored PSF;

a means for outputting the estimated luminance distribution of the restored PSF as the estimated luminance distribution of the PSF initial values and the final values of the estimated luminance distribution of the restored PSF;

a single-iteration PSF restoring means, for executing one iteration sequentially in ascending order of the index on S; and a second PSF restoring computation means constituted of a series connection of a number of stages of the single-iteration PSF restoring means, corresponding to the maximum number of iterations, and in the second PSF restoring computation means, a number of iterations corresponding to the number of stages of the single-iteration PSF restoring means connected in series are executed, and the final values of the estimated luminance distribution of the restored PSF output from the final stage of the single-iteration PSF restoring means are output as a luminance distribution of the maximum-likelihood restored PSF.

30. A first TV-video super-resolution processing device according to claim 28, characterized in that:

a second aspect of the first image restoring means includes:

(W50) a third restored-image-initial-value correcting means, constituted of the same configuration as the first restored-image-initial-value correcting means, for correcting the estimated luminance distribution of the restored-image initial values on the basis of the image size of the luminance distribution of the maximum-likelihood restored PSF to obtain an estimated luminance distribution of the corrected-restored-image initial values;
(W51) a means for convolving the luminance distribution of the maximum-likelihood restored PSF with the estimated luminance distribution of the corrected-restored-image initial values to obtain a fifty-first function;
(W52) a means for inverting the fifty-first function to obtain a fifty-second function;
(W53) a means for multiplying the fifty-second function by the luminance distribution of the degraded image to obtain a fifty-third function;
(W54) a means for obtaining an inverted function of the luminance distribution of the maximum-likelihood restored PSF and setting the inverted function as a fifty-fourth function;
(W55) a means for convolving the fifty-fourth function with the fifty-third function to obtain a fifty-fifth function;
(W56) a means for multiplying the estimated luminance distribution of the restored-image initial values by the fifty-fifth function to obtain an estimated luminance distribution of the restored image;
(W57) a means for outputting the estimated luminance distribution of the restored image as the estimated luminance distribution of the restored-image initial values and the final values of the estimated luminance distribution of the restored image;
(W58) a single-iteration image restoring means, including means (W50) to (W57), for executing one iteration sequentially in ascending order of the index on S; and
(W59) a second image restoring computation means constituted of a series connection of a number of stages of the single-iteration image restoring means, corresponding to the maximum number of iterations, and
in the second image restoring computation means, a number of iterations corresponding to the number of stages of the single-iteration image restoring means connected in series are executed, and the final values of the estimated luminance distribution of the restored image output from the final stage of the single-iteration image restoring means are output as a luminance distribution of the maximum-likelihood restored image.

31. A first TV-video super-resolution processing device according to claim 28, wherein the first PSF identifying means includes:
(W120) a means for setting a degradation index corresponding to the degree of optical degradation of TV video displayed on a monitor; and
(W121) a means for extracting a PSF luminance distribution associated with the degradation index from a PSF database.

32. A first TV-video super-resolution processing device according to claim 28, wherein the first degraded-image preparing means includes:
(W130) an RGB-signal extracting means for extracting RGB signals constituting a frame from TV video signals for the frame;
(W131) a delaying means for outputting, with a delay corresponding to one frame, the TV video signals remaining after extracting the RGB signals from the TV video signals for the frame;
(W132) a YUV conversion means for subjecting the RGB signals to YUV conversion to obtain YUV signals;
(W133) a Y-degraded-image extracting means for extracting a luminance distribution of a degraded image constituted of only Y signals representing luminance components among the YUV signals to obtain a luminance distribution of a Y degraded image and keeping a distribution of a U degraded image constituted of only the remaining U signals and a distribution of a V degraded image constituted of only the remaining V signals; and
(W134) a degamma processing means for executing degamma processing of the luminance distribution of the Y degraded image to obtain and output a luminance distribution of a degraded image constituted of a single-frame luminance distribution.

33. A first TV-video super-resolution processing device according to claim 28, wherein the first TV-video rendering means includes:
(W140) a gamma processing means for executing gamma processing of the luminance distribution of the maximum-likelihood restored image;
(W141) a restored-image combining means for combining the distribution of the U degraded image and the distribution of the V degraded image kept by the Y-degraded-image extracting means with the luminance distribution of the maximum-likelihood restored image after the gamma processing constituted of Y components to obtain a distribution of a single YUV restored image;
(W142) an RGB conversion means for executing RGB conversion of the distribution of the YUV restored image to obtain a distribution of an RGB restored image;
(W143) an RGB-signal conversion means for reading the distribution of the RGB restored image and outputting RGB signals; and
(W144) a TV-video-signal combining means for combining the RGB signals with the TV video signals remaining after extracting the RGB signals and output by the delaying means to obtain and output single-frame super-resolution TV video signals.

\* \* \* \* \*

UNITED STATES PATENT AND TRADEMARK OFFICE
CERTIFICATE OF CORRECTION

PATENT NO. : 9,762,849 B2  
APPLICATION NO. : 15/102707  
DATED : September 12, 2017  
INVENTOR(S) : Mitsuo Eguchi Page 1 of 1

It is certified that error appears in the above-identified patent and that said Letters Patent is hereby corrected as shown below:

In the Claims

In Claim 25:
Column 71, Line 17, "Y-degraded-image'" should be deleted and --Y-degraded-image-- should be inserted.

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*